United States Patent
Gallant et al.

(10) Patent No.: US 12,362,369 B2
(45) Date of Patent: Jul. 15, 2025

(54) ELECTROCHEMICAL REDUCTION OF HALOGENATED COMPOUNDS COMPRISING A SULFUR PENTAHALIDE GROUP

(71) Applicant: Massachusetts Institute of Technology, Cambridge, MA (US)

(72) Inventors: Betar Gallant, Cambridge, MA (US); Haining Gao, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 545 days.

(21) Appl. No.: 17/679,031

(22) Filed: Feb. 23, 2022

(65) Prior Publication Data

US 2022/0367885 A1     Nov. 17, 2022

Related U.S. Application Data

(60) Provisional application No. 63/153,331, filed on Feb. 24, 2021.

(51) Int. Cl.
| | |
|---|---|
| *H01M 6/16* | (2006.01) |
| *H01M 4/02* | (2006.01) |
| *H01M 4/133* | (2010.01) |
| *H01M 4/134* | (2010.01) |
| *H01M 4/38* | (2006.01) |
| *H01M 4/583* | (2010.01) |
| *H01M 10/0567* | (2010.01) |

(52) U.S. Cl.
CPC .......... *H01M 6/168* (2013.01); *H01M 4/133* (2013.01); *H01M 4/134* (2013.01); *H01M 4/381* (2013.01); *H01M 4/382* (2013.01); *H01M 4/5835* (2013.01); *H01M 10/0567* (2013.01); *H01M 2004/027* (2013.01); *H01M 2004/028* (2013.01); *H01M 2300/0025* (2013.01)

(58) Field of Classification Search
None
See application file for complete search history.

(56) References Cited

U.S. PATENT DOCUMENTS

| | | | |
|---|---|---|---|
| 5,250,373 A | 10/1993 | Muffoletto et al. | |
| 6,451,483 B1 | 9/2002 | Probst et al. | |
| 11,453,948 B2 | 9/2022 | Gallant et al. | |
| 11,522,241 B2 | 12/2022 | Gallant et al. | |
| 11,735,739 B2 | 8/2023 | Gallant et al. | |
| 11,791,454 B2 * | 10/2023 | Gallant | H01M 4/388 |
| | | | 429/231.95 |
| 12,009,499 B2 | 6/2024 | Gallant et al. | |
| 2002/0197531 A1 * | 12/2002 | Inoue | H01M 4/38 |
| | | | 420/491 |
| 2003/0049524 A1 * | 3/2003 | Spillman | H01M 4/40 |
| | | | 429/231.95 |
| 2021/0057723 A1 | 2/2021 | Gallant et al. | |
| 2022/0199978 A1 * | 6/2022 | Tamirisa | H01M 4/48 |
| 2023/0402581 A1 * | 12/2023 | Gallant | H01M 4/131 |

FOREIGN PATENT DOCUMENTS

JP     2020-009578 A     1/2020

OTHER PUBLICATIONS

Gao et al., Controlling fluoride-forming reactions for improved rate capability in lithium-perfluorinated gas conversion batteries. Adv. Energy Mater., 1900393 (2019).
He et al., Electrochemical conversion of nitrogen trifluoride as a gas-to-solid cathode in Li batteries. J. Phys. Chem. Lett. 9;4700-4706 (2018).
Li et al., A high-capacity lithium-gas battery based on sulfur fluoride conversion. J. Phys. Chem. C 122;7128-7138 (2018).
International Search Report and Written Opinion mailed Sep. 4, 2023, for Application No. PCT/US2022/047429.
International Preliminary Report on Patentability mailed Sep. 6, 2024, for Application No. PCT/US2022/047429.

* cited by examiner

*Primary Examiner* — Anca Eoff
(74) *Attorney, Agent, or Firm* — Wolf, Greenfield & Sacks, P.C.

(57) ABSTRACT

Systems, articles, and methods directed to electrochemical systems (e.g., batteries) and the electrochemical reduction of halogenated compounds are generally described. In certain embodiments, the halogenated compound comprises at least one sulfur pentahalide (e.g., pentafluoride) group associated with a conjugated system.

17 Claims, 33 Drawing Sheets

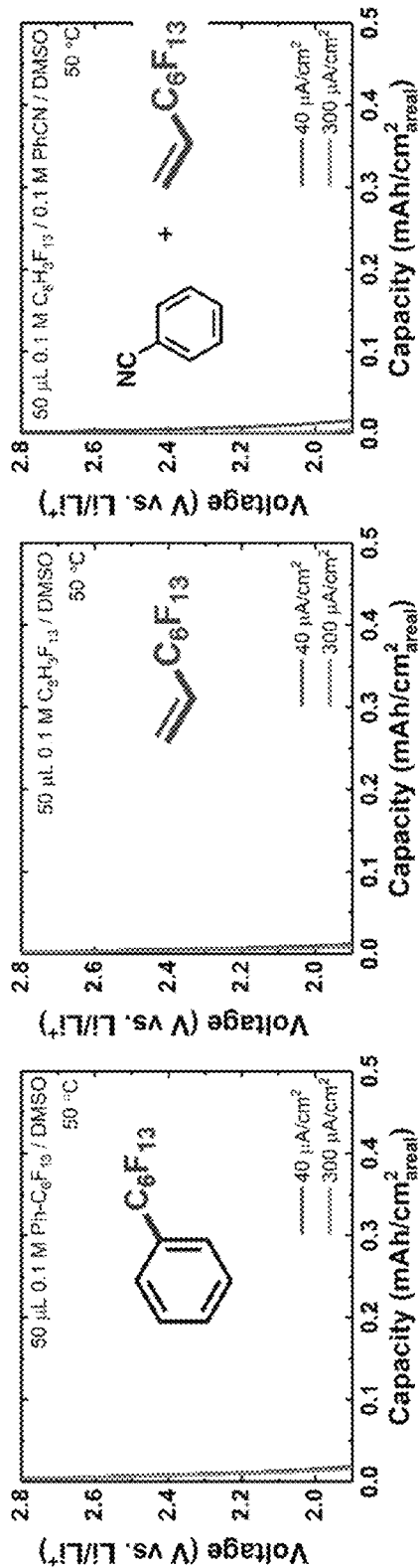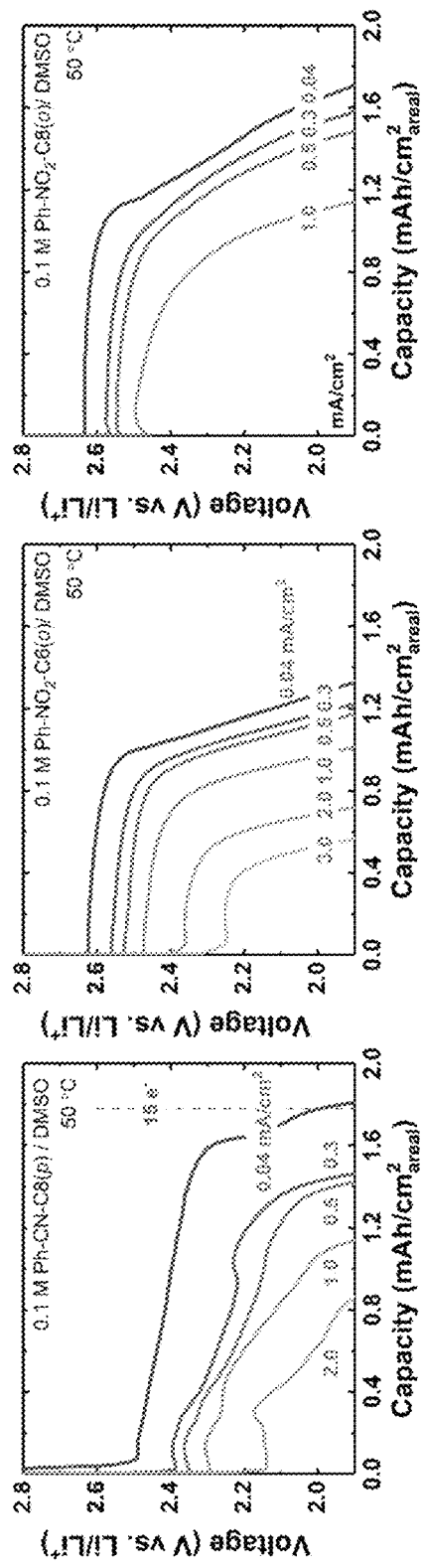
FIG. 6A, FIG. 6B, FIG. 6C, FIG. 7A, FIG. 7B, FIG. 7C

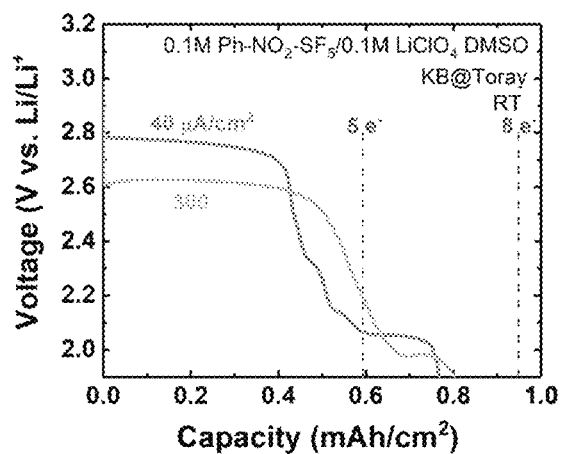 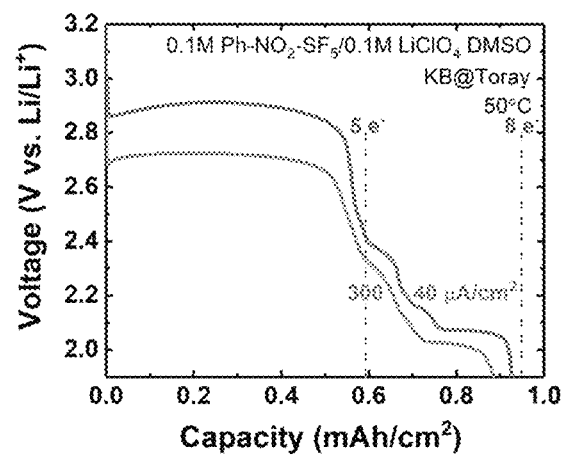
FIG. 12A  FIG. 12B
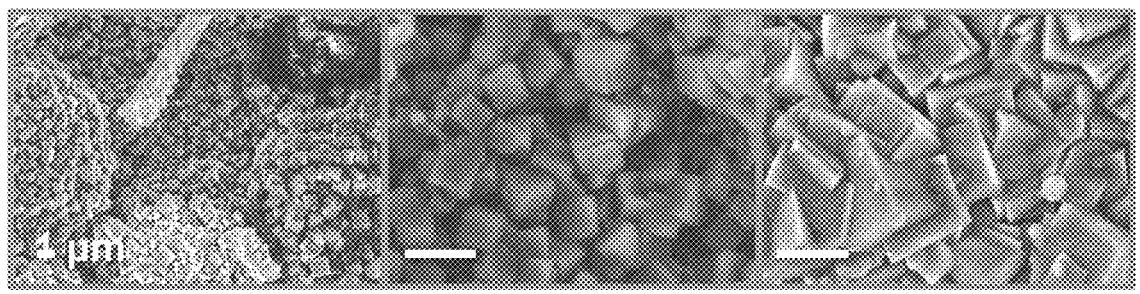
FIG. 13A  FIG. 13B  FIG. 13C

ELECTROCHEMICAL REDUCTION OF HALOGENATED COMPOUNDS COMPRISING A SULFUR PENTAHALIDE GROUP

RELATED APPLICATIONS

The present application claims the benefit under 35 U.S.C. § 119(e) of U.S. Provisional Application No. 63/153,331, filed Feb. 24, 2021, and entitled "ELECTROCHEMICAL REDUCTION OF HALOGENATED COMPOUNDS," which is incorporated herein by reference in its entirety for all purposes.

GOVERNMENT SPONSORSHIP

This invention was made with Government support under W911NF-19-1-0311 awarded by the U.S. Army Research Office. The Government has certain rights in the invention.

TECHNICAL FIELD

Systems, articles, and methods directed to electrochemical systems (e.g., batteries) and the electrochemical reduction of halogenated compounds are generally described. In certain embodiments, the halogenated compound comprises at least one sulfur pentahalide (e.g., pentafluoride) group associated with a conjugated system.

BACKGROUND

High energy density primary batteries are in increasing demand for long-duration standalone systems such as unmanned vehicles, space applications, and implantable/portable medical devices. Owing to the light weight of lithium (Li) and its low electrochemical potential, Li anodes enable construction of batteries with high gravimetric and volumetric energy densities. Li primary batteries, such as Li—$SOCl_2$, Li-carbon monofluoride (Li—$CF_x$), and Li—$MnO_2$ systems with theoretical energy densities of 1470, 2180, and 1005 Wh/$kg_{reactant}$, respectively, hold increasing market share. Accidental voltage reversal in such Li-containing batteries, however, can result thermal runaway conditions, such as cell venting or overheating. In addition, state-of-the-art Li—$SOCl_2$ batteries utilize liquid $SOCl_2$, which is highly toxic if vented or leaked, thus such batteries are not suitable for civil applications where frequent handling and safe transport or storage is essential. Li—$CF_x$ batteries, on the other hand, have improved safety, but face challenges such as poor high-rate performances and voltage delay at the initial discharge, thus being only suitable for low-to-medium rate applications. Accordingly, improved systems, articles, and methods related to primary batteries are desirable.

SUMMARY

Systems, articles, and methods directed to electrochemical systems (e.g., batteries) and the electrochemical reduction of halogenated compounds are generally described. In certain embodiments, the halogenated compound comprises at least one sulfur pentahalide (e.g., pentafluoride) group associated with a conjugated system. The subject matter of the present invention involves, in some cases, interrelated products, alternative solutions to a particular problem, and/or a plurality of different uses of one or more systems and/or articles.

According to certain embodiments, an electrochemical cell is described, the electrochemical cell comprising a first electrode comprising an alkali metal and/or an alkaline earth metal, a second electrode, and a halogenated compound comprising at least one sulfur pentafluoride group associated with a conjugated system.

In certain embodiments, an electrochemical cell comprises a first solid electrode comprising an alkali metal and/or an alkaline earth metal, a second solid electrode comprising carbon monofluoride, and a liquid electrolyte, wherein the liquid electrolyte comprises a halogenated compound, and wherein the halogenated compound comprises a sulfur pentafluoride group associated with a conjugated system.

According to some embodiments, a method of reducing a halogenated compound is described, the method comprising discharging an electrochemical cell, wherein the electrochemical cell comprises an alkali metal and/or an alkaline earth metal and the halogenated compound. In certain embodiments, discharging comprises oxidizing at least a portion of the alkali metal and/or the alkaline earth metal and reducing at least a portion of the halogenated compound such that the halogenated compound is reduced by greater than six electrons.

In certain embodiments, a method of reducing a halogenated compound comprises providing a system comprising a first electrode comprising an alkali metal and/or an alkaline earth metal, a second electrode, and the halogenated compound, wherein the halogenated compound comprises at least one sulfur pentafluoride group associated with a conjugated system. In some embodiments, the method comprises discharging the system, wherein discharging comprises oxidizing at least a portion of the alkali metal and reducing at least a portion of the halogenated compound.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 6A-6C shows, according to some embodiments, galvanostatic discharge profiles of control group fluorinated reactants;

FIG. 7A shows, according to some embodiments, galvanostatic discharge profiles of a lithium (Li) cell with 0.1 M Ph-CN—C8 (p);

FIG. 7B shows, according to some embodiments, galvanostatic discharge profiles of a Li cell with 0.1 M Ph-NO$_2$—C6 (o);

FIG. 7C shows, according to some embodiments, galvanostatic discharge profiles of a Li cell with 0.1 M Ph-NO$_2$—C8 (o);

FIG. 12A shows, according to some embodiments, the galvanostatic discharge profile of a Li cell with 0.1 M Ph-NO$_2$—SF$_5$ (p), at room temperature (RT);

FIG. 12B shows, according to some embodiments, the galvanostatic discharge profile of a Li cell with 0.1 M Ph-NO$_2$—SF$_5$ (p), at 50° C.;

FIGS. 13A-13C show, according to some embodiments, SEM images of fully discharged Ph-NO$_2$—SF$_5$ cells;

DETAILED DESCRIPTION

Figure 1A:
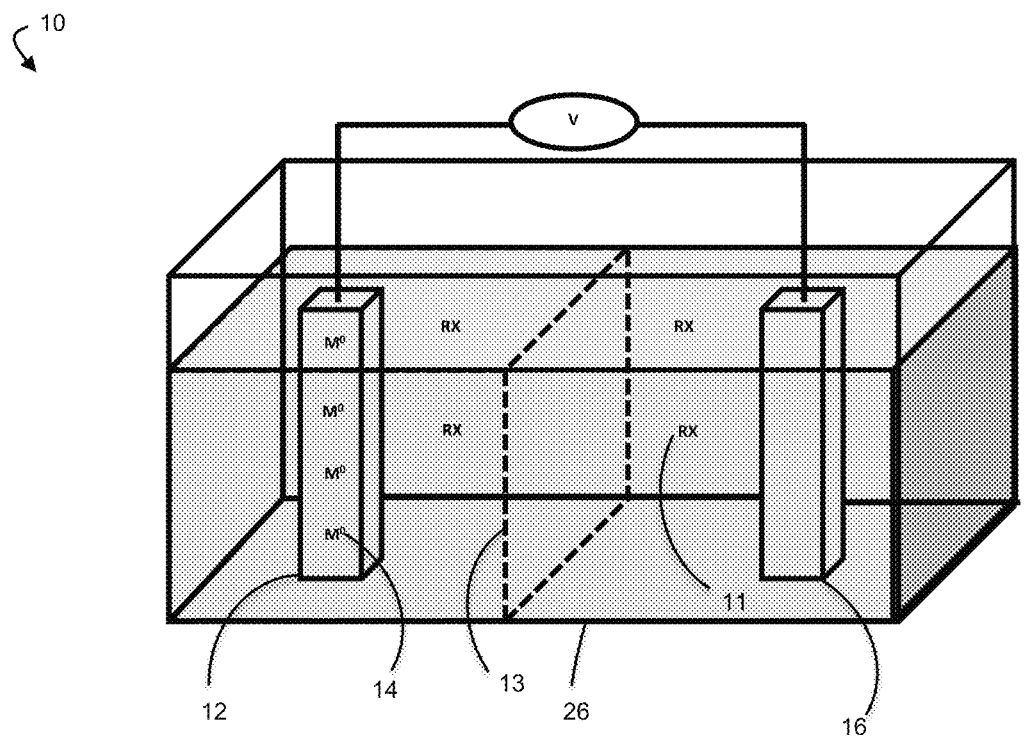
FIG. 1A, shows, according to some embodiments, a schematic diagram of electrochemical cell.

Systems, articles, and methods directed to the electrochemical reduction of halogenated compounds are generally described. According to some embodiments, an electrochemical cell described herein comprises a first electrode comprising an alkali metal (e.g., Li) and/or an alkaline earth metal, a second electrode (e.g., comprising carbon), and a halogenated compound. In some embodiments, the halogenated compound comprises a haloalkane (e.g., fluoroalkane) associated with a conjugated system via at least one alkene linker or alkyne linker. In other embodiments, the halogenated compound comprises a sulfur pentahalide (e.g., pentafluoride) group associated with a conjugated system comprising at least one substituted aromatic group. The halogenated compound may be dissolved in an electrolyte solvent and/or used in neat form as the electrolyte solvent itself. During discharge of the electrochemical cell, the high degree of conjugation of the halogenated compound facilitates electron transfer through the molecule, resulting in complete (or nearly complete) dehalogenation of the molecule. In certain embodiments, for example, halogenated compounds comprising a —C$_6$X$_{13}$ haloalkane functional group or a —C$_8$X$_{17}$ haloalkane functional group may be reduced by 11 or 15 electrons, respectively, wherein X is a halogen, such a fluorine, chlorine, bromide, and/or iodide. The halogenated compound therefore functions as a catholyte, in some embodiments, such that reduction of the halogenated compound provides electrochemical cells (e.g., batteries) with increased energies and capacities as compared to electrochemical cells that are otherwise equivalent but do not comprise the halogenated compound.

The electrochemical cells comprising a halogenated compound as described herein provide significant advantages over conventional electrochemical systems. Conventional commercialized primary batteries, for example, such as Li—SOCl$_2$ and Li—CF$_x$ batteries, deliver good electrochemical performance, but face various challenges. Li—SOCl$_2$ primary batteries, for example, deliver high cell-level energy densities (e.g., 480-590 Wh/kg or 950-1100 Wh/L), but utilize liquid SOCl$_2$ as both cathode and electrolyte, which is highly toxic and corrosive, making such batteries unsuitable for civil applications and/or transportation. Li—CF$_x$ batteries have a high theoretical specific energy (e.g., 2180 Wh/kg), but the CF$_x$ particles are highly insulating, thus the Li—CF$_x$ batteries are only suitable for low-to-medium rate applications (e.g., 250-800 Wh/kg or 560-1160 Wh/L).

Li-fluorinated gas batteries, such as Li—SF$_6$ and Li—NF$_3$ batteries, may be used for defluorination of fluorinated compounds in a single electrochemical cell setup at RT. The large degrees of defluorination enable estimation of the theoretical energy density, which is exceedingly high for gas reactants (e.g., 3900-5100 Wh/kg$_{reactant}$). However, the limited kinetics and low solubilities (e.g., less than 5 mM) achieved by the dissolved gas nature of the SF$_6$ and NF$_3$ cathodes results in large overpotentials during cell discharge, which severely hinders the attainable energy densities of these systems. The reduction of covalent C—F bonds can also be triggered at high potentials (e.g., up to 3 V) in Li-perfluoroalkyl iodide batteries. However, only one to two covalent C—F bonds breaking per molecule can be achieved at practical cell operation conditions (with reactant concentration greater than or equal to 1 M), which limits the cell-level energy densities. Li-perfluorinated gas batteries and Li-perfluoroalkyl iodide batteries are discussed in U.S. patent application Ser. No. 16/909,630, entitled "Electrochemical Formation of Substrate Coatings", which is incorporated herein by reference in its entirety.

The electrochemical cells described herein exhibit high energy densities and capacities. The close-to-full dehalogenation of the halogenated compounds can be achieved at practical discharge conditions (e.g., 0.3 mA/cm$^2$), yielding between 8 to 15 e$^-$ transfers per molecule and relatively high discharge potentials (e.g., ~2.6 V). As a result, high achievable specific energies (e.g., up to 2565 Wh/kg$_{reactant}$) and total capacities (e.g., up to 1140 mAh/g$_{reactant}$) are attainable, making the halogenated compounds a strong competitor as electrodes in high-energy batteries (e.g., primary batteries).

Furthermore, by tuning the molecular structure of the halogenated compounds, a high degree of electrolyte solubility (e.g., less than or equal to 6 M) is observed, therefore reducing overpotentials arising from the low concentrations in existing metal-gas batteries, making the electrochemical cells described herein comparable to conventional systems, such as Li—CF$_x$ primary batteries. The structure of the halogenated compounds additionally allows for multiple types of modification (e.g., ring structure, substituent type and position, haloalkene chain length, halogenated group species), which can directly affect the reduction of these molecules. This characteristic not only provides more opportunity for electrochemical performance improvement, but also serves as a new platform to investigate the reduction of halogen-containing molecules.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1A, shows a schematic diagram of electrochemical cell 10. According to certain embodiments, electrochemical cell 10 comprises a first electrode 12 (e.g., an anode). In some embodiments, first electrode 12 is or comprises metal 14 (represented by M$^0$, wherein M is a neutral metal atom). In some embodiments, the metal has a standard reduction potential of less than or equal to about −1.4 V versus the standard hydrogen electrode (SHE). For example, the metal may, in certain embodiments, be an alkali metal and/or an alkaline earth metal. Suitable examples of alkali metals include lithium (Li), sodium (Na), and/or potassium (K). Suitable examples of alkaline earth metals include magnesium (Mg) and/or calcium (Ca). In some non-limiting embodiments, for example, electrochemical cell 10 comprises first electrode 12 (e.g., anode) comprising metal 14, wherein metal 14 is Li. Other metals are also possible.

In certain embodiments, first electrode 12 (e.g., anode) is or comprises metal 14 (e.g., alkali metal). In some other embodiments, metal 14 is another component of the electrochemical cell other than (or in addition to) the anode, or is in another area of the electrochemical cell. For example, in certain embodiments, the metal may be suspended, dispersed, or dissolved in electrolyte 26 (e.g., electrolyte solution).

Referring to FIG. 1A, electrochemical cell 10 may comprise second electrode 16 (e.g., cathode). As would be understood by a person of ordinary skill in the art, first electrode 12 and second electrode 16 may be in ionic communication with each other, such that ions may move from first electrode 12 to second electrode 16 and vice versa. In some embodiments, first electrode 12 and second electrode 16 may be mechanically and/or electrically isolated from one another (e.g., in separate containers, by use of a separator, etc.).

The second electrode may comprise any of a variety of suitable materials. In certain embodiments, for example, the second electrode comprises carbon and/or a metal. In some embodiments, for example, the second electrode comprises graphite, graphene, graphene oxide, a carbon nanomaterial (e.g., carbon nanotubes, carbon nanofibers), carbon powder (e.g., Vulcan carbon, carbon black, and the like), and/or a carbon gas diffusion layer (GDL). In certain non-limiting embodiments, for example, electrochemical cell 10 comprising second electrode 16 (e.g., cathode) comprises carbon (e.g., carbon black).

In certain embodiments, the second electrode comprises a carbonized material. As used herein, the term "carbonized material" generally refers to a carbon-containing composition that is heated under a controlled atmosphere that allows for partial oxidation and formation of extended conjugation. Carbonized materials may, in some embodiments, comprise elements other than carbon, provided those elements were present in the starting carbon-containing composition. In some embodiments, the carbonized material contains elements that enhance electrode performance. Non-limiting examples of non-carbon elements that the carbonized material can include are metals (e.g., tin), nitrogen, phosphorous, oxygen, and/or silicon.

According to some embodiments, the second electrode comprises CF$_x$. As will be explained herein in greater detail, use of a cathode comprising CF$_x$ in combination with a halogenated compound in an electrochemical cell may provide an enhanced electrochemical performance, such as an increased specific energy.

The second electrode may, in some embodiments, comprise platinum (Pt), nickel (Ni), palladium (Pd), iron (Fe), cobalt (Co), gold (Au), and/or copper (Cu). According to certain embodiments, the second electrode may comprise a metal oxide (e.g., manganese oxide (MnO) or nickel oxide (NiO)), a metal sulfide, and/or a metal fluoride. Other materials are also possible.

Various components of the electrochemical cell, including anode active materials, cathode active materials, electrolytes, and the like are described herein in further detail.

Furthermore, as explained in further detail herein, the second electrode may comprise a halogenation layer.

The electrochemical cell may comprise the first electrode and/or the second electrode in any of a variety of suitable mass loadings. In some embodiments, for example, the electrochemical cell comprises the first electrode and/or the second electrode with a mass loading greater than or equal to 0.1 mg/cm$^2$, greater than or equal to 1 mg/cm$^2$, greater than or equal to 5 mg/cm$^2$, greater than or equal to 10 mg/cm$^2$, greater than or equal to 20 mg/cm$^2$, greater than or equal to 30 mg/cm$^2$, greater than or equal to 40 mg/cm$^2$, greater than or equal to 50 mg/cm$^2$, greater than or equal to 60 mg/cm$^2$, greater than or equal to 70 mg/cm$^2$, greater than or equal to 80 mg/cm$^2$, greater than or equal to 90 mg/cm$^2$, greater than or equal to 100 mg/cm$^2$, greater than or equal to 120 mg/cm$^2$, greater than or equal to 140 mg/cm$^2$, greater than or equal to 160 mg/cm$^2$, greater than or equal to 180 mg/cm$^2$, or greater. In certain embodiments, the electrochemical cell comprises the first electrode and/or the second electrode with a mass loading less than or equal to 200 mg/cm$^2$, less than or equal to 180 mg/cm$^2$, less than or equal to 160 mg/cm$^2$, less than or equal to 140 mg/cm$^2$, less than or equal to 120 mg/cm$^2$, less than or equal to 100 mg/cm$^2$, less than or equal to 90 mg/cm$^2$, less than or equal to 80 mg/cm$^2$, less than or equal to 70 mg/cm$^2$, less than or equal to 60 mg/cm$^2$, less than or equal to 50 mg/cm$^2$, less than or equal to 40 mg/cm$^2$, less than or equal to 30 mg/cm$^2$, less than or equal to 20 mg/cm$^2$, less than or equal to 10 mg/cm$^2$, less than or equal to 5 mg/cm$^2$, less than or equal to 1 mg/cm², or less. Combinations of the above recited ranges are also possible (e.g., the electrochemical cell comprises the first electrode and/or the second electrode with a mass loading between greater than or equal to 0.1 mg/cm² and less than or equal to 200 mg/cm², the electrochemical cell comprises the first electrode and/or the second electrode with a mass loading between greater than or equal to 30 mg/cm² and less than or equal to 70 mg/cm²). Other ranges are also possible.

According to certain embodiments, the electrochemical cell comprises a halogenated compound. As described herein, the term "halogenated compound" refers to an individual molecules of the halogenated compound. As would be understood by a person of ordinary skill in the art, however, embodiments are envisioned, in which the electrochemical cell comprises a plurality of halogenated compounds, as the disclosure is not meant to be limiting in this regard. Referring to FIG. 1A, for example, electrochemical cell 10 comprises halogenated compound 11. Halogenated compound 11 in FIG. 1A is represented by the formula RX, wherein X represents at least one halogen (e.g., a fluorine ion) and R represents an organic group (e.g., at least one optionally substituted aliphatic group and at least one optionally substituted aromatic group) and/or an inorganic group (e.g., sulfur).

According to certain embodiments, the halogenated compound comprises a haloalkane. As used herein, the term "haloalkane" is given its ordinary meaning in the art and generally refers to a molecule comprising an alkane chain containing one or more halogens. In some embodiments, the haloalkane comprises a carbon-based skeleton that contains carbon-halogen bonds (e.g., carbon-fluorine bonds). The carbon skeleton can be linear, cyclic, branched, and/or optionally substituted (e.g., with one or more different functional groups). In some non-limiting embodiments, the haloalkane is of the form $C_nX_{2n+1}$, wherein n is greater than or equal to 1 and each X is the same or a different halogen, such as fluorine, chlorine, bromine, and/or iodine. According to some embodiments, the haloalkane is of the form $C_6X_{2n+1}$, wherein n is greater than or equal to 1 and each X is the same (e.g., fluorine). According to certain non-limiting embodiments, for example, the haloalkane may be a $C_6X_{13}$ (e.g., $C_6F_{13}$) group or a $C_8X_{17}$ (e.g., $C_8F_{17}$) group. In certain other embodiments, the halogenated compound may comprise a mixture of haloalkanes. For example, in some embodiments, the halogenated compound comprises a mixture of fluoroalkanes, chloroalkanes, bromoalkanes, and/or iodoalkanes. The choice of haloalkane depends, in some embodiments, on a number of factors, including cost, solubility, melting point, viscosity, stability prior to electrochemical cell discharge, and discharge efficiency.

In some embodiments, the haloalkane is associated with a conjugated system. As used herein, the term "conjugated system" is given its ordinary meaning in the art and generally refers to a molecular system of p-orbitals with delocalized electrons, conventionally represented by alternating single and multiple carbon bonds. According to certain embodiments, the conjugated system comprises a contiguous arrangement of at least four carbon atoms having π-orbital bonding between them. In some embodiments, the conjugated system may comprise heteroatoms, such as nitrogen or oxygen atoms, in place of one or more of the carbon atoms, which participate in strong π-bonds with carbon atoms. As would generally be understood by a person of ordinary skill in the art, the π-orbitals in a conjugated system are delocalized and the bonding interactions associated with one orbital are not restricted to be between only two carbons, as is the case for a localized bond, such as a C—C single bond or the π-bond in between carbons in ethylene or acetylene.

In certain embodiments, the conjugated system comprises at least one optionally substituted aromatic group. As would generally be understood by a person of ordinary skill in the art, the aromatic group has a cyclic structure with delocalized π-bonding. In some embodiments, for example, the conjugated system comprises benzene. According to certain embodiments, the conjugated system may comprise greater than one optionally substituted aromatic group (e.g., two optionally substituted aromatic groups, three optionally substituted aromatic groups, four optionally substituted aromatic groups, etc.). For example, in some embodiments, the conjugated system comprises naphthalene, anthracene, pyrene, and/or quinoline. As would generally be understood by a person of ordinary skill in the art, when the conjugated system comprises greater than one optionally substituted aromatic group, the aromatic stabilization on a per-ring basis is reduced and the molecules react in a way that produces intermediates that maximize aromatic character, and as a result, the additional optionally substituted aromatic groups behave similar to alkenes in terms of reactivity.

According to some embodiments, the haloalkane is associated with the conjugated system via at least one alkene linker or alkyne linker. In certain embodiments, the alkene linker may be of the form (e.g., —R₂C═CR₂—) and the alkyne linker may be of the form (e.g., —RC≡CR—), wherein R in each formula is the same or different and is a hydrogen, organic group (e.g., an optionally substituted aliphatic group, an optionally substituted aromatic group), and/or an inorganic group (e.g., nitrogen, oxygen, sulfur, etc.). The alkene linker or alkyne linker is part of the conjugated system, in some embodiments, such that the alkene linker or alkyne linker are in conjugation and participate in delocalized bonding with the conjugated system. For example, in some embodiments, the conjugated system may comprise at least one optionally substituted aromatic group (e.g., benzene) functionalized with an alkene linker or an alkyne linker that creates a linkage to the haloalkane. In other embodiments, the conjugated system may comprise greater than one optionally substituted aromatic group (e.g., naphthalene) functionalized with an alkene linker or an alkyne linker that creates a linkage to the haloalkane. In yet other embodiments, the alkene linker or the alkyne linker is a portion of one or more optionally substituted aromatic groups. For example, according to certain embodiments, the conjugated system may comprise greater than one optionally substituted aromatic group and the alkene linker or alkyne linker is associated with one of the optionally substituted aromatic groups.

Figure 2:
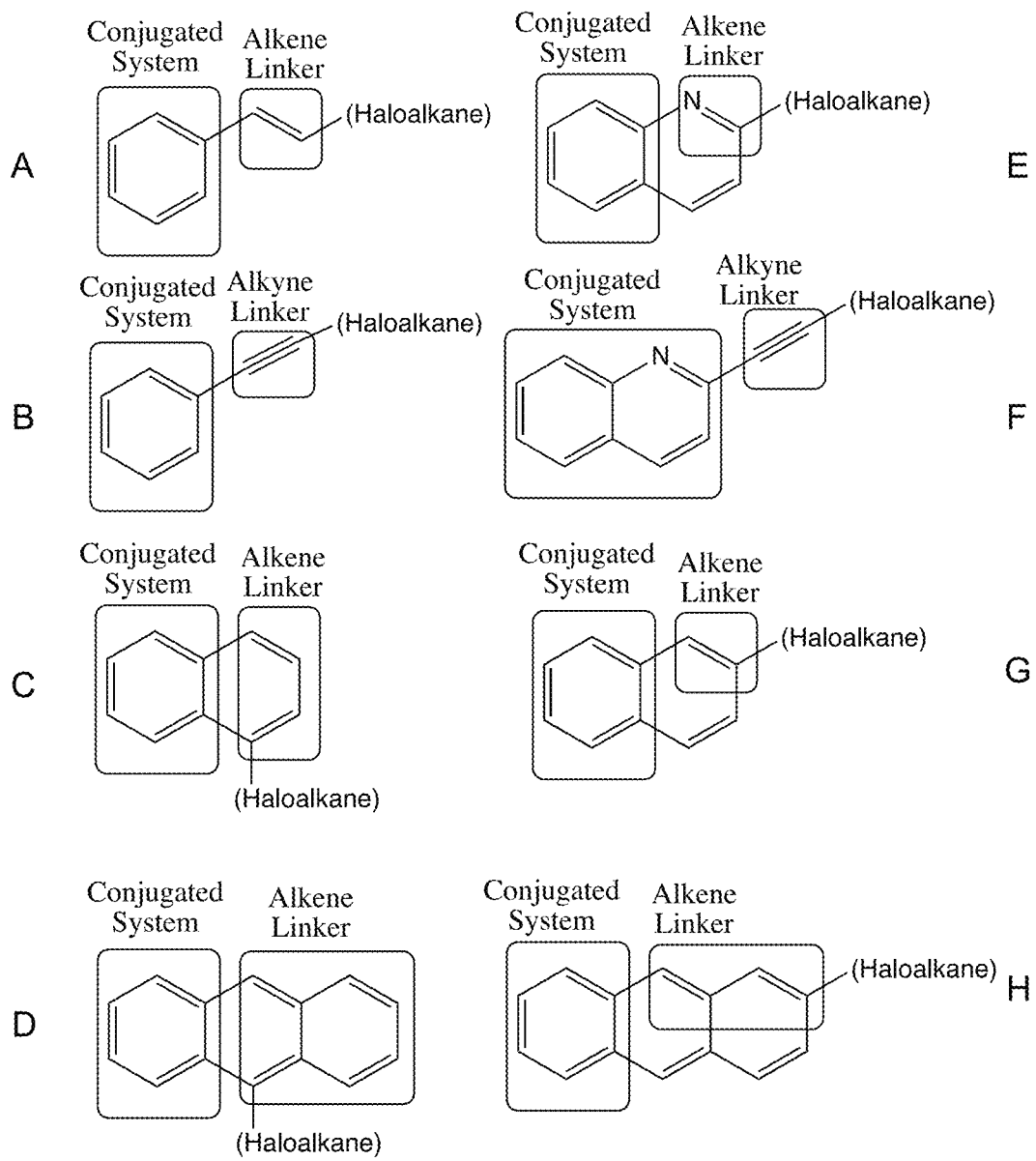
FIG. 2 shows, according to some embodiments, a series of non-limiting halogenated compounds.

FIG. 2 shows, according to some embodiments, a series of non-limiting halogenated compounds, each comprising a haloalkane associated with a conjugated system via at least one alkene linker or alkyne linker. Structure A shows, according to certain embodiments, a conjugated system comprising benzene, an alkene linker as part of the conjugated system, and a haloalkane associated with the conjugated system via the alkene linker. Structure B shows, according to certain embodiments, a conjugated system comprising benzene, an alkyne linker as part of the conjugated system, and a haloalkane associated with the conjugated system via the alkyne linker. Structure C shows, according to certain embodiments, a conjugated system comprising naphthalene, two alkene linkers associated with naphthalene as part of the conjugated system, and a haloalkane associated with the conjugated system via the alkene linkers. Structure D shows, according to certain embodiments, a conjugated system comprising anthracene, four alkene linkers associated with anthracene as part of the conjugated system, and a haloalkane associated with the conjugated system via the alkene linkers. Structure E shows, according to certain embodiments, a conjugated system comprising quinoline, an alkene linker associated with the quinoline as part of the conjugated system, and a haloalkane associated with the conjugated system via the alkene linker. Structure F shows, according to certain embodiments, a conjugated system comprising quinoline, an alkyne linker as part of the conjugated system, and a haloalkane associated with the conjugated system via the alkyne linker. Structure G shows, according to certain embodiments, a conjugated system comprising naphthalene, an alkene linker associated with naphthalene as part of the conjugated system, and a haloalkane associated with the conjugated system via the alkene linker. Structure H shows, according to certain embodiments, a conjugated system comprising anthracene, two alkene linkers associated with the anthracene as part of the conjugated system, and a haloalkane associated with the conjugated system via the alkene linkers. It should be understood that the structures shown in FIG. 2 are not meant to be limiting, and a person of ordinary skill in the art could envision further halogenated compounds comprising a haloalkane associated with a conjugated system via at least one alkene linker or alkyne linker.

In certain non-limiting embodiments, the halogenated compound has the structure $Ar-CH_2=CH_2-C_nF_{2n+1}$, wherein Ar comprises the at least one optionally substituted aromatic group, $CH_2=CH_2$ is an alkene linker, and $C_nF_{2n+1}$ is a fluoroalkane wherein n is greater than or equal to 1. In certain embodiments, Ar comprises one optionally substituted aromatic group (e.g., benzene, pyridine). In some embodiments, Ar comprises more than one optionally substituted aromatic group (e.g., naphthalene).

According to some non-limiting embodiments, the halogenated compound is selected from the group consisting of:

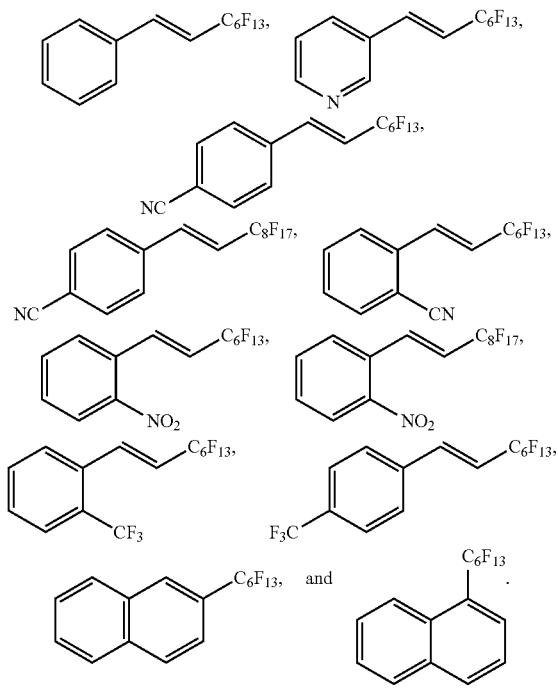

As would generally be understood by those of ordinary in the art, other halogenated compounds comprising a haloalkane associated with a conjugated system via at least one alkene linker or alkyne linker are possible, as the disclosure is not meant to be limiting in this regard.

According to certain embodiments, the halogenated compound comprises a sulfur pentahalide (e.g., pentafluoride) group associated with a conjugated system. In some embodiments, the halogenated compound comprises at least one sulfur pentafluoride group associated with the conjugated system. In certain embodiments, for example, the halogenated compound may comprise one sulfur pentafluoride group, two sulfur pentafluoride groups, three sulfur pentafluoride groups, four sulfur pentafluoride groups, or more, associated with the conjugated system.

In some embodiments, the conjugated system may comprise a substituted aromatic group. In certain non-limiting embodiments, for example, the halogenated compound comprises at least one sulfur pentafluoride group associated with a conjugated system comprising a substituted benzene. The substitution of the at least one sulfur pentafluoride group on the aromatic group in the ortho-, para-, or meta-position advantageously affords the halogenated compound with increased solubilities in the electrolyte, as compared to, for example, a halogenated compound that is otherwise equivalent without substitution on the benzene ring. The increased solubility of the halogenated compound contributes to increased energy densities associated with the electrochemical system during discharge.

In certain non-limiting embodiments, the halogenated compound is selected from the group consisting of:

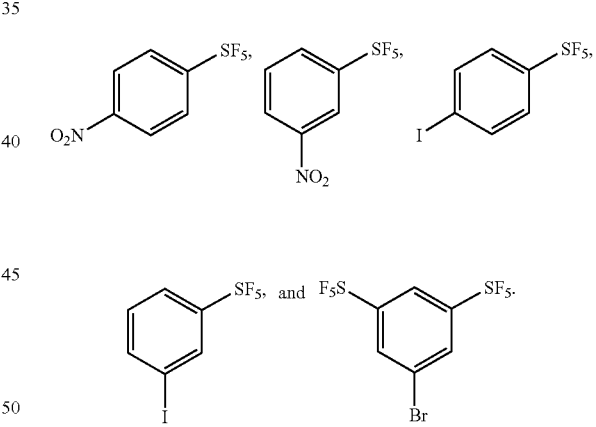

As would generally be understood by those of ordinary in the art, other halogenated compounds comprising a sulfur pentafluoride group may be envisioned, including those wherein the conjugated system comprises greater than one aromatic group, as the disclosure is not meant to be limiting in this regard.

According to some embodiments, the halogenated compound may be ionic. In some embodiments, for example, the halogenated compound may comprise a charged (e.g., positively charged, negatively charged) ion. In certain embodiments, the charged ion is a heteroatom (e.g., a charged N atom, a charged O atom) in place of one or more carbon atoms of the conjugated system. In other embodiments, the charged ion may be a substituent of the conjugated system.

In some non-limiting embodiments, the halogenated compound comprises:

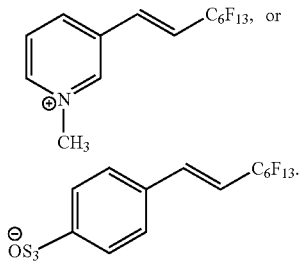

As would generally be understood by those of ordinary in the art, other ionic halogenated compounds, including those comprising a sulfur pentafluoride group, may be envisioned, as the disclosure is not meant to be limiting in this regard.

In certain embodiments, a current and/or voltage is applied to the electrochemical cell. According to some embodiments, for example, the electrochemical may be charged and/or discharged.

In some embodiments, the electrochemical cell may be discharged to any of a variety of suitable capacities. In certain embodiments, for example, the discharge capacity may depend on the components of the electrochemical cell (e.g., the composition of the electrodes and/or the electrolyte, etc.) and/or the amount of the components in the electrochemical cell (e.g., the mass loading of the electrodes and/or the electrolyte, etc.).

In some embodiments, the electrochemical cell is discharged to a capacity (e.g., an areal capacity) greater than or equal to 0.05 mAh/cm$^2$, greater than or equal to 1 mAh/cm$^2$, greater than or equal to 2 mAh/cm$^2$, greater than or equal to 5 mAh/cm$^2$, greater than or equal to 10 mAh/cm$^2$, greater than or equal to 15 mAh/cm$^2$, greater than or equal to 20 mAh/cm$^2$, greater than or equal to 25 mAh/cm$^2$, greater than or equal to 30 mAh/cm$^2$, greater than or equal to 35 mAh/cm$^2$, greater than or equal to 40 mAh/cm$^2$, greater than or equal to 45 mAh/cm$^2$, greater than or equal to 50 mAh/cm$^2$, greater than or equal to 55 mAh/cm$^2$, or greater. In certain embodiments, the electrochemical cell is discharged to a capacity less than or equal to 60 mAh/cm$^2$, less than or equal to 55 mAh/cm$^2$, less than or equal to 50 mAh/cm$^2$, less than or equal to 45 mAh/cm$^2$, less than or equal to 40 mAh/cm$^2$, less than or equal to 35 mAh/cm$^2$, less than or equal to 30 mAh/cm$^2$, less than or equal to 25 mAh/cm$^2$, less than or equal to 20 mAh/cm$^2$, less than or equal to 15 mAh/cm$^2$, less than or equal to 10 mAh/cm$^2$, less than or equal to 5 mAh/cm$^2$, less than or equal to 2 mAh/cm$^2$, less than or equal to 1 mAh/cm$^2$, or less. Combinations of the above recited ranges are also possible (e.g., the electrochemical cell is discharged to a capacity between greater than or equal to 0.05 mAh/cm$^2$ and less than or equal to 60 mAh/cm$^2$, the electrochemical cell is discharged to a capacity between greater than or equal to 10 mAh/cm$^2$ and less than or equal to 15 mAh/cm$^2$). Other ranges are also possible. As would generally be understood by a person or ordinary skill in the art, the areal capacity of the electrochemical cell may depend on the contents of the electrochemical cell, including, for example, the electrode materials and their mass loadings, the electrolyte material and volume, and/or the choice of halogenated compound and its concentration, and therefore may be tailored depending on how the electrochemical cell is engineered.

In certain embodiments, the electrochemical cell is fully discharged. As used herein, the term "fully discharged" generally means that the electrochemical cell is discharged until the theoretical capacity of the halogenated compound is reached or the theoretical capacity of the halogenated compound is not reached but cathode passivation (e.g., by LiF) leads to electrochemical cell termination.

The electrochemical cell may be discharged at any of a variety of suitable current densities. In certain embodiments, the discharge capacity may depend on the specific components of the electrochemical cell (e.g., the composition of the electrodes and/or the electrolyte) and/or the amount of the components in the electrochemical cell (e.g., the mass loading of the electrodes and/or the electrolyte, etc.).

According to some embodiments, the electrochemical cell is discharged at a current density greater than or equal to 1 microampere/cm$^2$, greater than or equal to 500 microamperes/cm$^2$, greater than or equal to 1 milliamperes/cm$^2$, greater than or equal to 2 milliamperes/cm$^2$, greater than or equal to 3 milliamperes/cm$^2$, greater than or equal to 4 milliamperes/cm$^2$, greater than or equal to 5 milliamperes/cm$^2$, greater than or equal to 6 milliamperes/cm$^2$, greater than or equal to 7 milliamperes/cm$^2$, greater than or equal to 8 milliamperes/cm$^2$, greater than or equal to 9 milliamperes/cm$^2$, or greater. In some embodiments, the electrochemical cell is discharged at a current density less than or equal to 10 milliamperes/cm$^2$, less than or equal to 9 milliamperes/cm$^2$, less than or equal to 8 milliamperes/cm$^2$, less than or equal to 7 milliamperes/cm$^2$, less than or equal to 6 milliamperes/cm$^2$, less than or equal to 5 milliamperes/cm$^2$, less than or equal to 4 milliamperes/cm$^2$, less than or equal to 3 milliamperes/cm$^2$, less than or equal to 2 milliamperes/cm$^2$, less than or equal to 1 milliamperes/cm$^2$, less than or equal to 500 microamperes/cm$^2$, or less. Combinations of the above recited range are also possible (e.g., the electrochemical cell is discharged at a current density between greater than or equal to 1 microampere/cm$^2$ and less than or equal to 10 milliamperes/cm$^2$, the electrochemical cell is discharged at a current density between greater than or equal to 4 milliamperes/cm$^2$ and less than or equal to 6 milliamperes/cm$^2$). Other ranges are also possible.

In some embodiments in which the second electrode comprises carbon, the electrochemical cell is discharged at a current density greater than or equal to 50 mA/gc, greater than or equal to 500 mA/gc, greater than or equal to 1 A/gc, greater than or equal to 2 A/gc, greater than or equal to 3 A/gc, greater than or equal to 4 A/gc, greater than or equal to 5 A/gc, greater than or equal to 6 A/gc, greater than 7 A/gc, greater than 8 A/gc, greater than 9 A/gc, or greater. In certain embodiments, the electrochemical cell is discharged at a current density less than or equal to 10 A/gc, less than or equal to 9 A/gc, less than or equal to 8 A/gc, less than or equal to 7 A/gc, less than or equal to 6 A/gc, less than or equal to 5 A/gc, less than or equal to 4 A/gc, less than or equal to 3 A/gc, less than or equal to 2 A/gc, less than or equal to 1 A/gc, less than or equal to 500 mA/gc, or less. Combinations of the above recited ranges are also possible (e.g., the electrochemical cell is discharged at a current density between greater than or equal to 50 mA/gc and less than or equal to 10 A/gc, the electrochemical cell is discharged at a current density between greater than or equal to 1 A/gc and less than or equal to 5 A/gc). Other ranges are also possible.

The electrochemical cell may be discharged (and/or charged) at any of a variety of suitable temperatures. In certain non-limiting embodiments, for example, the electrochemical cell is discharged (and/or charged) at a temperature that is greater than the freezing point of the electrolyte solvent. In some embodiments, the electrochemical cell is discharged (and/or charged) at a temperature greater than or equal to 10° C., greater than or equal to 20° C., greater than or equal to 30° C., greater than or equal to 40° C., greater than or equal to 50° C., greater than or equal to 60° C., greater than or equal to 70° C., or greater. In some embodiments, the electrochemical cell is discharged (and/or charged) at a temperature less than or equal to 80° C., less than or equal to 70° C., less than or equal to 60° C., less than or equal to 50° C., less than or equal to 40° C., less than or equal to 30° C., less than or equal to 20° C., less than or equal to 0° C., or less. Combinations of the above recited ranges are also possible (e.g., the electrochemical cell is discharged and/or charged at a temperature between greater than or equal to 10° C. and less than or equal to 80° C., the electrochemical cell is discharged and/or charged at a temperature between greater than or equal to 20° C. and less than or equal to 30° C.). Other ranges are also possible. In certain non-limiting embodiments, the electrochemical cell is discharged (and/or charged) at RT (e.g., between 20-22° C.)

Figure 1B:
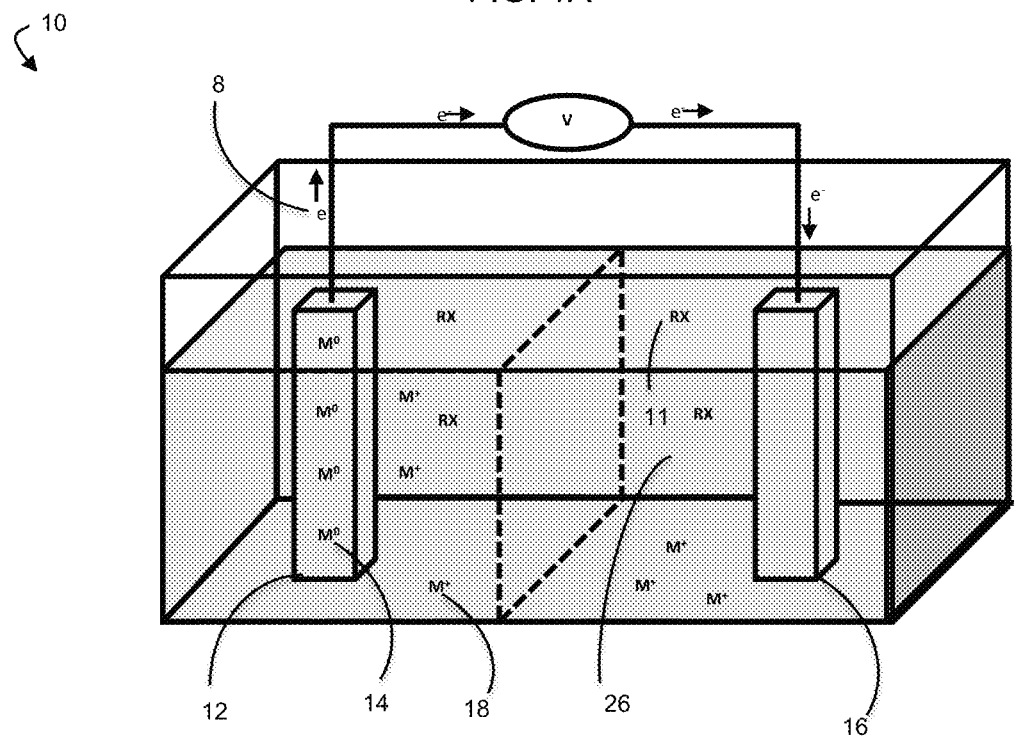
FIG. 1B, shows, according to some embodiments, a schematic diagram of an electrochemical cell comprising an alkali metal ion and/or an alkaline earth metal ion.

According to certain embodiments, a method of discharging an electrochemical cell is described herein. In some embodiments, discharging comprises oxidizing at least a portion of the alkali metal and/or the alkaline earth metal, thereby providing an alkali metal ion and/or an alkaline earth metal ion. FIG. 1B shows, according to some embodiments, a schematic diagram of an electrochemical cell comprising an alkali metal ion and/or an alkaline earth metal ion. As shown in FIG. 1B, electrochemical cell 10 may be discharged (e.g., at any of a variety of suitable current densities), thereby providing electrons 8 from first electrode 12 (e.g., anode) comprising metal 14 (e.g., alkali metal and/or alkaline earth metal). In some embodiments, as a result of discharging electrochemical cell 10, metal 14 is oxidized, thereby providing metal ion 18 (e.g., alkali metal ion). Metal ion 18 in FIG. 1B is represented by the formula $M^+$, wherein M is a metal atom (e.g., a cationic alkali metal ion and/or a cationic alkaline earth metal ion) in an oxidized (e.g., +1, +2) oxidation state. In some embodiments, metal ion 18 is suspended, dispersed, and/or dissolved in electrolyte 26 (e.g., electrolyte solution).

In certain embodiments, discharging comprises reducing at least a portion of the halogenated compound, thereby providing a reduced halogenated compound. The reduced halogenated compound may, in some embodiments, comprise a fragment. In certain embodiments, the reduced halogenated compound comprises a charged species, a neutral species, or a radical. In some embodiments, reducing at least a portion of the halogenated compound may convert one or more atoms (e.g., one atom, two or more atoms, three or more atoms, etc.) of the halogenated compound from a first oxidation state to a second oxidation state. The oxidation number of the first oxidation state of the one or more atoms may be greater than the oxidation number of the second oxidation state. In some embodiments, the atom that is converted from a first oxidation state to a second oxidation state is a halogenated atom. As used, herein, the term "halogenated atom" refers to an atom that is bound (e.g., covalently, non-covalently) to one or more halogen atoms, such as, for example, a carbon atom or a sulfur atom. The reduced halogenated compound is explained in greater detail herein.

The halogenated compound is capable of being reduced by a high number of electrons. As would be understood by a person of ordinary skill in the art, the description of a compound (e.g., a halogenated compound) capable of being reduced by electrons as used herein generally refers to the ability of the compound to gain electrons in a reduction reaction as a result of an oxidation-reduction electron transfer process. According to certain embodiments, the halogenated compound is reduced by greater than or equal to two electrons, greater than or equal to four electrons, greater than or equal to six electrons, greater than or equal to eight electrons, greater than or equal to ten electrons, greater than or equal to eleven electrons, greater than or equal to twelve electrons, greater than or equal to fourteen electrons, greater than or equal to fifteen electrons, greater than or equal to sixteen electrons, greater than or equal to eighteen electrons, or more. In some embodiments, the halogenated compound is reduced by less than or equal to twenty electrons, less than or equal to eighteen electrons, less than or equal to sixteen electrons, less than or equal to fifteen electrons, less than or equal to fourteen electrons, less than or equal to twelve electrons, less than or equal to eleven electrons, less than or equal to ten electrons, less than or equal to eight electrons, less than or equal to six electrons, less than or equal to four electrons, less than or equal to two electrons, or less. Combinations of the above recited ranges are also possible (e.g., the halogenated compound is reduced by between greater than or equal to two electrons and less than or equal to twenty electrons, the halogenated compound is reduced by between greater than or equal to twelve electrons and less than or equal to sixteen electrons). Other ranges are also possible.

In certain embodiments, the halogenated compound comprises a haloalkane associated with a conjugated system via at least one alkene linker or alkyne linker, and the halogenated compound is capable of being reduced by greater than or equal to six electrons, greater than or equal to eight electrons, greater than or equal to ten electrons, greater than or equal to twelve electrons, or greater than or equal to fourteen electrons. In some embodiments, the halogenated compound comprises a haloalkane associated with a conjugated system via at least one alkene linker or alkyne linker, and the halogenated compound is capable of being reduced by less than or equal to sixteen electrons, less than or equal to fourteen electrons, less than or equal to twelve electrons, less than or equal to ten electrons, or less than or equal to eight electrons. Combinations of the above recited ranges are also possible (e.g., the halogenated compound comprises a haloalkane associated with a conjugated system via at least one alkene linker or alkyne linker, and the halogenated compound is capable of being reduced by between greater than or equal to six electrons and less than or equal to fourteen electrons). Other ranges are also possible.

In certain embodiments, the halogenated compound comprises a sulfur pentafluoride group associated with a conjugated system comprising at least one substituted aromatic group, and the halogenated compound is capable of being reduced by greater than or equal to two electrons, greater than or equal to four electrons, greater than or equal to six electrons, greater than or equal to eight electrons, or greater than or equal to ten electrons. In some embodiments, the halogenated compound comprises a sulfur pentafluoride group associated with a conjugated system comprising at least one substituted aromatic group, and the halogenated compound is capable of being reduced by less than or equal to twelve electrons, less than or equal to ten electrons, less than or equal to eight electrons, less than or equal to six electrons, or less than or equal to four electrons. Combinations of the above recited ranges are also possible (e.g., the halogenated compound comprises a sulfur pentafluoride group associated with a conjugated system comprising at least one substituted aromatic group, and the halogenated compound is capable of being reduced by between greater than or equal to two electrons and less than or equal to twelve electrons). Other ranges are also possible.

The number of electrons that the halogenated compound is reduced by may be determined by techniques known to a person of ordinary skill in the art. In some embodiments, for example, the electron transfer number ($n_e$) may be calculated using the equation $n_e=Q/(m*F/3.6)$, wherein Q is the attained capacity in mAh, m is the total moles of reactant, and F is Faraday's constant.

In certain non-limiting embodiments, for example, the halogenated compound comprises a haloalkane associated with a conjugated system via at least one an alkene linker or alkyne linker, wherein x is the number of halogen atoms on the haloalkane, and the halogenated compound is reduced by up to x−2 electrons. In other non-limiting embodiments, the halogenated compound comprises at least one sulfur pentafluoride group associated with a conjugated system, wherein the number of fluorine atoms is x, the number of sulfur atoms is y, and the conjugated system is z. In some such embodiments, the halogenated compound may be reduced by up to x+2y+z electrons. In yet other non-limiting embodiments, the halogenated compound comprises at least one sulfur pentafluoride group associated with a conjugated system and at least one substituent (e.g., $NO_2$ group) associated with the conjugated system, wherein the number of fluorine atoms is x, the number of sulfur atoms is y, the number of substituents is y', and the conjugated system is z. In some such embodiments, the halogenated compound may be reduced by up to x+2y+y'+z electrons.

In some embodiments, conversion of the halogenated atom from the first oxidation state to the second oxidation state results in the removal of one or more halogen atoms (e.g., two or more halogen atoms, four or more halogen atoms, six or more halogen atoms, eight or more halogen atoms, ten or more halogen atoms, twelve or more halogen atoms, all halogen atoms) bound (e.g., covalently bound, non-covalently bound) to the halogenated atom. For example, the change in oxidation state of the one or more halogenated atoms may result in the cleavage of one or more halogenated atom-halogen bonds (e.g., two or more cleavages, four or more cleavages, six or more cleavages, eight or more cleavages, ten or more cleavages, twelve or more cleavages, cleavage of all halogenated atom-halogen bonds). In certain embodiments, the change in oxidation state results in the conversion of the halogenated atom to a reduced, non-halogenated atom. In some embodiments, cleavage of one or more halogenated atom-halogen bonds may result in the formation of one or more halide ions. In a non-limiting embodiment, for example, the cleavage of one or more halogenated atom-halogen bonds may result in the formation of one or more fluoride ($F^-$) ions, which is explained herein in greater detail.

According to certain embodiments, the halogenated atom-halogen bonds may be carbon-halo (e.g., carbon-fluoro) bonds. In some such embodiments, discharging comprises reducing greater than or equal to 50% of the carbon-halo bonds of the halogenated compound, greater than or equal to 60% of the carbon-halo bonds of the halogenated compound, greater than or equal to 70% of the carbon-halo bonds of the halogenated compound, greater than or equal to 80% of the carbon-halo bonds of the halogenated compound, greater than or equal to 90% of the carbon-halo bonds of the halogenated compound, or greater. In some embodiments, discharging comprises reducing less than or equal to 100% of the carbon-halo bonds of the halogenated compound, less than or equal to 90% of the carbon-halo bonds of the halogenated compound, less than or equal to 80% of the carbon-halo bonds of the halogenated compound, less than or equal to 70% of the carbon-halo bonds of the halogenated compound, less than or equal to 60% of the carbon-halo bonds of the halogenated compound, or less. Combinations of the above recited ranges are also possible (e.g., discharging comprises reducing between greater than or equal to 50% of the carbon-halo bonds of the halogenated compound and less than or equal to 100% of the carbon-halo bonds of the halogenated compound, discharging comprises reducing between greater than or equal to 70% of the carbon-halo bonds of the halogenated compound and less than or equal to 80% of the carbon-halo bonds of the halogenated compound).

According to certain embodiments, the halogenated atom-halogen bonds may be sulfur-halo (e.g., sulfur-fluoro) bonds. In some such embodiments, discharging comprises reducing greater than or equal to 50% of the sulfur-halo bonds of the halogenated compound, greater than or equal to 60% of the sulfur-halo bonds of the halogenated compound, greater than or equal to 70% of the sulfur-halo bonds of the halogenated compound, greater than or equal to 80% of the sulfur-halo bonds of the halogenated compound, greater than or equal to 90% of the sulfur-halo bonds of the halogenated compound, or greater. In some embodiments, discharging comprises reducing less than or equal to 100% of the sulfur-halo bonds of the halogenated compound, less than or equal to 90% of the sulfur-halo bonds of the halogenated compound, less than or equal to 80% of the sulfur-halo bonds of the halogenated compound, less than or equal to 70% of the sulfur-halo bonds of the halogenated compound, less than or equal to 60% of sulfur-halo bonds of the halogenated compound, or less. Combinations of the above recited ranges are also possible (e.g., discharging comprises reducing between greater than or equal to 50% of the sulfur-halo bonds of the halogenated compound and less than or equal to 100% of the sulfur-halo bonds of the halogenated compound, discharging comprises reducing between greater than or equal to 70% of the sulfur-halo bonds of the halogenated compound and less than or equal to 80% of the sulfur-halo bonds of the halogenated compound). Other ranges are also possible.

Incorporation of the halogenated compound in the electrochemical cell may advantageously provide a system with a higher specific energy as compared to an electrochemical system that is otherwise equivalent but does not comprise the halogenated compound. In some embodiments, for example, the specific energy of the electrochemical cell may be greater than or equal to 600 Wh/$kg_{reactant}$, greater than or equal to 800 Wh/$kg_{reactant}$, greater than or equal to 1000 Wh/$kg_{reactant}$, greater than or equal to 1200 Wh/$kg_{reactant}$, greater than or equal to 1400 Wh/$kg_{reactant}$, greater than or equal to 1600 Wh/$kg_{reactant}$, greater than or equal to 1800 Wh/$kg_{reactant}$, greater than or equal to 2000 Wh/$kg_{reactant}$, greater than or equal to 2200 Wh/$kg_{reactant}$, greater than or equal to 2400 Wh/$kg_{reactant}$, greater than or equal to 2600 Wh/$kg_{reactant}$, or greater than or equal to 2800 Wh/$kg_{reactant}$, wherein the reactant is the halogenated compound. In certain embodiments, the specific energy of the electrochemical cell is less than or equal to 3000 Wh/$kg_{reactant}$, less than or equal to 2800 Wh/$kg_{reactant}$, less than or equal to 2600 Wh/$kg_{reactant}$, less than or equal to 2400 Wh/$kg_{reactant}$, less than or equal to 2200 Wh/$kg_{reactant}$, less than or equal to 2000 Wh/$kg_{reactant}$, less than or equal to 1800 Wh/$kg_{reactant}$, less than or equal to 1600 Wh/$kg_{reactant}$, less than or equal to 1400 Wh/kg$_{reactant}$, less than or equal to 1200 Wh/kg$_{reactant}$, less than or equal to 1000 Wh/kg$_{reactant}$, or less than or equal to 800 Wh/kg$_{reactant}$, wherein the reactant is the halogenated compound. Combinations of the above recited ranges are also possible (e.g., the specific energy of the electrochemical cell is between greater than or equal to 600 Wh/kg$_{reactant}$ and less than or equal to 3000 Wh/kg$_{reactant}$, wherein the reactant is the halogenated compound, the specific energy of the electrochemical cell is between greater than or equal to 1800 Wh/kg$_{reactant}$ and less than or equal to 2200 Wh/kg$_{reactant}$, wherein the reactant is the halogenated compound). Other ranges are also possible.

In certain embodiments wherein the halogenated compound comprises a haloalkane associated with a conjugated system via at least one alkene linker or alkyne linker, the specific energy of the electrochemical cell is greater than or equal to 600 Wh/kg$_{reactant}$, greater than or equal to 800 Wh/kg$_{reactant}$, greater than or equal to 1000 Wh/kg$_{reactant}$, greater than or equal to 1200 Wh/kg$_{reactant}$, greater than or equal to 1400 Wh/kg$_{reactant}$, greater than or equal to 1600 Wh/kg$_{reactant}$, or greater than or equal to 1800 Wh/kg$_{reactant}$, wherein the reactant is the halogenated compound. In some embodiments wherein the halogenated compound comprises a haloalkane associated with a conjugated system via at least one alkene linker or alkyne linker, the specific energy of the electrochemical cell is less than or equal to 2000 Wh/kg$_{reactant}$, less than or equal to 1800 Wh/kg$_{reactant}$, less than or equal to 1600 Wh/kg$_{reactant}$, less than or equal to 1400 Wh/kg$_{reactant}$, less than or equal to 1200 Wh/kg$_{reactant}$, less than or equal to 1000 Wh/kg$_{reactant}$, or less than or equal to 800 Wh/kg$_{reactant}$, wherein the reactant is the halogenated compound. Combinations of the above recited ranges are also possible (e.g., the halogenated compound comprises a haloalkane associated with a conjugated system via at least one alkene linker or alkyne linker and the specific energy of the electrochemical cell is between greater than or equal to 600 Wh/kg$_{reactant}$ and less than or equal to 2000 Wh/kg$_{reactant}$, wherein the reactant is the halogenated compound). Other ranges are also possible.

According to some embodiments wherein the halogenated compound comprises a sulfur pentafluoride group associated with a conjugated system comprising at least one substituted aromatic group, the specific energy of the electrochemical cell is greater than or equal to 1000 Wh/kg$_{reactant}$, greater than or equal to 1200 Wh/kg$_{reactant}$, greater than or equal to 1400 Wh/kg$_{reactant}$, greater than or equal to 1600 Wh/kg$_{reactant}$, greater than or equal to 1800 Wh/kg$_{reactant}$, greater than or equal to 2000 Wh/kg$_{reactant}$, greater than or equal to 2200 Wh/kg$_{reactant}$, greater than or equal to 2400 Wh/kg$_{reactant}$, or greater than or equal to 2600 Wh/kg$_{reactant}$, wherein the reactant is the halogenated compound. In some embodiments wherein the halogenated compound comprises a sulfur pentafluoride group associated with a conjugated system comprising at least one substituted aromatic group, the specific energy of the electrochemical cell is less than or equal to 2800 Wh/kg$_{reactant}$, less than or equal to 2600 Wh/kg$_{reactant}$, less than or equal to 2400 Wh/kg$_{reactant}$, less than or equal to 2200 Wh/kg$_{reactant}$, less than or equal to 2000 Wh/kg$_{reactant}$, less than or equal to 1800 Wh/kg$_{reactant}$, less than or equal to 1600 Wh/kg$_{reactant}$, or less than or equal to 1400 Wh/kg$_{reactant}$, wherein the reactant is the halogenated compound. Combinations of the above recited ranges are also possible (e.g., the halogenated compound comprises a sulfur pentafluoride group associated with a conjugated system comprising at least one substituted aromatic group and the specific energy of the electrochemical cell is between greater than or equal to 1000 Wh/kg$_{reactant}$ and less than or equal to 2800 Wh/kg$_{reactant}$, wherein the reactant is a halogenated compound). Other ranges are also possible.

In some embodiments, it may be particularly advantageous to utilize a solid-liquid hybrid electrochemical cell comprising a solid anode, a solid cathode, and a liquid electrolyte, wherein the liquid electrolyte comprises the halogenated compound and the solid cathode comprises a high-capacity material that is voltage-matched with the halogenated compound. In certain embodiments, for example, the solid cathode may comprise CF$_x$ or MnO$_2$. In some such embodiments, the attainable specific energy of the electrochemical cell may be relatively high. Without wishing to be bound by theory, the cathodic discharge of the high-capacity, voltage-matched cathode (e.g., comprising CF$_x$ or MnO$_2$) and the halogenated compound may, for example, provide a relatively high specific energy as compared to: (i) an electrochemical cell that is otherwise equivalent but does not comprise the high-capacity, voltage-matched cathode or the halogenated compound; (ii) an electrochemical cell that is otherwise equivalent but does not comprise the high-capacity, voltage-matched cathode; or (iii) an electrochemical cell that is otherwise equivalent but does not comprise the halogenated compound.

According to certain embodiments, incorporation of the halogenated compound in the electrochemical cell may advantageously provide a system with a higher total capacity as compared to an electrochemical system that is otherwise equivalent but does not comprise the halogenated compound. In some embodiments, for example, the total capacity of the electrochemical cell may be greater than or equal to 200 mAh/g$_{reactant}$, greater than or equal to 400 mAh/g$_{reactant}$, greater than or equal to 600 mAh/g$_{reactant}$, greater than or equal to 800 mAh/g$_{reactant}$, greater than or equal to 1000 mAh/g$_{reactant}$, or greater than or equal to 1200 mAh/g$_{reactant}$, wherein the reactant is the halogenated compound. In certain embodiments, the total capacity of the electrochemical cell may be less than or equal to 1400 mAh/g$_{reactant}$, less than or equal to 1200 mAh/g$_{reactant}$, less than or equal to 1000 mAh/g$_{reactant}$, less than or equal to 800 mAh/g$_{reactant}$, less than or equal to 600 mAh/g$_{reactant}$, or less than or equal to 400 mAh/g$_{reactant}$, wherein the reactant is the halogenated compound. Combination of the above recited ranges are also possible (e.g., the total capacity of the electrochemical cell is greater than or equal to 200 mAh/g$_{reactant}$ and less than or equal to 1400 mAh/g$_{reactant}$, the total capacity of the electrochemical cell is greater than or equal to 800 mAh/g$_{reactant}$ and less than or equal to 1000 mAh/g$_{reactant}$). Other ranges are also possible.

In certain embodiments wherein the halogenated compound comprises a haloalkane associated with a conjugated system via at least one alkene linker or alkyne linker, the total capacity of the electrochemical cell is greater than or equal to 200 mAh/g$_{reactant}$, greater than or equal to 400 mAh/g$_{reactant}$, greater than or equal to 600 mAh/g$_{reactant}$, greater than or equal to 800 MAh/g$_{reactant}$, or greater than or equal to 1000 mAh/g$_{reactant}$, wherein the reactant is the halogenated compound. In some embodiments wherein the halogenated compound comprises a haloalkane associated with a conjugated system via at least one alkene linker or alkyne linker, the total capacity of the electrochemical cell is less than or equal to 1200 mAh/g$_{reactant}$, less than or equal to 1000 mAh/g$_{reactant}$, less than or equal to 800 mAh/g$_{reactant}$, less than or equal to 600 mAh/g$_{reactant}$, or less than or equal to 400 mAh/g$_{reactant}$, wherein the reactant is the halogenated compound. Combinations of the above recited ranges are also possible (e.g., the halogenated compound comprises a haloalkane associated with a conjugated system via at least one alkene linker or alkyne linker and the total capacity of the electrochemical cell is between greater than or equal to 200 mAh/$g_{reactant}$ and less than or equal to 1200 mAh/$g_{reactant}$, wherein the reactant is the halogenated compound). Other ranges are also possible.

According to some embodiments wherein the halogenated compound comprises a sulfur pentafluoride group associated with a conjugated system comprising at least one substituted aromatic group, the total capacity of the electrochemical cell is greater than or equal to 200 mAh/$g_{reactant}$, greater than or equal to 400 mAh/$g_{reactant}$, greater than or equal to 600 mAh/$g_{reactant}$, greater than or equal to 800 mAh/$g_{reactant}$, greater than or equal to 1000 mAh/$g_{reactant}$, or greater than or equal to 1200 mAh/$g_{reactant}$, wherein the reactant is the halogenated compound. In some embodiments wherein the halogenated compound comprises a sulfur pentafluoride group associated with a conjugated system comprising at least one substituted aromatic group, the total capacity of the electrochemical cell is less than or equal to 1400 mAh/$g_{reactant}$, less than or equal to 1200 mAh/$g_{reactant}$, less than or equal to 1000 mAh/$g_{reactant}$, less than or equal to 800 mAh/$g_{reactant}$, less than or equal to 600 mAh/$g_{reactant}$, or less than or equal to 400 mAh/$g_{reactant}$, wherein the reactant is the halogenated compound. Combinations of the above recited ranges are also possible (e.g., the halogenated compound comprises a sulfur pentafluoride group associated with a conjugated system comprising at least one substituted aromatic group and the total capacity of the electrochemical cell is between greater than or equal to 200 mAh/$g_{reactant}$ and less than or equal to 1400 mAh/$g_{reactant}$, wherein the reactant is a halogenated compound). Other ranges are also possible.

Figure 1C:
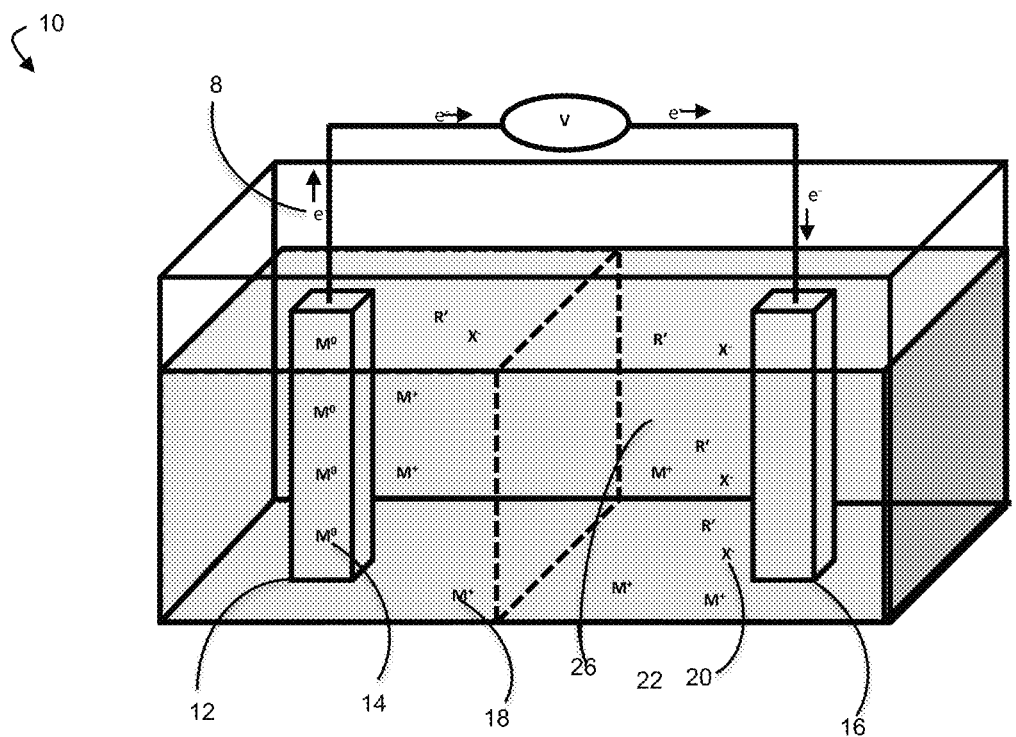
FIG. 1C shows, according to some embodiments, a schematic diagram of an electrochemical cell comprising a reduced halogenated compound.

FIG. 1C shows, according to some embodiments, a schematic diagram of an electrochemical cell comprising a reduced halogenated compound. As shown in FIG. 1C, and as described herein, electrochemical cell 10 may be discharged (e.g., at any of a variety of suitable current densities), thereby providing electrons 8 from first electrode 12 (e.g., anode). In certain embodiments, as a result of discharging electrochemical cell 10, halogenated compound 11 is reduced, thereby providing a reduced halogenated compound. In certain embodiments, the reduced halogenated compound may comprise one or more reduced products 22 (e.g., a reduced, non-halogenated atom) and one or more halide ions 20. Reduced product 22 in FIG. 1C is represented by R', wherein R' represents a reduced organic group (e.g., at least one optionally substituted aliphatic group and/or at least one optionally substituted aromatic group) or a reduced inorganic group (e.g., sulfur). As explained herein in greater detail, R' may be a charged species, a neutral species, or a radical. Halide ion 20 is represented by X$^-$, where X is a halide ion (e.g., an anionic fluorine) in a reduced (e.g., −1) oxidation state. In certain embodiments, reduced product 22 and/or halide ion 20 resulting from the reduction of the halogenated compound may be dissolved in electrolyte 26 (e.g., electrolyte solution).

Figure 1D:
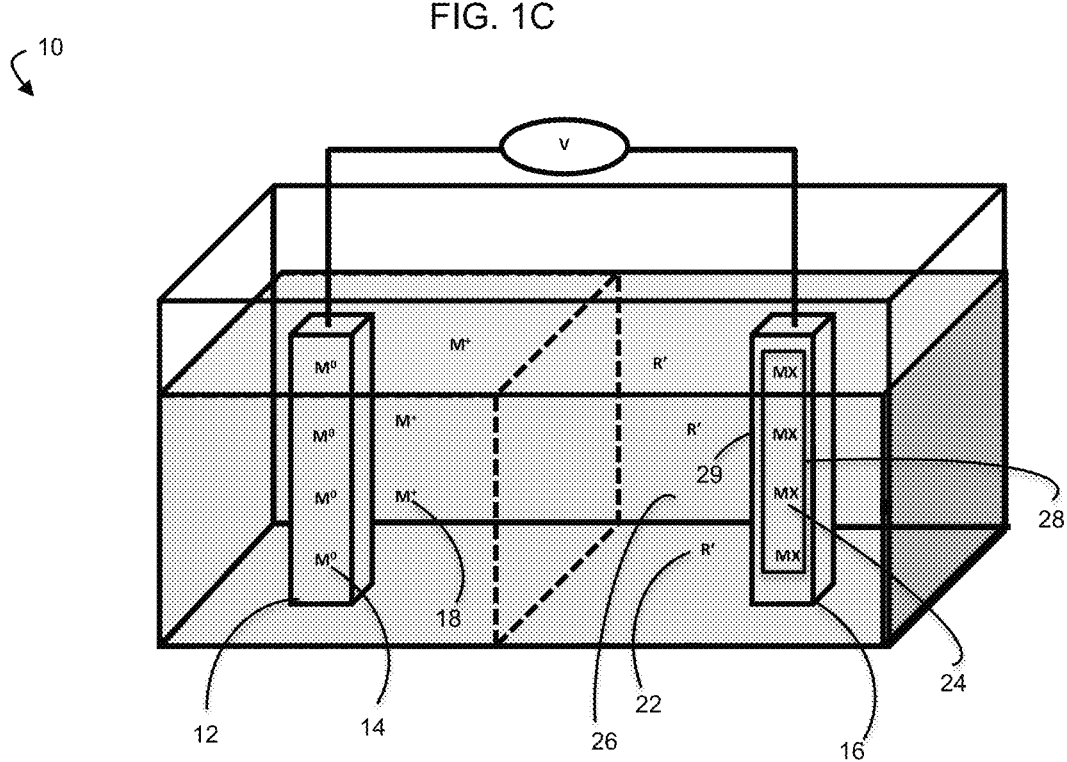
FIG. 1D shows, according to some embodiments, a schematic diagram of an electrochemical cell comprising a halogenation layer.

As described in further detail herein, in some embodiments, oxidizing at least a portion of the alkali metal and/or the alkaline earth metal provides an alkali metal ion and/or an alkaline earth metal ion, and reducing at least a portion of the halogenated compound provides a reduced halogenated compound (e.g., one or more reduced products and one or more halide ions). In certain embodiments, the method may further comprise reacting the alkali metal ion and/or the alkaline earth metal ion with the one or more halide ions to form a halogenation layer on at least a portion of the second electrode. The halogenation layer may, in certain embodiments, comprise a metal salt (e.g., an alkali metal salt, an alkaline earth metal salt). In certain embodiments, the reaction product comprising the metal salt (e.g., the alkali metal salt, the alkaline earth metal salt) deposits on the substrate (e.g., on a surface of the substrate) to form the halogenation layer. FIG. 1D shows, according to some embodiments, a schematic diagram of an electrochemical cell comprising a halogenation layer. As shown in FIG. 1D, second electrode 16 (e.g., cathode) comprises halogenation layer 28 comprising metal salt 24. Metal salt 24 in FIG. 1D is represented by the formula MX, wherein M is a metal atom (e.g., an alkali metal ion, an alkaline earth metal ion) and X is a halide (e.g., a fluoride ion). In some non-limiting embodiments, for example, second electrode 16 (e.g., cathode) comprises halogenation layer 28 comprising metal salt 24, wherein metal salt 24 is LiF.

In some embodiments, the metal that reacts with one or more halide ions may be selected such that the reaction between the metal and the one or more halide ions is an exergonic reaction. Without being bound by theory, it is believed that the exergonic reaction facilitates the electrochemical reaction and minimizes the presence of potential hazardous reaction products and/or contaminants within the halogenation layer.

In certain embodiments, the reaction between the alkali metal ion and/or the alkaline earth metal ion and the halide ion occurs at or near an electrified interface in an electrochemical cell. As used herein, the term "electrified interface" generally refers to the interface between two dissimilar materials in which an interfacial potential difference exists. For instance, in some embodiments, the electrified interface may be the interface between a first material (e.g., an electrode) and a second material that has a different composition than the first material (e.g., an electrolyte). In some embodiments, the reaction between the oxidized alkali metal ion and the reduced halogenated compound occurs at the electrified interface between the substrate (e.g., cathode) and the electrolyte (e.g., electrolyte solution). For example, referring to FIG. 1D, the reaction between the alkali metal ion and/or the alkaline earth metal ion and the halide ion may occur at electrified interface 29 between second electrode 16 (e.g., cathode) and electrolyte 26 (e.g., electrolyte solution). In some embodiments, as a result of the reaction between the oxidized alkali metal ion and the reduced halogenated compound occurring at electrified interface 28 between second electrode 16 (e.g., cathode) and electrolyte 26, at least a portion of the reaction product comprising metal salt 24 (e.g., an alkali metal salt) deposits on second electrode 16 (e.g., cathode) as halogenation layer 28. In some embodiments, the reaction between the alkali metal ion and/or the alkaline earth metal ion and the halide ion occurring at electrified interface 29 (e.g., between second electrode 16 and electrolyte 26) may provide a high concentration of the reaction product comprising metal salt 24 at electrified interface 29. In certain embodiments, electrified interface 29 (e.g., between second electrode 16 and electrolyte 26) may become saturated and/or supersaturated with the reaction product comprising metal salt 24 such that metal salt 24 deposits onto second electrode 16 (e.g., cathode) as halogenation layer 28.

The halogenation layer may, in certain embodiments, act as a passivation layer that protects the substrate that it is disposed on from deterioration and/or decay that may be caused by external forces (e.g., a solvent and/or electrolyte of an electrochemical cell). In some embodiments, the halogenation layer is configured to protect at least a portion of the substrate (e.g., electrode) from corrosion. Corrosion of a substrate (e.g., electrode) is caused, in some cases, by cycling an electrochemical cell comprising the substrate, therefore causing subsequent reactivity between the substrate and the solvent and/or electrolyte of the electrochemical cell. Other external forces in the electrochemical cell may additionally cause corrosion of the substrate, such as gases dissolved in the solvent of the electrochemical cell. In some embodiments, the halogenation layer may provide a reservoir of halide ions (e.g., fluoride ions).

The halogenation layer may comprise a plurality of particles with any of a variety of suitable average particle sizes. In some embodiments, for example, the plurality of particles has an average characteristic dimension (e.g., an average particle diameter) between greater than or equal to 1 nm and less than or equal to 500 nm. The average particle size of the plurality of particles may be determined using SEM, transmission electron microscopy (TEM), and/or atomic force microscopy (AFM).

According to certain embodiments, the average characteristic dimension of the plurality of particles may be inversely proportional to the discharge current density. For example, in some embodiments, discharging the electrochemical cell at higher current densities (e.g., 500 microamperes/cm$^2$) may provide a plurality of particles with smaller average characteristic dimensions, as compared to discharging the electrochemical cell as lower current densities (e.g., 40 microamperes/cm$^2$).

The halogenation layer may have any of a variety of suitable average thicknesses. The thickness of the halogenation layer may be measured starting from the active surface of the second electrode, through the bulk of the halogenation layer, to the interface of the halogenation layer and the electrolyte. In some embodiments, the halogenation layer has an average thickness between greater than or equal to 0.01 micrometers and less than or equal to 5 micrometers). The average thickness of the halogenation layer may be determined using XPS depth profiling, SEM, and/or TEM.

The halogenation layer may substantially cover the surface area of the second electrode. In certain embodiments, for example, the halogenation layer covers between greater than or equal to 10% and less than or equal to 100% of the surface of the surface area of the second electrode.

In some embodiments, at least a portion of the halogenation layer is polycrystalline and/or crystalline. For example, in certain embodiments, the halogenation layer may comprise nanocrystals. In certain embodiments, the crystalline (or polycrystalline) halogenation layer comprises one or more crystallographic defects (e.g., a point defect) and/or grain boundaries, so that the halogenation layer may conduct ions (e.g., from the second electrode, through the halogenation layer, and to an atmosphere surrounding the second electrode, such as an electrolyte). Methods of determining the crystallinity of the halogenation layer include, for example, TEM (e.g., electron diffraction in TEM) and/or X-ray diffraction (XRD).

According to certain embodiments, at least a portion of the halogenation layer may be amorphous. It may be advantageous, in certain embodiments, for at least a portion of the halogenation layer to be amorphous because an amorphous halogenation layer may coat a higher surface area of the second electrode as compared to a halogenation layer that is crystalline and/or polycrystalline but otherwise equivalent.

According to certain embodiments, the electrochemical cell may be a secondary battery (e.g., rechargeable battery). In some such embodiments, the method may further comprise charging the electrochemical cell. Charging the electrochemical cell may result in the alkali metal salt (e.g., LiF) in the halogenation layer being electrochemically split, therefore providing an alkali metal ion (Li$^+$) and a halide ion (e.g., F$^-$). In some embodiments, for example, the alkali metal ion may be reduced back to an alkali metal at the first electrode (e.g., anode), while the halide ion is incorporated on and/or in the lattice of the second electrode (e.g., cathode). The halogenation layer therefore acts as a reservoir of halide ions to be incorporated on and/or in the second electrode of the electrochemical cell as the cell is cycled (e.g., charged and discharged). The second electrode comprising the halogenation layer and/or the halide ions may be suitable for use in electrochemical cells, such as a primary battery and/or a secondary battery (e.g., a Li cell and/or a Li-ion cell), to provide lower charging potentials, increased capacities, and increased cyclabilites.

According to certain embodiments and as described herein, the electrochemical cell may comprise an electrolyte (e.g., an electrolyte solution). In some embodiments, the electrolyte is an electrolyte solution comprising, for example, an ionic salt dissolved in a solvent. The solvent may be water or an organic solvent, in certain embodiments. For example, the electrolyte may comprise dimethyl sulfoxide (DMSO), tetrahydrofuran (THF), dimethylformamide (DMF), dimethylacetamide, a glyme, a carbonate, and/or an ionic liquid. Other solvents are also possible. The electrolyte may comprise any of a variety of suitable ionic salts. For example, the electrolyte may comprise LiClO$_4$, LiPF$_6$, LiBF$_4$, LiCF$_3$SO$_3$, LiNO$_3$, LiI, LiBr, lithium bis(oxalato) borate, lithium bis(fluorosulfonyl)imide, and/or lithium bis (trifluoromethanesulfonyl)imide. Other ionic salts are also possible (e.g., Na derivatives of any of the aforementioned salts). In certain non-limiting embodiments, the electrolyte comprises LiClO$_4$ dissolved in DMSO. Further details regarding the electrolyte function and composition are described herein.

In some embodiments, the electrolyte comprises the halogenated compound. In certain embodiments, for example, the halogenated compound may be dissolved in any of the aforementioned solvents. According to some embodiments, the halogenated compound may have a relatively high concentration in the electrolyte solvent. In some such embodiments, the halogenated compounds described herein may have a relatively high solubility in the electrolyte solvent. In some embodiments, for example, the solubility of the halogenated compound in the electrolyte is greater than or equal to 100 mM, greater than or equal to 500 mM, greater than or equal to 1 M, greater than or equal to 1.5 M, greater than or equal to 2 M, greater than or equal to 2.5 M, greater than or equal to 3 M, greater than or equal to 3.5 M, greater than or equal to 4 M, greater than or equal to 4.5 M, greater than or equal to 5 M, greater than or equal to 5.5 M, greater than or equal to 6 M, greater than or equal to 6.5 M, or more, at 25° C. and 1 atm. In certain embodiments, the solubility of the halogenated compound in the electrolyte is less than or equal to 7 M, less than or equal to 6.5 M, less than or equal to 6.0 M, less than or equal to 5.5 M, less than or equal to 5 M, less than or equal to 4.5 M, less than or equal to 4 M, less than or equal to 3.5 M, less than or equal to 3 M, less than or equal to 2.5 M, less than or equal to 2 M, less than or equal to 1.5 M, less than or equal to 1 M, less than or equal to 500 mM, or less, at 25° C. and 1 atm. Combinations of the above recited ranges are also possible (e.g., the solubility of the halogenated compound in the electrolyte is between greater than or equal to 100 mM and less than or equal to 5 M at 25° C. and 1 atm, the solubility of the halogenated compound in the electrolyte is between greater than or equal to 1 M and less than or equal to 2 M at 25° C. and 1 atm). Other ranges are also possible. According to certain embodiments, the solubility of the halogenated compounds described herein in the electrolyte is greater than the solubility of halogenated gases (e.g., $NF_3$ and/or $SF_6$), therefore advantageously affording the possibility of electrochemical systems with comparatively higher energy densities.

In other embodiments, the halogenated compound may be employed as an additive, for example, with a relatively low concentration in the electrolyte solvent. In some such embodiments, for example, the solubility of the halogenated compound in the electrolyte when employed as an additive is greater than or equal to 0.1 mM, greater than or equal to 0.5 mM, greater than or equal to 1 mM, greater than or equal to 5 mM, greater than or equal to 10 mM, greater than or equal to 20 mM, greater than or equal to 50 mM, greater than or equal to 100 mM, greater than or equal to 500 mM, or more, at 25° C. and 1 atm. In certain embodiments, the solubility of the halogenated compound in the electrolyte when employed as an additive is less than or equal to 1M, less than or equal to 500 mM, less than or equal to 100 mM, less than or equal to 50 mM, less than or equal to 20 mM, less than or equal to 10 mM, less than or equal to 5 mM, less than or equal to 1 mM, less than or equal to 0.5 mM, or less, at 25° C. and 1 atm. Combinations of the above recited ranges are also possible (e.g., the solubility of the halogenated compound in the electrolyte when employed as an additive is between greater than or equal to 0.1 mM and less than or equal to 1 M at 25° C. and 1 atm, the solubility of the halogenated compound in the electrolyte when employed as an additive is between greater than or equal to 1 mM and less than or equal to 5 mM at 25° C. and 1 atm).

According to certain embodiments, the halogenated compound may be used in neat form, for example, as the electrolyte solvent of the electrochemical cell. In some such embodiments, the electrolyte salt (e.g., as explained herein in greater detail) may be dissolved in the halogenated compound.

As explained herein, reducing at least a portion of the halogenated compound provides a halide ion, in some embodiments. The halide ion may, in certain embodiments, be fluoride, chloride, bromide, and/or iodide. In certain embodiments, the halide ion (e.g., fluoride) is generated in a substantially anhydrous environment, for example, dissolved in an organic solvent of the electrolyte. In some embodiments, the fluoride (e.g., anhydrous fluoride) may be isolated and used as a reagent in a chemical reaction to generate, for example, one or more fluorinated compounds. Therefore, in certain embodiments, the halogenated compounds described herein may be a source of soluble and/or anhydrous fluoride.

According to some embodiments, the electrochemical cell may be a non-rechargeable battery. In certain embodiments, for example, the battery is a primary battery that allows for the safer and/or more complete utilization of the alkali metal and/or the alkaline earth metal, as compared to conventional primary batteries. In some embodiments, the battery (e.g., the primary battery) may be used in transportation (e.g., electric vehicles, unmanned vehicles), space applications, military applications, implantable/portable medical devices, and/or grid-storage applications (e.g., electrical power grids for the storage of renewable energy).

According to certain embodiments, the electrochemical cell may be a rechargeable battery. In some embodiments, for example, the battery is a secondary battery that may cycled (e.g., discharged and charged).

In certain embodiments, a system is described, the system comprising a first electrode comprising an alkali metal and/or an alkaline earth metal, a second electrode, and a halogenated compound comprising a haloalkane associated with a conjugated system via at least one alkene linker or alkyne linker. In some embodiments, the system is a water remediation system that may be used to reduce halogenated (e.g., fluorinated) compounds present in water, for example, as contaminants.

The first electrode (e.g., anode) may comprise a variety of active materials (e.g., anode active materials). As used herein, the term "anode active material" refers to any electrochemically active species associated with the anode. In some embodiments, the anode active material is a metal. The metal may have a standard reduction potential of less than or equal to about −1.4 V versus the standard hydrogen electrode (SHE). For instance, the metal and/or the anode may have a standard reduction potential versus SHE of less than or equal to about −1.5 V, less than or equal to about −1.6 V, less than or equal to about −1.8 V, less than or equal to about −2.0 V, less than or equal to about −2.2 V, less than or equal to about −2.4 V, or less than or equal to about −2.5 V. In some embodiments the anode active material may comprise lithium, sodium, calcium, magnesium, aluminum, and/or or combinations thereof. In some embodiments, the anode active material may comprise an alkali metal (e.g., lithium, sodium, potassium) and/or an alkaline earth metal (e.g., magnesium, calcium). In certain embodiments, the anode active material may comprise an alkali metal (e.g., lithium, sodium). In some embodiments, the anode may comprise an alkaline earth metal (e.g., magnesium, calcium).

In certain embodiments, the anode active material comprises Li. Suitable Li-containing anode active materials for use in the anode include, but are not limited to, lithium metal such as lithium foil and lithium deposited on a substrate, lithium alloys (e.g., lithium-aluminum alloys and lithium-tin alloys), and/or three-dimensional materials comprising lithium, such as lithium wicked into a high surface area carbon structure, for example, comprising graphene or graphene oxide. While these materials may be preferred in some embodiments, other cell chemistries are also contemplated. In some embodiments, the electrodes may comprise one or more binder materials (e.g., polymers, etc.).

In some embodiments, the first electrode may have a thickness of less than or equal to 1500 micrometers, less than or equal to 1250 micrometers, less than or equal to 1000 micrometers, less than or equal to 750 micrometers, less than or equal to 500 micrometers, or less than or equal to 200 micrometers. In certain embodiments, the first electrode may have a thickness of at least 1 micrometer, at least 5 micrometers, at least 10 micrometers, at least 25 micrometers, at least 50 micrometers, at least 100 micrometers, or at least 150 micrometers. Combinations of the above-referenced ranges are also possible (e.g., from 1 micrometer to 1500 micrometers). Other ranges are also possible.

In some embodiments, the first electrode may comprise a passivation layer on at least a portion (e.g., substantially all) of one or more surfaces (e.g., two surfaces, all surfaces, surfaces in contact with the electrolyte). The passivation layer may, for example, prevent direct reactions between the halogenated compound and the first electrode (e.g., metal in the first electrode). In some embodiments, the passivation layer may comprise organic compounds, oxides, halides, or combination thereof including but not limited to alkali or metal oxides, carbonates, reduction products of the electrolyte, nitrides, fluorides, chlorides, or a physical protective barrier such as a polymer or conductive ceramic. The passivation layer can be formed in a separate chemical step, can be physically placed within the electrochemical cell, or can be formed chemically or electrochemically in situ within the electrochemical cell.

The second electrode (e.g., cathode) may comprise a variety of active materials (e.g., cathode active materials). As used herein, the term "cathode active material" refers to any electrochemically active species associated with the cathode. In some embodiments, the cathode active material comprises carbon and/or one or more metals.

According to certain embodiments, the second electrode may have a thickness of less than or equal to 2000 micrometers, less than or equal to 1500 micrometers, less than or equal to 1250 micrometers, less than or equal to 1000 micrometers, less than or equal to 750 micrometers, less than or equal to 500 micrometers, or less than or equal to 200 micrometers. In certain embodiments, the second electrode may have a thickness of at least 1 micrometer, at least 5 micrometers, at least 10 micrometers, at least 25 micrometers, at least 50 micrometers, at least 100 micrometers, or at least 150 micrometers. Combinations of the above-referenced ranges are also possible (e.g., from 1 micrometer to 2000 micrometers). Other ranges are also possible.

In general, the second electrode may have any suitable surface area. Without being bound by theory, it is believed that efficiency and extent of the electrochemical reaction increases with the surface area of the second electrode (e.g., cathode). In some embodiments, a second electrode with a relatively high surface area may be used. For instance, the cathode may have a surface area of greater than or equal to about 10 $m^2/g$, greater than or equal to about 250 $m^2/g$, greater than or equal to about 500 $m^2/g$, greater than or equal to about 750 $m^2/g$, greater than or equal to about 1000 $m^2/g$, or greater.

According to some embodiments and as described herein, the electrochemical cell comprises an electrolyte. The electrolytes used in electrochemical cells can function as a medium for the storage and transport of ions, and in the special case of solid electrolytes and gel electrolytes, these materials may additionally function as a separator between the electrodes. Any liquid, solid, or gel material capable of storing and transporting ions may be used, so long as the material facilitates the transport of ions (e.g., Li ions) between the electrodes. The electrolyte is generally electronically non-conductive to prevent short circuiting between the electrodes. The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes.

In some embodiments, an electrochemical cell includes a separator. The separator generally comprises a polymeric material (e.g., polymeric material that does or does not swell upon exposure to electrolyte). In some embodiments, the separator is located between the electrolyte and an electrode (e.g., a first electrode, a second electrode, an anode, a cathode). In certain embodiments, the separator is located between the first electrode (e.g., anode) and the second electrode (e.g., the cathode). For example, referring to FIG. 1A, separator 13 may be located between first electrode 12 (e.g. anode) and second electrode 16 (e.g., cathode). The separator may be configured to inhibit (e.g., prevent) physical contact between a first electrode and a second electrode, which could result in short circuiting of the electrochemical cell. The separator may be configured to be substantially electronically non-conductive, which can inhibit the degree to which the separator causes short circuiting of the electrochemical cell.

It will be appreciated that the above groups and/or compounds, as described herein, may be optionally substituted with any number of substituents or functional moieties. That is, any of the above groups may be optionally substituted. As used herein, the term "substituted" is contemplated to include all permissible substituents of organic compounds, "permissible" being in the context of the chemical rules of valence known to those of ordinary skill in the art. In general, the term "substituted" whether proceeded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. It will be understood that "substituted" also includes that the substitution results in a stable compound, e.g., which does not spontaneously undergo transformation such as by rearrangement, cyclization, elimination, etc. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl group" must still comprise the phenyl moiety and cannot be modified by substitution, in this definition, to become, e.g., a pyridine ring. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. Furthermore, this invention is not intended to be limited in any manner by the permissible substituents of organic compounds. Combinations of substituents and variables envisioned by this invention are preferably those that result in the formation of stable compounds useful for the formation of an imaging agent or an imaging agent precursor. The term "stable," as used herein, preferably refers to compounds which possess stability sufficient to allow manufacture and which maintain the integrity of the compound for a sufficient period of time to be detected and preferably for a sufficient period of time to be useful for the purposes detailed herein.

Examples of substituents include, but are not limited to, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF3, —CN, aryl, aryloxy, perhaloalkoxy, aralkoxy, heteroaryl, heteroaryloxy, heteroarylalkyl, heteroaralkoxy, azido, amino, halide, alkylthio, oxo, acylalkyl, carboxy esters, carboxamido, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, cyano, alkoxyalkyl, perhaloalkyl, arylalkyloxyalkyl, and the like.

The following examples are intended to illustrate certain embodiments of the present invention, but do not exemplify the full scope of the invention.

Example 1

The following example describes a family of primary batteries that can deliver large electrical energies through the defluorination of perfluorinated groups, such as perfluoroalkyl groups ($R_F$) and pentafluorosulfanyl ($SF_5$) groups.

A class of perfluorinated group-containing fluoro-aromatics can achieve close-to-full defluorination at practical electrochemical cell operation conditions. The structure of the $R_F$-containing aromatics contains three major functional groups: an aromatic group, a perfluoroalkane containing group ($R_F$), and optimally an alkene group as the connection between the former two parts. As for the $SF_5$-containing aromatics, the $SF_5$ group is directly substituted on the aromatic without an alkene group in between. The achievable specific energies of these reactants (up to, for example, 1785 Wh/$kg_{reactant}$ for $R_F$-containing aromatics, 2190 Wh/$kg_{reactant}$ for $NO_2$-Ph-$SF_5$, and 2565 Wh/$kg_{reactant}$ for Br-Ph-$2SF_5$) are higher than the theoretical value of $SOCl_2$, making the fluoro-aromatics a strong competitor for high-energy Li primary battery cathodes.

Figure 3:
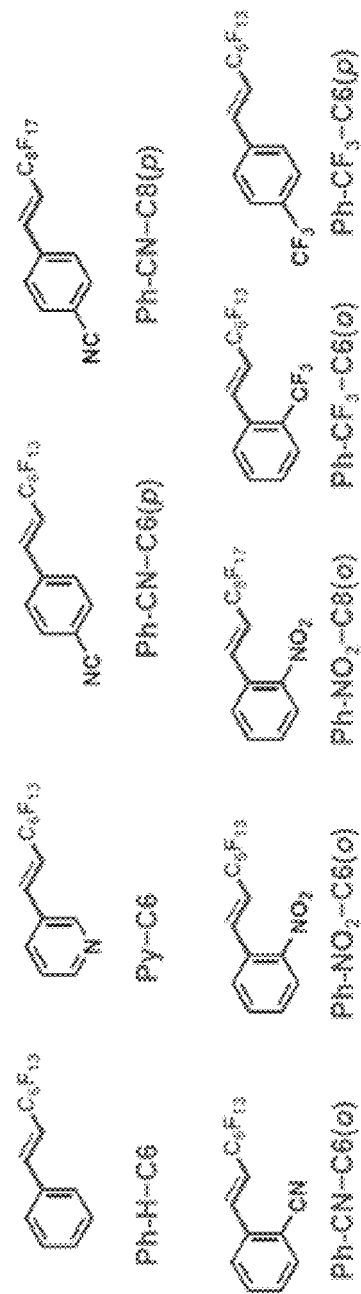
FIG. 3 shows, according to some embodiments, a series of non-limiting structures of $R_F$-containing fluoro-aromatics.

Non-limiting examples of the fluoro-aromatics are shown in FIG. 3. The multiple carbon-carbon double bonds facilitate the reductive transformation of the perfluoroalkane groups, defined as $C_nF_{2n+1}$ functional groups wherein n is greater than or equal to 2. As explained in further detail herein, a higher fluorine content produces a higher energy density, and as a result, a larger n value can be advantageous. However, too long of a perfluoroalkane chain can cause difficulties in the physical properties of the fluoro-aromatics as well as the ability to achieve a complete discharge of the electrochemical cell. As explained in greater detail herein, the non-limiting examples shown in FIG. 3 are conveniently produced in high yield in one step from commercial starting materials.

Figure 4:
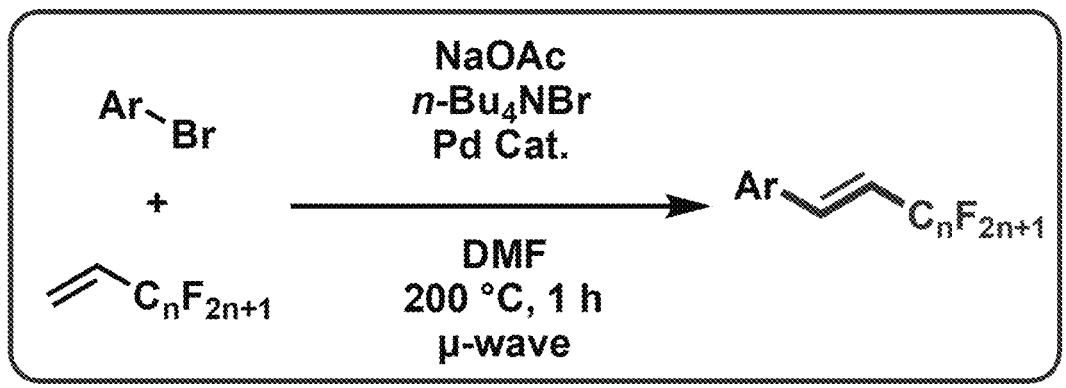
FIG. 4 shows, according to some embodiments, a general synthetic scheme to obtain $R_F$-containing fluoro-aromatics.

A typical synthetic procedure to obtain the fluoro-aromatics is shown in FIG. 4. A brief description of the synthesis is as follows: A mixture of the aryl bromide (1.0 equivalent), perfluorinated alkene (1.5 equivalents), NaOAc (1.5 equivalents), n-$Bu_4$NBr (0.85 equivalents), and palladium catalyst (0.050 equivalents) was dissolved in DMF, and the reaction mixture was stirred for 24-96 hours at 125° C., or for 1 hour at 200° C. in a microwave reactor. Upon cooling the reaction mixture to RT, the residue was dissolved in AcOEt and HCl. The organic layer was separated, washed with water (×3) and brine, dried with $MgSO_4$, and evaporated to dryness under reduced pressure. The residue was chromatographed on silica gel, and the fraction containing the product was collected and evaporated to dryness.

One skilled in art will recognize that there are multiple methods to attach perfluoroalkanes to compounds containing carbon-carbon double bonds, and many other structures besides those shown in FIG. 3 can be produced that could also be suitable materials for the articles, systems, and methods described herein.

The fluoro-aromatics shown in FIG. 3 were generally obtained in good yields. For the synthesis of Py-C6, using Herrmann's catalyst as the palladium (Pd) catalyst gave no conversion, therefore Pd(OAc)$_2$ was utilized. Nonetheless, Py-C6 was obtained in only 31% yield, presumably due to the instability of the reaction intermediate or the coordination of pyridine to Pd leading to complicated byproducts. For the synthesis of Ph-$NO_2$—C6 and Ph-$NO_2$—C8, using Pd(OAc)$_2$ gave better yields than Herrmann's catalyst. Lower yields were observed for Ph-$NO_2$—C6(o) and Ph-$CF_3$—C6(o) than their para counterparts because of the steric hindrance derived from the functional groups. In general, C8 products were obtained in better yields due to the high melting point and higher crystallinity from the longer fluoroalkyl chain, providing the products as solids.

Figure 5:
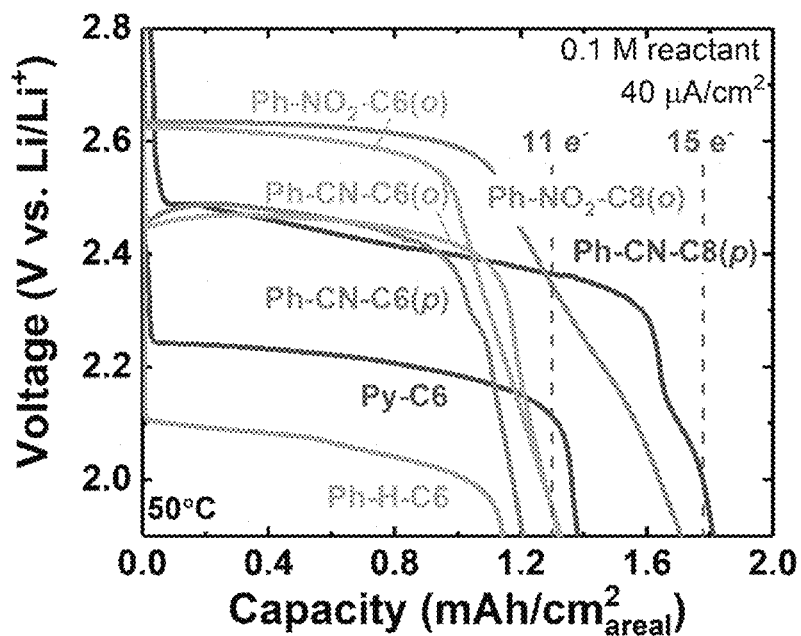
FIG. 5 shows, according to some embodiments, galvanostatic discharge profiles of $R_F$-containing fluoro-aromatics.

It was first demonstrated how the $R_F$ reduction properties can be manipulated by molecular structure design. In certain cases wherein the electrolyte salt was insoluble in the liquid state of the neat reactant, a co-solvent was used to assist in dissolution of the electrolyte salt in instances where the salt was insoluble in neat reactant. Dimethyl sulfoxide (DMSO, without any optimization) was chosen as the co-solvent for all the cells tested. Due to the limited solubility of Ph-CN—C8(p) at RT, all the cells were measured at 50° C. with 0.1 M reactants in DMSO electrolyte to form fair comparisons. The discharge performances were evaluated at 50° C. and are shown in FIG. 5, from which it can be analyzed how the molecular structure will affect the discharge performances of these molecules.

To understand the effect of the chain length of the $R_F$ group, the discharge profiles of Ph-$NO_2$—C6 (o) vs. Ph-$NO_2$—C8 (o) and Ph-CN—C6 (p) vs. Ph-CN—C8 (p) were compared. As is shown in FIG. 5, up to 11 e– or 15 e– transfer per molecule (calculated based on capacities) can be obtained during discharge for C6 or C8 containing reactants, respectively. Considering that there are only 13 or 17 C—F bonds in the C6 or C8 groups, respectively, the discharge profiles indicate that, assuming all the e– transfer are induced by C—F bond reduction, nearly full defluorination of the $R_F$ groups can be achieved, with only two C—F bonds remaining unreacted. It is also worth noting, however, that, although longer $R_F$ chains tend to exhibit better F utilization, it also tends to decrease the solubility of the reactants in DMSO. For example, Ph-CN—C6 (p) is liquid and miscible with DMSO at RT, but its C8 counterpart is solid at RT and is only soluble at elevated temperatures (e.g., 50° C.).

Next, the effect of the functional group species and their positions was investigated using benzene as the basic ring structure. To compare across different functional species, the substituent constant σ in the Hammett equation was considered, which is an indicator of the electron-withdrawing strength of the functional groups. The σ of the substituents (para) investigated is shown in Table 1.

TABLE 1

Substituent constants σ of para-substituted benzene rings.

| Substituent | Label | σ |
| --- | --- | --- |
| None | —H | 0.000 |
| Trifluoromethyl | —$CF_3$ | +0.54 |
| Cyano | —CN | +0.66 |
| Nitro | —$NO_2$ | +0.78 |

Since the Hammett equation does not give optimally linear relationships with ortho substituents, the reduction behavior change caused by the different substituent positions (para vs. ortho) was first examined prior to other analysis. As is shown in FIG. 5, the discharge potentials and capacities of Ph-CN—C6 (o) and Ph-CN—C6 (p) showed negligible differences, indicating that the substituents at para and ortho positions have relatively similar effects on the $R_F$ chain reduction. Based on this assumption, the discharge profiles of Ph-NO2—C6 (o), Ph-CN—C6(o), and Ph-H—C6, were then compared, from which it was concluded that the stronger the electron-withdrawing effect of the substituent ($\sigma$=0.78, 0.66, and 0 for —$NO_2$, —CN, and —H, respectively), the higher the discharge potential of the reactants (2.6 V, 2.5 V and 2.1 V, respectively).

Except for the electrochemical performances, the functional group species also directly influence the miscibility/solubility of the reactants in 0.1 M $LiClO_4$/DMSO. Unlike Ph-CN—C8 (p) which is not soluble at RT and suffers a solubility limit of 0.8 M at 50° C., Ph-$NO_2$—C8 (o) can reach a concentration of 2 M at RT. As for the trifluoromethyl group (—$CF_3$), both Ph-$CF_3$—C6 (o) and Ph-$CF_3$—C6 (p) showed negligible miscibility with 0.1 M $LiClO_4$/DMSO even at 50° C., thus the discharge performances of these reactants are not included.

Additionally, the effect of different ring structures was examined. By changing benzene to pyridine, i.e., from Ph-H—C6 to Py-C6, the discharge potential increased by ~0.1 V. This points out that by using pyridine as the basic ring structure, with similar substituent modifications, even higher potential (higher than 2.6 V, as is for Ph-$NO_2$—C6) could potentially be obtained. However, this is out of the scope of the current study.

Finally, the necessity of including alkene and aromatic groups was demonstrated, as well as then necessity of the synthesis step to construct these functional groups into a whole molecule. In contrast with Ph-H—C6, lacking an alkene group between the $R_F$ chain and benzene (i.e., perfluorohexyl benzene, with the $R_F$ directly substituting the H on benzene), negligible activities were observed on discharge (see FIG. 6A). Similarly, if there is no aromatic group, i.e., only the alkene group and the $R_F$ chain, the reactant is also electrochemically inactive (see FIG. 6B). In addition, even with benzonitrile added as the "external" aromatic group, the system (which contains both the aromatic and the alkene group, but not in the same molecule), still exhibits negligible activity (see FIG. 6C). This indicates that the synthesis process that combines these functional groups together as a whole molecule, is essential to unlocking the electrochemical activity of the $R_F$ chain. The discharge profiles in FIGS. 6A-6C were evaluated at 50° C.

The fluoro-aromatics, such as Ph-CN—C8 (p), Ph-$NO_2$—C6 (o), and Ph-$NO_2$—C8 (o), exhibit good rate capabilities during discharge. As is shown in FIGS. 7A-7C, at 50° C., all three reactants showed good capacity and voltage retention as the current density increased from 0.04 to 1.0 mA/$cm^2$, with capacities of >1 mAh/$cm^2$ obtained at such high rate. The gravimetric attainable capacities of Ph-CN—C8 (p), Ph-$NO_2$—C6 (o), and Ph-$NO_2$—C8 (o) are 748, 642, and 681 mAh/$g_{reactant}$, respectively. As for the specific energies (normalized to the weight of active materials only, defined as Li+ liquid reactant), the two C8 molecules exhibited slightly higher specific energies (1785 and 1700 Wh/$kg_{reactant}$ for Ph-CN—C8 (p) and Ph-$NO_2$—C8 (o), respectively) than that of the C6 molecule (1600 Wh/$kg_{reactant}$ for Ph-$NO_2$—C6 (o)). Notably, these numbers are already higher than the theoretical specific energy of $SOCl_2$, which is ~1470 Wh/$kg_{reactant}$, although it is important to note that $SOCl_2$-based batteries operate with neat $SOCl_2$ (i.e., without electrolyte diluents).

Figure 8A:
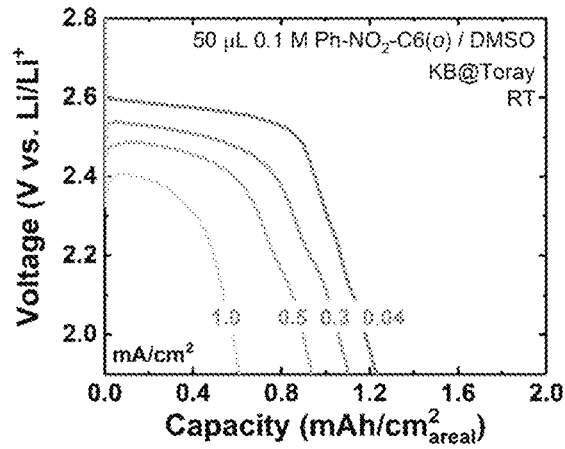
FIG. 8A shows, according to some embodiments, galvanostatic discharge profiles of a Li cell with 0.1 M Ph-NO$_2$—C6 (o)
Figure 8B:
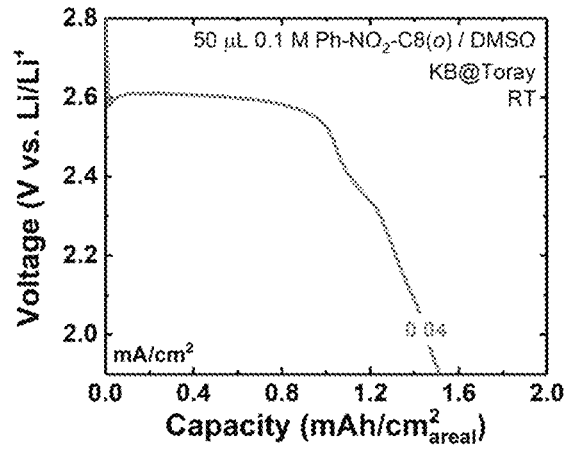
FIG. 8B shows, according to some embodiments, the galvanostatic discharge profile of a Li cell with 0.1 M Ph-NO$_2$—C8 (o)

The RT rate performances for Ph-$NO_2$—C6 (o) and Ph-$NO_2$—C8 (o) are shown in FIGS. 8A-8B. Although both reactants exhibited slightly lower capacities as compared with those obtained at 50° C. (at similar rates), good rate capabilities still persist at RT. The achievable specific energy densities at RT for Ph-$NO_2$—C6 (o) and Ph-$NO_2$—C8 (o) are 1470 and 1490 Wh/$kg_{reactant}$, respectively, which are also comparable with the theoretical energy density of $SOCl_2$.

To demonstrate that the C—F bonds were indeed reduced during discharge, the solid discharge products formed on carbon cathodes were characterized. Note that a non-fluorinated salt ($LiClO_4$) was used to avoid additional fluorine sources, thus the only fluorine sources are the fluoro-aromatics and the binder (polyvinylidene fluoride), the latter of which is well-known to be stable within the operating voltage window (1.9 V-3.0 V). Therefore, the formation of LiF will directly indicate the C—F bond-breaking process for the fluoro-aromatics.

Figure 9A:
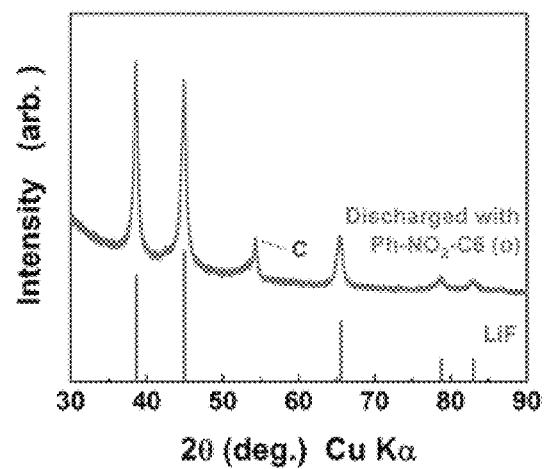
FIG. 9A shows, according to some embodiments, a powder X-ray diffraction (XRD) pattern of the fully discharged Kejten black (KB) electrode of a Li-Ph-NO$_2$—C6 (o) cell.
Figure 9B:
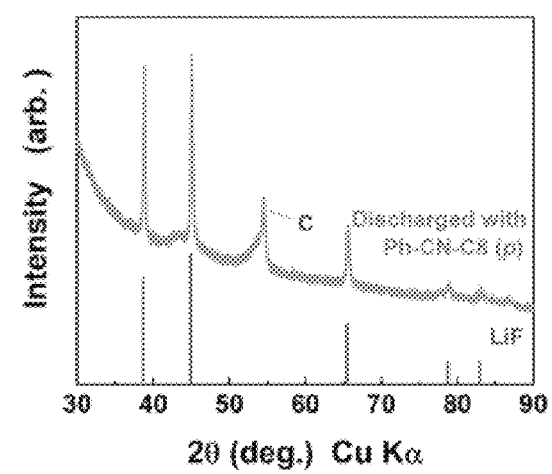
FIG. 9B shows, according to some embodiments, a powder XRD pattern of the fully discharged KB electrode of a Li-Ph-CN—C8 (p) cell.
Figures 10A, 10B, 10C:
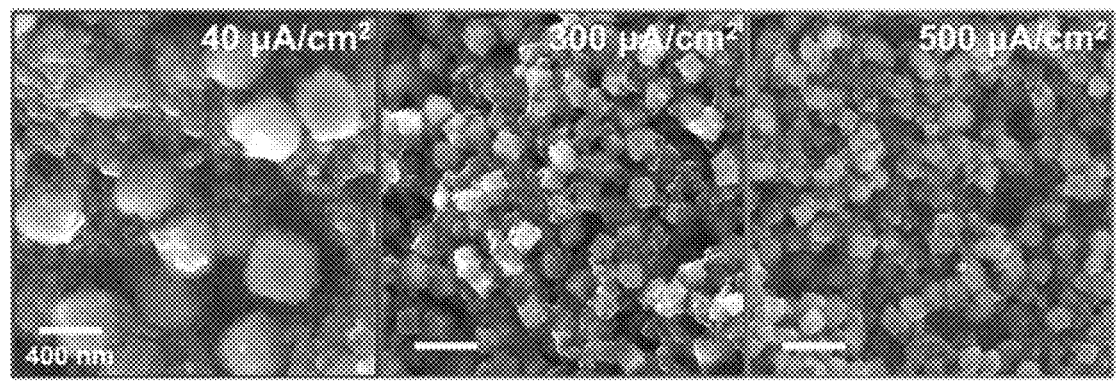
FIG. 10A shows, according to some embodiments, a scanning electron microscopy (SEM) image of a fully discharged KB electrode in a Li-Ph-CN—C8 (p) cell at 0.04 mA/cm$^2$.
FIG. 10B shows, according to some embodiments, a SEM image of a fully discharged KB electrode in a Li-Ph-CN—C8 (p) cell at 0.3 mA/cm$^2$.
FIG. 10C shows, according to some embodiments, a SEM image of a fully discharged KB electrode in a Li-Ph-CN—C8 (p) cell at 0.5 mA/cm$^2$.

As is shown in FIGS. 9A-9B, LiF is the only crystallized product that can be detected from X-ray powder diffraction (XRD) after Ph-CN—C8 (p) and Ph-$NO_2$—C6 (o) discharge. In addition, the morphology of LiF particles formed from Ph-CN—C8 (p) reduction was characterized using SEM. As shown in FIGS. 10A-10C, cubic LiF particles were formed on the carbon substrate, the size of which showed significant dependence on the discharge rates. As the current density increased from 40 to 500 μA/$cm^2$, for example, the average LiF particles sizes decreased from ~257±47 to ~93±17 nm, i.e., the larger the current density, the smaller the LiF particle sizes. It was concluded that C—F bond breaking is indeed triggered in the cell reduction reactions.

Figure 11:
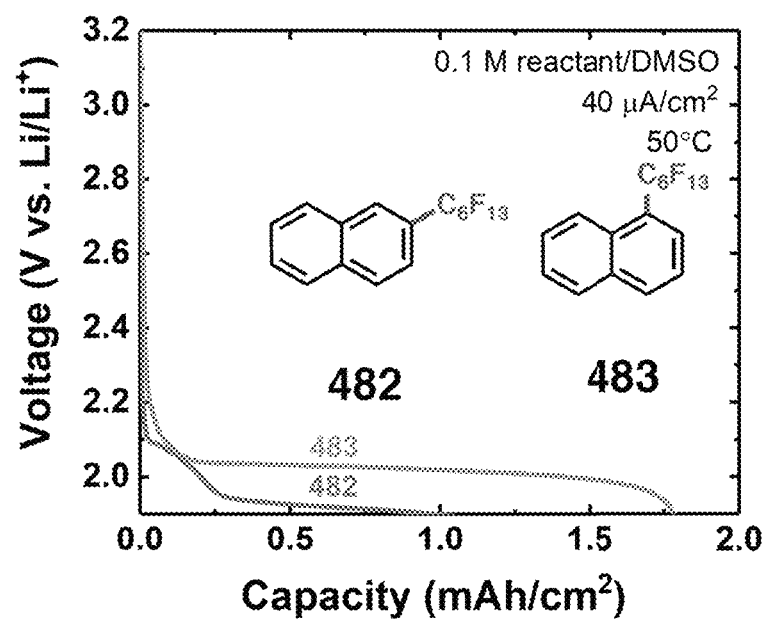
FIG. 11 shows, according to some embodiments, the galvanostatic discharge profile of a Li cell with 0.1 M fluoro-aromatic reactants comprising naphthalene functionalized with a fluoroalkane.

The discharge performance of fluoro-aromatics comprising greater than one aromatic group were also investigated. FIG. 11 shows, for example, the discharge profile of naphthalene molecules functionalized with fluoroalkane. The discharge profile in FIG. 11 was evaluated at 50° C.

Having demonstrated successful defluorination of the $R_F$ chain, it was next investigated whether a similar defluorination reaction could be triggered for other perfluorinated groups, such as a $SF_5$ group. Note that since $R_F$-containing aromatics with nitro groups tend to exhibit the highest discharge potential, the discharge of Ph-$NO_2$—$SF_5$ (p) was investigated, a commercially available reactant where the nitro and $SF_5$ group substitute two hydrogens on benzene at the para positions. As is shown in FIGS. 12A-12B, the discharge of Ph-$NO_2$—$SF_5$ (p) exhibits several different voltage plateaus at both temperatures tested (RT and 50° C.), and the discharge potential and attained capacities are slightly higher at higher temperature. For Ph-$NO_2$—$SF_5$, the attainable gravimetrical capacity and average voltage are 840 mAh/$g_{reactant}$ and 2.6 V at 50° C., resulting in a high energy density of ~2190 Wh/$kg_{reactant}$, even higher than that achievable with the $R_F$-containing aromatics (~1700 Wh/$kg_{reactant}$). To gain more understanding on the step-wise reduction process, the discharge profile at 40 μA/$cm^2$ and 50° C. was further analyzed (see FIG. 12B), with the low current being closest to equilibrium among the conditions examined. There are two major regions in the discharge curve. The first region has a flat voltage plateau at 2.9 V and contributes >60% of the total capacity, which corresponds to ~5 $e^-$ per molecule. The second region has several different voltage steps with a capacity of ~3 $e^-$ per molecule, making it 8 $e^-$ (calculated based on capacity) transfer in total. It was hypothesized that the first plateau can be attributed to the breaking of the five S—F bonds in the $SF_5$ group, while the second part is a reflective of sulfur reduction, since the multistep profile is very similar to that of S reduction (through polysulfide to $Li_2S$) observed in Li—S batteries.

The morphology of LiF particles formed from reduction of Ph-$NO_2$—$SF_5$ was characterized by SEM. See, for example FIGS. 13A-13C.

Figure 14A:
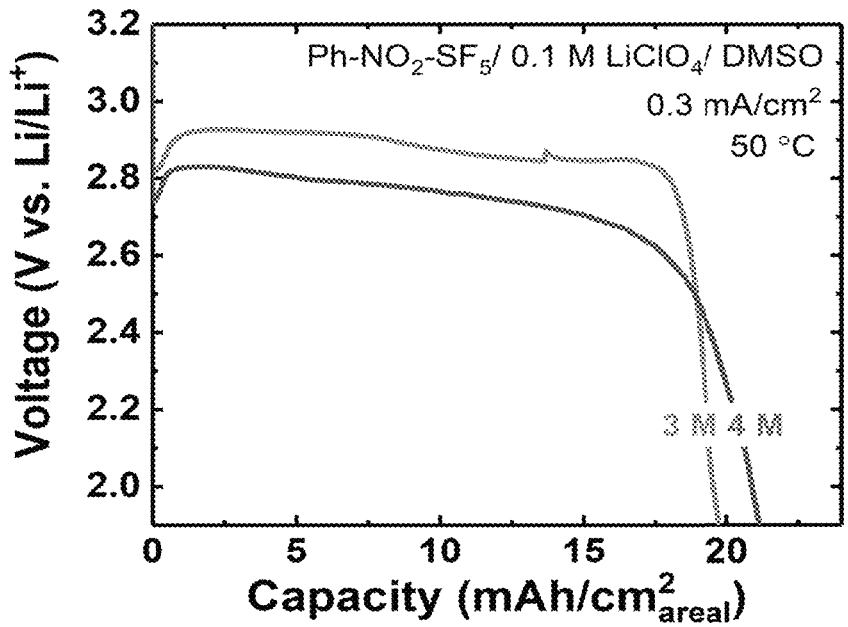
FIG. 14A shows, according to some embodiments, the galvanostatic discharge profile of high concentration Ph-NO$_2$—SF$_5$ cells at 50° C.
Figure 14B:
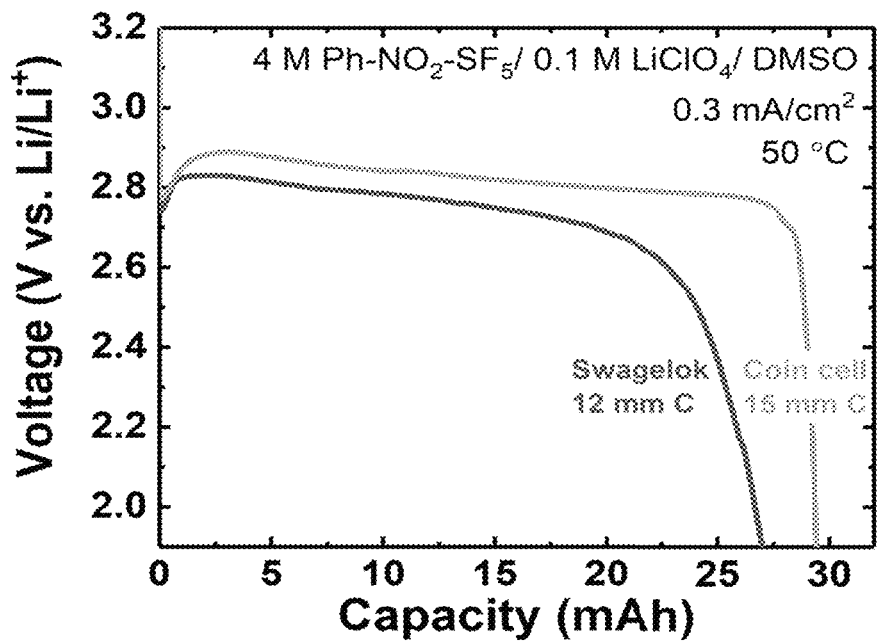
FIG. 14B shows, according to some embodiments, the galvanostatic discharge profile of 4 M Ph-NO$_2$—SF$_5$ cells at 50° C. with a 15 mm diameter carbon cathode.
Figure 14C:
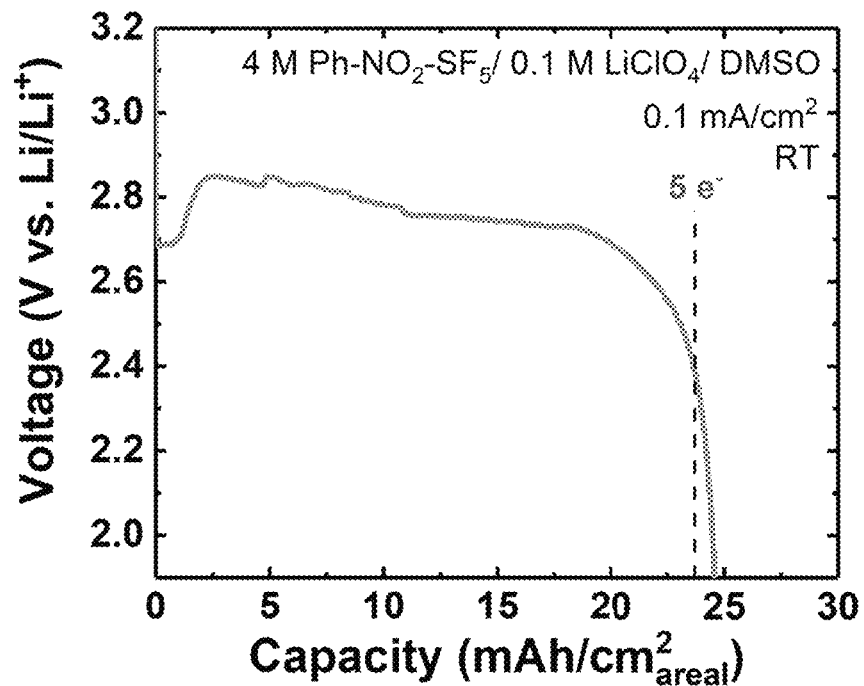
FIG. 14C shows, according to some embodiments, the galvanostatic discharge profile of 4 M Ph-NO$_2$—SF$_5$ cells at RT.
Figure 14D:
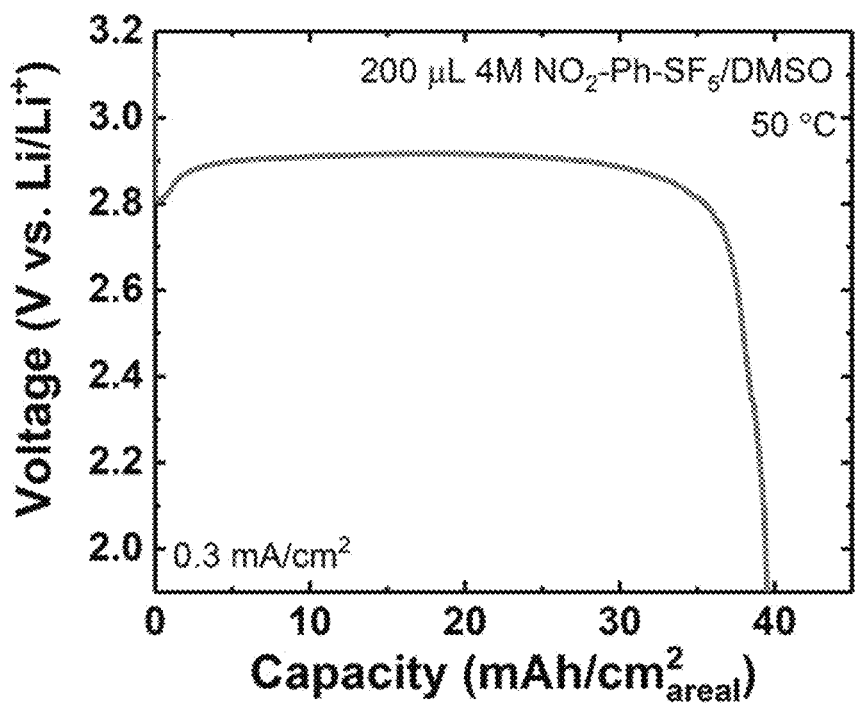
FIG. 14D shows, according to some embodiments, the galvanostatic discharge profile of 4 M Ph-NO$_2$—SF$_5$ cells at 50° C.

The galvanostatic discharge profiles of high concentration (i.e., 3-4 M) Ph-NO$_2$—SF$_5$ cells was also evaluated. FIG. 14A shows the galvanostatic discharge performances of high concentration Ph-NO$_2$—SF$_5$ cells at 0.3 mA/cm$^2$ and 50° C. The cells utilized 3 M or 4 M (as indicated) Ph-NO$_2$—SF$_5$ in 0.1 M LiClO$_4$/DMSO as electrolyte, and carbon cathode substrates (12 mm diameter) with a carbon loading of 5 mg/cm$^2$. FIG. 14B shows the galvanostatic discharge performances of high concentration Ph-NO$_2$—SF$_5$ cells at 0.3 mA/cm$^2$ and 50° C. The cells utilized 4 M Ph-NO$_2$—SF$_5$ in 0.1 M LiClO$_4$/DMSO as electrolyte, and carbon cathode substrates with a carbon loading of 5 mg/cm$^2$. To get better gravimetric performance, a larger cathode substrate (15 mm diameter) was used, thus the unity of the capacity is mAh instead of mAh/cm$^2$. FIG. 14C shows the galvanostatic discharge performance of high concentration Ph-NO$_2$—SF$_5$ cells at 0.1 mA/cm$^2$ and RT. The cells utilized 4 M Ph-NO$_2$—SF$_5$ in 0.1 M LiClO$_4$/DMSO as electrolyte, and carbon cathode substrates (12 mm diameter) with a carbon loading of 5 mg/cm$^2$. In addition, FIG. 14D shows the galvanostatic discharge performance of high concentration Ph-NO$_2$—SF$_5$ cells at 0.3 mA/cm$^2$ and 50° C. The cells utilized 200 µL 4 M Ph-NO$_2$—SF$_5$ in 0.2 M LiClO$_4$/DMSO as electrolyte, and carbon cathode substrates (15 mm diameter) with a carbon loading of 5 mg/cm$^2$.

Figure 15:
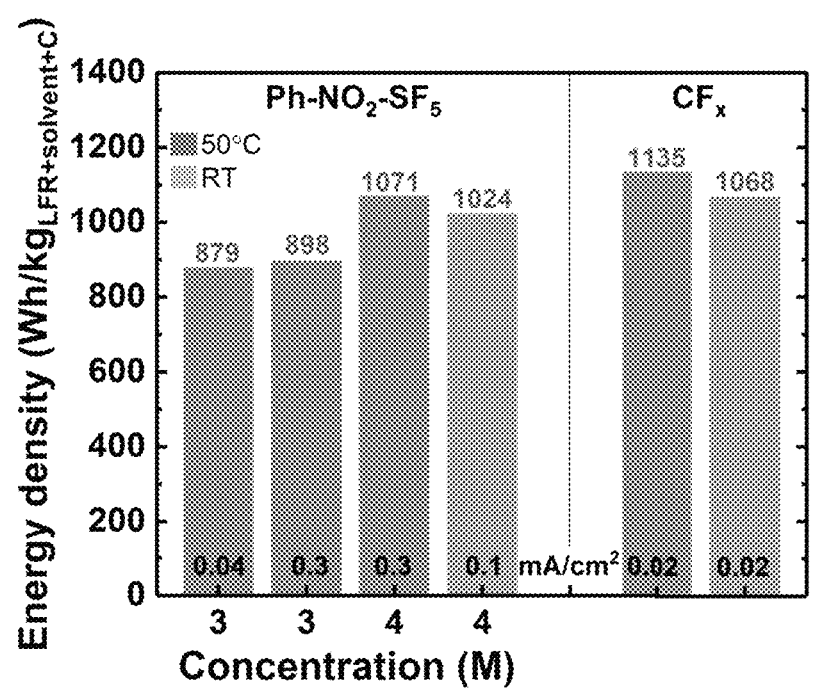
FIG. 15 shows, according to some embodiments, the attained energy density of Ph-NO$_2$—SF$_5$ cells in comparison with CF$_x$ systems.

FIG. 15 shows the attained energy density of Ph-NO$_2$—SF$_5$ cells compared to CF$_x$ systems. The energy densities were normalized to the weight of the active material, electrolyte, solvent, and carbon. The data for CF$_x$ was measured using thin CF$_x$ electrodes (loading ~1 mg/cm$^2$), which were prepared using purchased CF$_x$ powders.

For the disclosed Li-fluoro-aromatic batteries to be comparable with the state-of-the-art Li—CF$_x$ batteries, higher reactant concentrations (>2 M) are needed. With a concentration of 0.1 M, DMSO would weigh 20× higher than the reactants, therefore the energy densities normalized to the weight of active materials and electrolyte will be low. In contrast, if a reactant concentration of 2 M for the R$_F$-containing aromatics and 4 M for SF$_5$-containing aromatics is assumed (so that DMSO/reactant=0.4:1 w/w) with similar discharge performances (11, 15, and 8 e$^-$ transfer per molecule for C6, C8, and SF$_5$ reactants, respectively) still obtained, then energy densities will be greatly increased to >1000 Wh/kg$_{active\ material+\ electrolyte}$ (see FIG. 16). Note that these numbers for high reactant concentrations were directly extrapolated from that at low concentrations.

Figure 16:
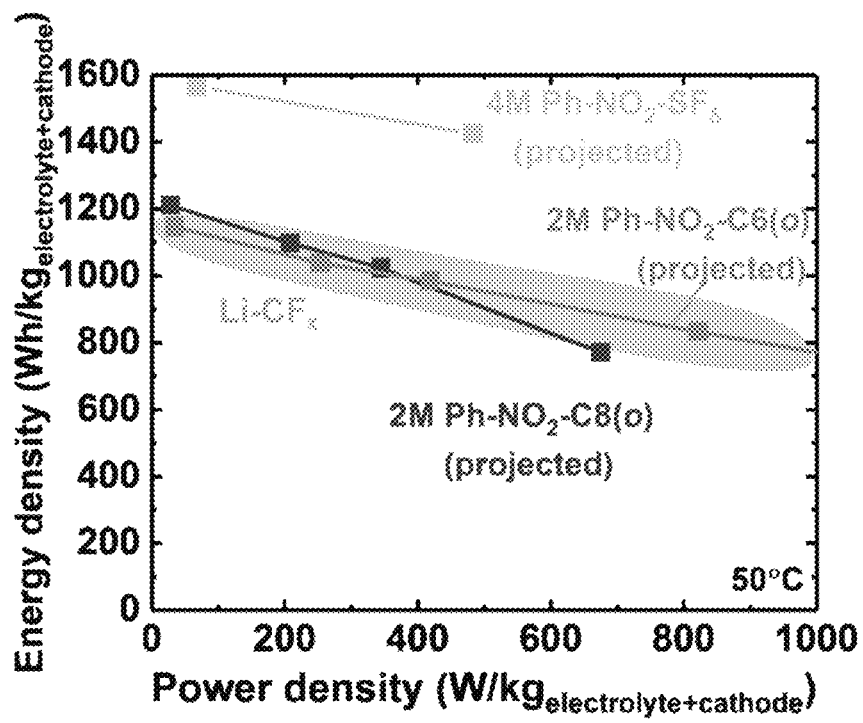
FIG. 16 shows, according to some embodiments, a Ragone plot comparing the discharge performances of Li-fluoro-aromatic cells and Li—CF$_x$ cells at 50° C.

To evaluate the potentials of the disclosed system, the high concentration performances were compared with the state-of-the-art Li—CF$_x$ batteries. The discharge performance of Li—CF$_x$ cells were measured at 50° C. with purchased CF$_x$ powder (coating on Toray paper substrate). Since the laboratory scale cells need excess amount of electrolyte, and the electrolyte weight are typically not reported for commercialized Li—CF$_x$ batteries, a CF$_x$-to-electrolyte weight ratio of 1:1 was assumed and the obtained gravimetric energy densities (based on CF$_x$ weight) were normalized to the weight of electrolyte+CF$_x$ for fair comparisons. It is worth noting that this electrolyte/CF$_x$ weight ratio is a typical value reported in CF$_x$ batteries, and thus is a reasonable assumption to represent commercial CF$_x$ cells. As is shown in FIG. 16, with a fluoro-aromatic concentration of 2 M or 4 M, it is assumed that the cell will exhibit energy densities comparable to or better than that of the Li—CF$_x$ batteries for R$_F$-containing (~1100 Wh/kg) and SF$_5$-containing (~1500 Wh/kg) aromatics, respectively.

As explained herein, Li-perfluorinated gas batteries, such as Li—SF$_6$ and Li—NF$_3$ systems, exhibit high theoretical energy densities (3922 Wh/kg and 5072 Wh/kg for SF$_6$ and NF$_3$ respectively) and high chemical stabilities, and thus are promising electrochemically-active components for primary battery applications. The gaseous molecules, however, have low solubility in the non-aqueous electrolytes and an electrode adsorption process is required before the molecules can be successfully reduced, which is challenging with symmetric perfluorinated (i.e., inert) reactants. Therefore, large overpotentials were observed during discharge. A second practical consideration is that the gaseous systems also require a gaseous headspace in the electrochemical cell set up, which may further burden the cell-level energy densities.

To address these issues, Li-perfluoroalkyl iodide batteries were developed that utilize fluorinated liquids as cathodes. The commercially available reactants, which have an R$_F$ chain directly connect to an iodine (I) in each molecule, are widely used as building blocks in organic synthesis. The reactants were used as model systems to demonstrate that the RT reduction of the R$_F$ chain is achievable at high potentials (up to 3.0 V) and in a single cell setup. The close-to-full defluorination of the reactants, however, was not achieved. Therefore, further optimizations are still needed for the Li-perfluoroalkyl iodide batteries to be feasible for practical applications.

The systems described herein utilizing fluoro-aromatics as cathodes exhibit the following advantages, including high energy density, improved rate capability, and more design flexibility.

Regarding high energy density, the close-to-full defluorination of fluoro-aromatics can be achieved at practical discharge conditions (e.g., 0.3 mA/cm$^2$), yielding 8-15 e$^-$ transfer per molecule and relatively high discharge potentials (—2.6 V). As a result, high achievable specific energies (up to, for example, 2190 Wh/kg$_{reactant}$ for NO$_2$-Ph-SF$_5$) were observed, making the fluoro-aromatics a strong competitor for high-energy Li primary battery cathodes. By tuning the molecular structure, high solubility (>2 M) were attained (for Ph-NO$_2$—C6 (o) and Ph-NO$_2$—C8 (o)). Therefore, it is reasonable to believe that cell-level energy densities comparable or even higher than that of Li—CF$_x$ batteries may be achieved.

Regarding improved rate capability, since the fluoro-aromatics are in the liquid phase (dissolved in the electrolyte), transport-related kinetics will be more favored than that of CF$_x$. In addition, high reactant concentrations are allowed in the disclosed system, which can reduce overpotentials arising from the low concentrations in other existing metal-gas batteries.

Regarding more design flexibility, the molecular structures of the aforementioned commercialized cathodes are relatively simple and hard to modify, thus to improve the cell performances, one needs to focus on other cell components, such as electrolytes, supporting carbon, or catalysts. In contrast, fluoro-aromatic molecules allow multiple types of modification (ring structure, substituent type and position, R$_F$ chain length, fluorinated group species, etc.), which can directly affect the reduction nature of these molecules. This not only provides more opportunities for electrochemical performance improvement, but also serves as a new platform to investigate fluoride bond reduction, thus bring more scientific insights to chemical and electrochemical research.

Furthermore, the role of the 7c-electrons and substituents in the fluoro-aromatics is critical to achieve the full reduction and hence the optimal energy density. This enhancement may be the result of increased charge transport and potentially creating transient or persistent carbon containing products that facilitate charge transport. Optimizing interfacial interactions between the flouro-aromatics and the anode is also key, and fluorine materials can display what is known as the fluorous-effect, wherein they become immiscible with other organic materials and may not optimally wet the interface with the electrode. For optimal charge injection, these interfaces can be modified with groups containing perfluoroalkanes or perfluoro-aromatics. It is also shown that different substituents attached to the aromatic rings can give different discharge characteristics. In some embodiments, a mixture of different reducible fluoro-aromatics will provide for the desired performance. Considerations include long-term stability, power output, and energy density.

The disclosed fluoro-aromatic battery systems have the potential to deliver high cell-level energy densities with high rate capabilities, comparable to or even better than that of the state-of-the-art Li—$CF_x$ batteries. As such, the technology is of high value for implantable devices (e.g., cardiac pacemakers), on-ship power, remote human operation (e.g., space exploration), memory or emergency backups, military applications, and other electronic devices.

Example 2

The following example describes the experimental methods and the synthesis of $R_F$-containing aromatics.

All chemical reagents were purchased from MilliporeSigma, Synquest Laboratories, Oakwood Chemicals, or TCI, and used without purification unless noted otherwise. Thin-layer chromatography was performed with Baker-flex Silica Gel 1B-F plates (JT Baker). Flash chromatography was performed using technical grade silica gel with 60 Å pores and 230-400 mesh particle size (Sigma-Aldrich, 717185).

$^1H$, $^{13}C$, and $^{19}F$ nuclear magnetic resonance (NMR) spectra were recorded on a JEOL model JNM-ECZ500R/S1 spectrometer operating at 500, 126, and 471 MHz, respectively. For $^1H$ and $^{13}C$ NMR spectra, deuterated solvent references were used as internal standards ($^1H$: 7.26 ppm for $CDCl_3$; $^{13}C$: 77.16 ppm for $CDCl_3$). Direct analysis in real time (DART) mass spectra were obtained at the MIT Department of Chemistry Instrumentation Facility.

Figure 17A:
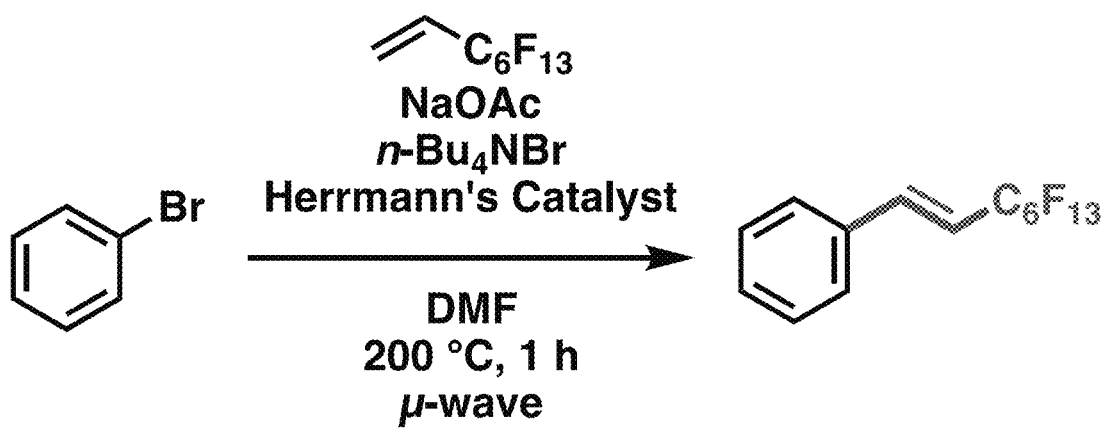
FIG. 17A shows, according to some embodiments, a scheme of the synthesis of the compound Ph-H—C6.

Synthesis of compound Ph-H—C6, as shown in FIG. 17A: A mixture of bromobenzene (313 mg, 1.99 mmol), 1H,1H,2H-perfluoro-1-octene (1.04 g, 2.99 mmol), NaOAc (255 mg, 3.11 mmol), n-Bu4NBr (553 mg, 1.72 mmol), and Herrmann's catalyst (98 mg, 0.105 mmol) was dissolved in DMF (10 mL), and the reaction mixture was stirred for 1 h at 200° C. in a microwave reactor. Upon cooling the reaction mixture to RT, the residue was dissolved in AcOEt (50 mL) and 1 M HCl (50 mL). The organic layer was separated, washed with water (50 mL×3) and brine (50 mL), dried with $MgSO_4$, and evaporated to dryness under reduced pressure. The residue was chromatographed on silica gel using hexanes as eluent, and the fraction containing compound Ph-H—C6 ($R_f$=0.50 in hexanes) was collected and evaporated to dryness to provide a colorless oil (490 mg, 1.16 mmol, 58% yield).

Figure 17B:
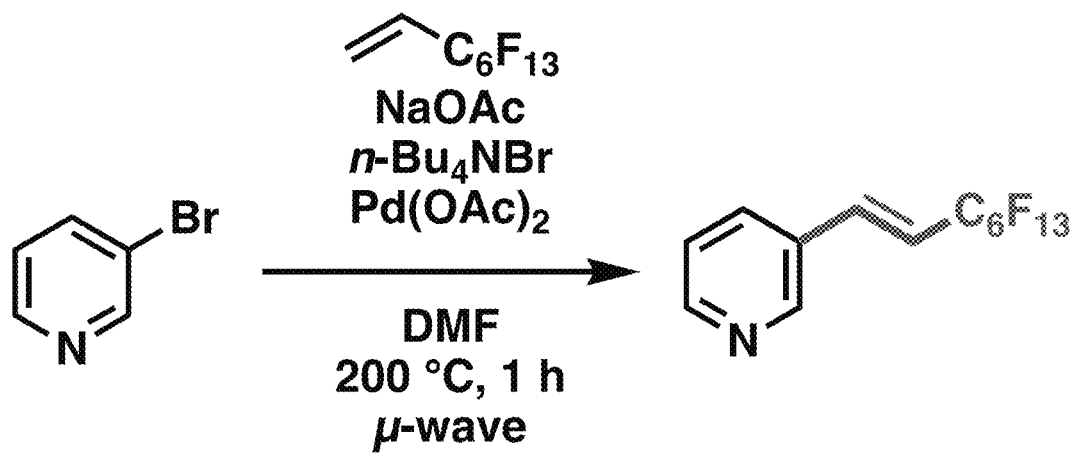
FIG. 17B shows, according to some embodiments, a scheme of the synthesis of the compound Py-C6.

Synthesis of compound Py-C6, as shown in FIG. 17B: A mixture of 3-bromopyridine (316 mg, 2.00 mmol), 1H,1H,2H-perfluoro-1-octene (1.06 g, 3.06 mmol), NaOAc (254 mg, 3.10 mmol), n-Bu4NBr (548 mg, 1.70 mmol), and Pd(OAc)$_2$ (23 mg, 0.102 mmol) was dissolved in DMF (10 mL), and the reaction mixture was stirred for 1 h at 200° C. in a microwave reactor. Upon cooling the reaction mixture to RT, the residue was dissolved in AcOEt (50 mL) and $H_2O$ (50 mL). The organic layer was separated, washed with water (50 mL×3) and brine (50 mL), dried with $MgSO_4$, and evaporated to dryness under reduced pressure. The residue was chromatographed on silica gel using $CH_2Cl_2$ as eluent, and the fraction containing compound Py-C6 ($R_f$=0.45 in $CH_2Cl_2$) was collected and evaporated to dryness to provide a colorless oil (260 mg, 0.614 mmol, 31% yield).

Figure 17C:
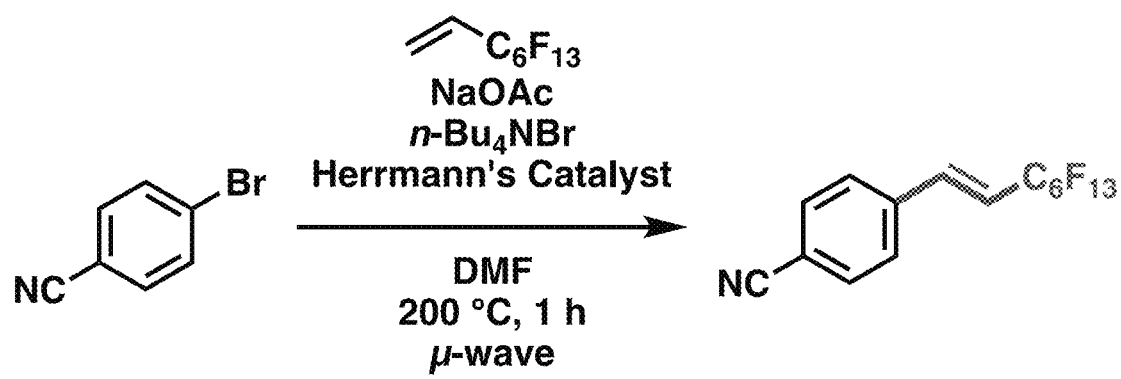
FIG. 17C shows, according to some embodiments, a scheme of the synthesis of the compound Ph-CN—C6 (p)

Synthesis of Compound Ph-CN—C6 (p), as shown in FIG. 17C: A mixture of 4-bromobenzonitrile (362 mg, 1.99 mmol), 1H,1H,2H-perfluoro-1-octene (1.04 g, 3.00 mmol), NaOAc (246 mg, 3.00 mmol), n-Bu4NBr (540 mg, 1.68 mmol), and Herrmann's catalyst (75 mg, 0.080 mmol) was dissolved in DMF (10 mL), and the reaction mixture was stirred for 1 h at 200° C. in a microwave reactor. Upon cooling the reaction mixture to RT, the residue was dissolved in AcOEt (50 mL) and 1 M HCl (50 mL). The organic layer was separated, washed with water (50 mL×3) and brine (50 mL), dried with $MgSO_4$, and evaporated to dryness under reduced pressure. The residue was chromatographed on silica gel using hexanes with a gradient of 1%→5% $CH_2Cl_2$ as eluent, and the fraction containing compound Ph-CN—C6 (p) ($R_f$=0.35 in hexanes, 33% $CH_2Cl_2$) was collected and evaporated to dryness to provide a beige solid (380 mg, 0.850 mmol, 43% yield).

Figure 17D:
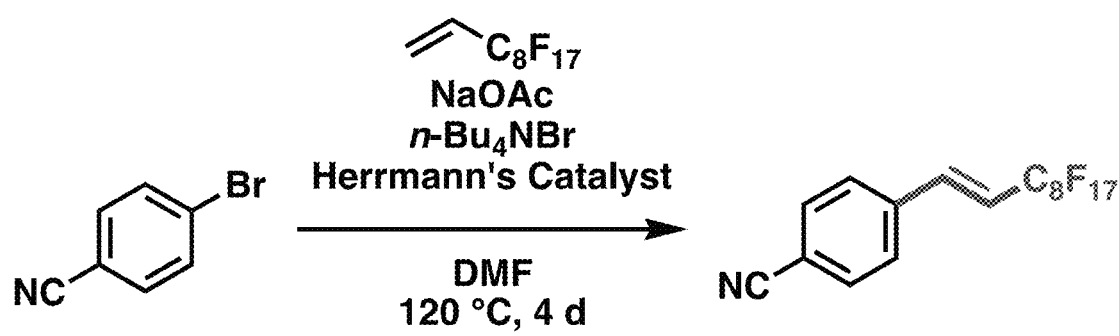
FIG. 17D shows, according to some embodiments, a scheme of the synthesis of the compound Ph-CN—C8 (p)

Synthesis of Compound Ph-CN—C8 (p), as shown in FIG. 17D: A mixture of 4-bromobenzonitrile (364 mg, 2.00 mmol), 1H,1H,2H-perfluoro-1-decene (1.34 g, 3.00 mmol), NaOAc (246 mg, 3.00 mmol), n-Bu4NBr (548 mg, 1.70 mmol), and Herrmann's catalyst (94 mg, 0.100 mmol) was dissolved in DMF (10 mL), and the reaction mixture was stirred for 4 d at 120° C. Upon cooling the reaction mixture to RT, the residue was dissolved in AcOEt (50 mL) and 1 M HCl (50 mL). The organic layer was separated, washed with water (50 mL×3) and brine (50 mL), dried with $MgSO_4$, and evaporated to dryness under reduced pressure. The residue was chromatographed on silica gel using hexanes, 33% $CH_2Cl_2$ as eluent, and the fraction containing compound Ph-CN—C8 (p) ($R_f$=0.30 in hexanes, 33% $CH_2Cl_2$) was collected and evaporated to dryness to provide a white solid (850 mg, 1.55 mmol, 78% yield).

Figure 17E:
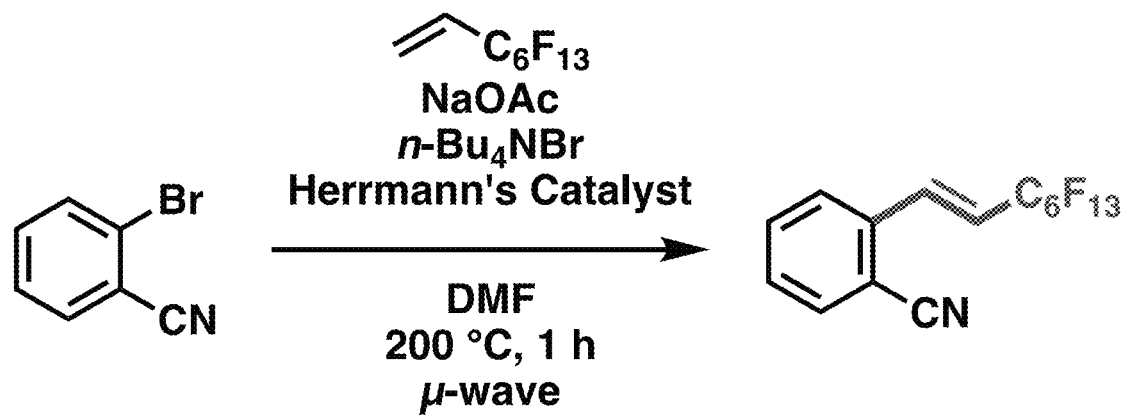
FIG. 17E shows, according to some embodiments, a scheme of the synthesis of the compound Ph-CN—C6 (o)

Synthesis of Compound Ph-CN—C6 (o), as shown in FIG. 17E: A mixture of 2-bromobenzonitrile (364 mg, 2.00 mmol), 1H,1H,2H-perfluoro-1-octene (1.04 g, 3.00 mmol), NaOAc (246 mg, 3.00 mmol), n-Bu4NBr (548 mg, 1.70 mmol), and Herrmann's catalyst (94 mg, 0.100 mmol) was dissolved in DMF (10 mL), and the reaction mixture was stirred for 1 h at 200° C. in a microwave reactor. Upon cooling the reaction mixture to RT, the residue was dissolved in AcOEt (50 mL) and 1 M HCl (50 mL). The organic layer was separated, washed with water (50 mL×3) and brine (50 mL), dried with $MgSO_4$, and evaporated to dryness under reduced pressure. The residue was chromatographed on silica gel using hexanes, 33% $CH_2Cl_2$ as eluent, and the fraction containing compound Ph-CN—C6 (o) ($R_f$=0.30 in hexanes, 33% $CH_2Cl_2$) was collected and evaporated to dryness to provide a colorless oil (700 mg, 1.57 mmol, 78% yield).

Figure 17F:
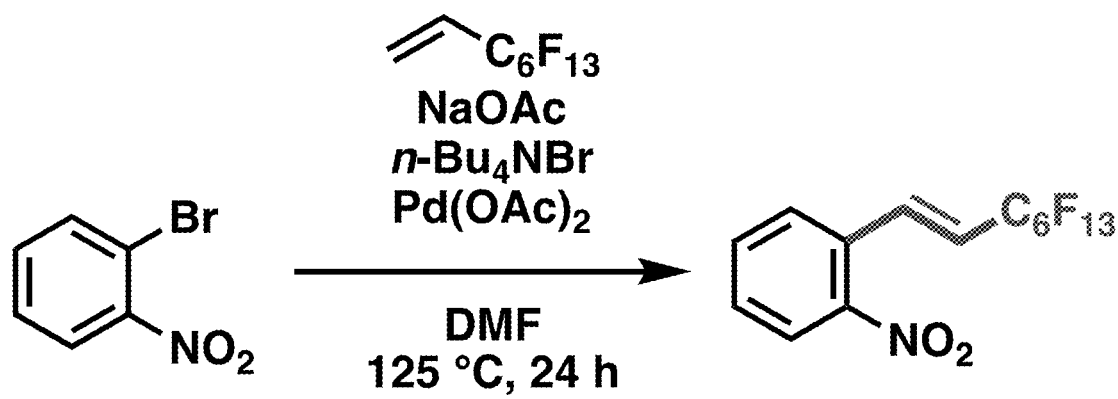
FIG. 17F shows, according to some embodiments, a scheme of the synthesis of the compound Ph-NO$_2$—C6 (o)

Synthesis of Compound Ph-$NO_2$—C6 (o), as shown in FIG. 17F: A mixture of 1-bromo-2-nitrobenzene (2.02 g, 10.0 mmol), 1H,1H,2H-perfluoro-1-octene (5.19 g, 15.0 mmol), NaOAc (1.23 g, 15.0 mmol), n-Bu4NBr (2.74 g, 8.50 mmol), and Pd(OAc)$_2$ (112 mg, 0.499 mmol) was dissolved in DMF (10 mL), and the reaction mixture was stirred for 24 h at 125° C. Upon cooling the reaction mixture to RT, the residue was dissolved in AcOEt (50 mL) and 1 M HCl (50 mL). The organic layer was separated, washed with water (50 mL×3) and brine (50 mL), dried with $MgSO_4$, and evaporated to dryness under reduced pressure. The residue was chromatographed on silica gel using hexanes with a gradient of 1%→5% $CH_2Cl_2$ as eluent, and the fraction containing compound Ph-$NO_2$—C6 (o) ($R_f$=0.55 in hexanes, 33% $CH_2Cl_2$) was collected and evaporated to dryness to provide a colorless oil (1.70 g, 3.64 mmol, 36% yield).

Figure 17G:
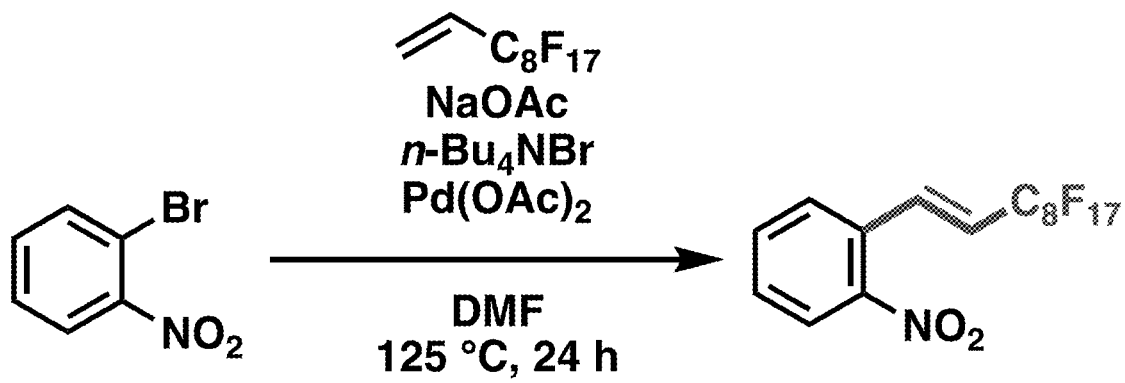
FIG. 17G shows, according to some embodiments, a scheme of the synthesis of the compound Ph-NO$_2$—C8 (o)

Synthesis of Compound Ph-$NO_2$—C8 (o), as shown in FIG. 17G: A mixture of 1-bromo-2-nitrobenzene (2.02 g, 10.0 mmol), 1H,1H,2H-perfluoro-1-octene (5.19 g, 15.0 mmol), NaOAc (1.23 g, 15.0 mmol), n-Bu4NBr (2.74 g, 8.50 mmol), and Pd(OAc)$_2$ (112 mg, 0.499 mmol) was dissolved in DMF (10 mL), and the reaction mixture was stirred for 24 h at 125° C. Upon cooling the reaction mixture to RT, the residue was dissolved in AcOEt (50 mL) and 1 M HCl (50 mL). The organic layer was separated, washed with water (50 mL×3) and brine (50 mL), dried with $MgSO_4$, and evaporated to dryness under reduced pressure. The residue was chromatographed on silica gel using hexanes with a gradient of 1%→5% $CH_2Cl_2$ as eluent, and the fraction containing compound Ph-$NO_2$—C8 (o) ($R_f$=0.55 in hexanes, 33% $CH_2Cl_2$) was collected and evaporated to dryness to provide a white solid (3.92 g, 6.95 mmol, 69% yield).

Figure 17H:
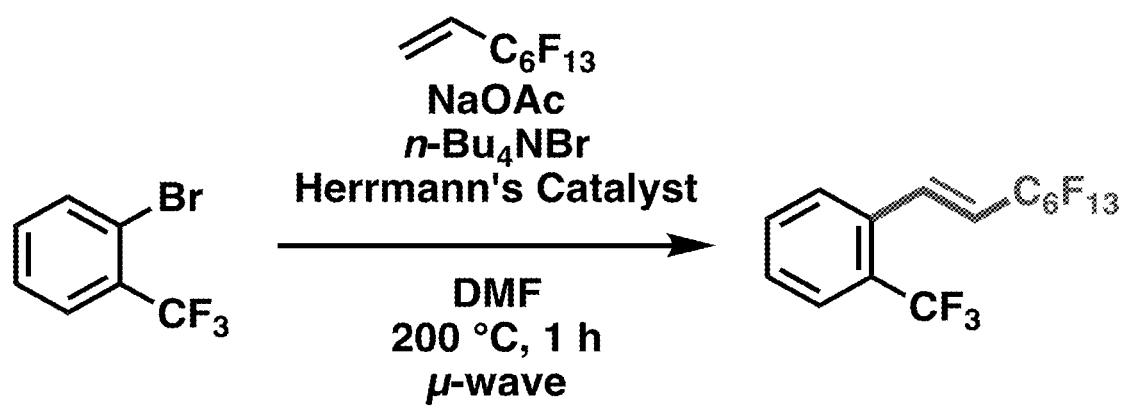
FIG. 17H shows, according to some embodiments, a scheme of the synthesis of the compound Ph-CF$_3$—C6 (o)
Figure 17I:
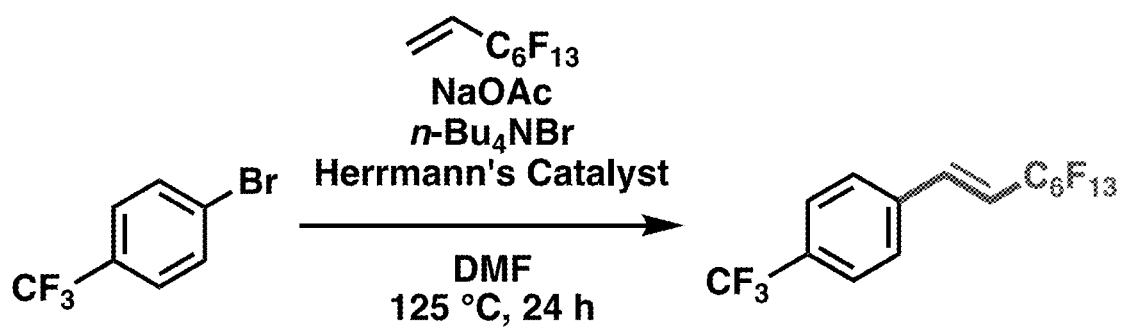
FIG. 17I shows, according to some embodiments, a scheme of the synthesis of the compound Ph-CF$_3$—C6 (p)
Figure 17J:
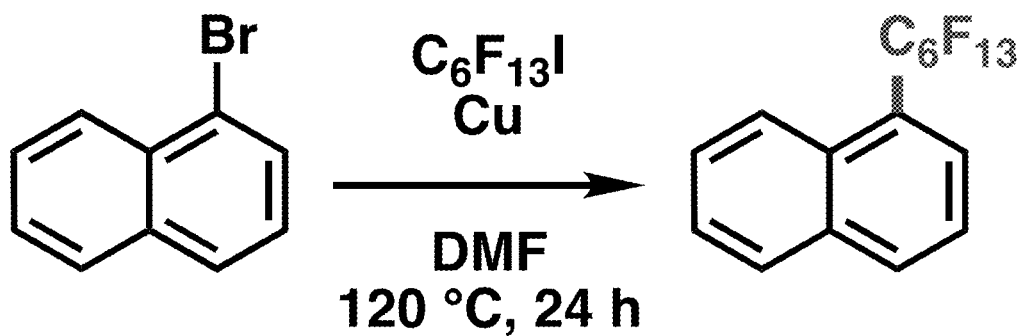
FIG. 17J shows, according to some embodiments, a scheme of the synthesis of the compound 1-Naph-C6.
Figure 17K:
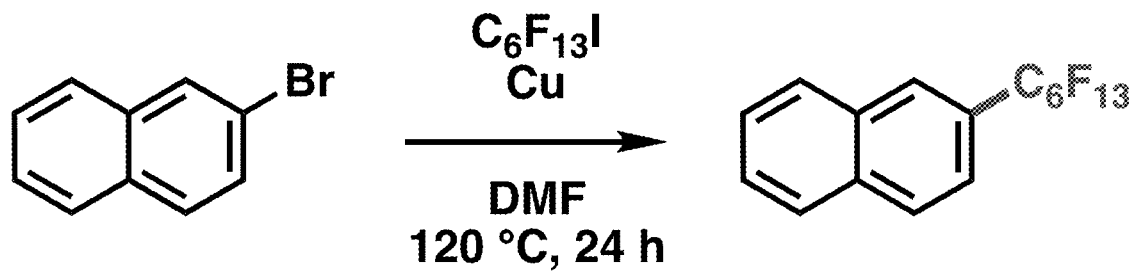
FIG. 17K shows, according to some embodiments, a scheme of the synthesis of the compound 2-Naph-C6.

Synthesis of Compound Ph-$CF_3$—C6 (o), as shown in FIG. 17H: A mixture of 2-bromobenzotrifluoride (450 mg, 2.00 mmol), 1H,1H,2H-perfluoro-1-octene (1.01 g, 2.92 mmol), NaOAc (250 mg, 3.05 mmol), n-Bu4NBr (540 mg, 1.68 mmol), and Herrmann's catalyst (94 mg, 0.100 mmol) was dissolved in DMF (10 mL), and the reaction mixture was stirred for 1 h at 200° C. in a microwave reactor. Upon cooling the reaction mixture to RT, the residue was dissolved in AcOEt (50 mL) and 1 M HCl (50 mL). The organic layer was separated, washed with water (50 mL×3) and brine (50 mL), dried with $MgSO_4$, and evaporated to dryness under reduced pressure. The residue was chromatographed on silica gel using hexanes as eluent, and the fraction containing compound Ph-$CF_3$—C6 (o) ($R_f$=0.50 in hexanes) was collected and evaporated to dryness to provide a colorless oil (574 mg, 1.17 mmol, 59% yield).

Synthesis of Compound Ph-$CF_3$—C6 (p), as shown in FIG. 17L A mixture of 4-bromobenzotrifluoride (450 mg, 2.00 mmol), 1H,1H,2H-perfluoro-1-octene (1.04 g, 3.00 mmol), NaOAc (246 mg, 3.00 mmol), n-Bu4NBr (540 mg, 1.68 mmol), and Herrmann's catalyst (94 mg, 0.100 mmol) was dissolved in DMF (10 mL), and the reaction mixture was stirred for 24 h at 125° C. Upon cooling the reaction mixture to RT, the residue was dissolved in AcOEt (50 mL) and 1 M HCl (50 mL). The organic layer was separated, washed with water (50 mL×3) and brine (50 mL), dried with $MgSO_4$, and evaporated to dryness under reduced pressure. The residue was chromatographed on silica gel using hexanes as eluent, and the fraction containing compound Ph-$CF_3$—C6 (p) ($R_f$=0.50 in hexanes) was collected and evaporated to dryness to provide a colorless oil (930 mg, 1.90 mmol, 95% yield).

Synthesis of Compound 1-Naph-C6, as shown in FIG. 14J: A mixture of 1-bromonaphthalene (1.24 g, 6.00 mmol), perfluorohexyl iodide (3.48 g, 7.80 mmol), and copper (powder, <75 μm, 1.00 g, 15.6 mmol) was dissolved in DMF (10 mL), and the reaction mixture was stirred for 24 hours at 120° C. Upon cooling the reaction mixture to RT, the residue was dissolved in AcOEt (50 mL) and 1 M HCl (50 mL). The organic layer was separated, washed with water (50 mL×3) and brine (50 mL), dried with $MgSO_4$, and evaporated to dryness under reduced pressure. The residue was chromatographed on silica gel using hexanes as eluent, and the fraction containing compound 1-Naph-C6 ($R_f$=0.55 in hexanes) was collected and evaporated to dryness to provide a colorless oil (1.12 g, 2.51 mmol, 42% yield).

Synthesis of Compound 2-Naph-C6, as shown in FIG. 14K: A mixture of 2-bromonaphthalene (1.24 g, 6.00 mmol), perfluorohexyl iodide (3.48 g, 7.80 mmol), and copper (powder, <75 μm, 1.00 g, 15.6 mmol) was dissolved in DMF (10 mL), and the reaction mixture was stirred for 24 hours at 120° C. Upon cooling the reaction mixture to RT, the residue was dissolved in AcOEt (50 mL) and 1 M HCl (50 mL). The organic layer was separated, washed with water (50 mL×3) and brine (50 mL), dried with $MgSO_4$, and evaporated to dryness under reduced pressure. The residue was chromatographed on silica gel using hexanes as eluent, and the fraction containing compound 1-Naph-C6 ($R_f$=0.55 in hexanes) was collected and evaporated to dryness to provide a white solid (600 mg, 1.34 mmol, 22% yield).

All electrodes and cell-making materials were stored in an argon-filled glovebox ($H_2O$ content <1 ppm, $O_2$ content <1 ppm, MBRAUN) after dried. $LiClO_4$ (99.99% trace metals basis, Sigma-Aldrich), stainless steel mesh (316 stainless steel, McMaster) and the Whatman filter paper (Grade QM-A, 2.2 μm pore size, 450 μm in thickness, Sigma Aldrich) were dried in a Buchi glass oven under active vacuum for 24 hours at 120° C. DMSO (anhydrous, >99.9%, Sigma-Aldrich) and 4-Nitrophenylsulfur pentafluoride (Ph-$NO_2$—$SF_5$ (p), 97%, Synquest) were stored inside the glovebox at RT.

The Kejten black (KB) electrodes were fabricated in-house by uniformly coating sonicated inks composed of KB (AzkoNobel) powder, N-Methyl-2-pyrrolidone (NMP), and polyvinylidene difluoride (PVDF) (with a weight ratio of KB:PVDF=80:20) onto a sheet of Toray paper (TGP-H-030, Fuel cell earth). After being air-dried at RT, the obtained KB coated Toray paper was punched into circular disks (12 mm diameter) and then dried under active vacuum in a glass oven (Buchi) overnight at 90° C.

Two-electrode Swagelok-type Li cells were constructed in an argon glovebox, with the dried KB cathode and a 9 mm diameter disk of Li metal as anode (0.75 mm thick, 99.9% metals basis, Alfa Aesar), which was pre-stabilized by soaking in pure $C_6F_{13}I$ (99%, Sigma-Aldrich) for at least three days prior to use. The separator (13 mm diameter glass fiber filter paper) was impregnated with 50 μL electrolyte solution (as indicated in text). The cells were rested at open circuit voltage (OCV) for 5 h before the galvanostatic discharge tests, which were carried out (BioLogic VMP3 potentiostat or MPG2 workstation) at the specified current density with a voltage window ranging from OCV to a lower cutoff voltage of 1.9 V vs Li/Li$^+$. For galvanostatic discharge conducted at 50° C., the cells were placed in an incubator (Memmert GmbH+ Co. KG) after assembling.

Example 3

The following example describes high energy Li primary battery cathodes that utilize the defluorination of perfluorinated groups, such as pentafluorosulfanyl ($SF_5$) groups.

Figure 18:
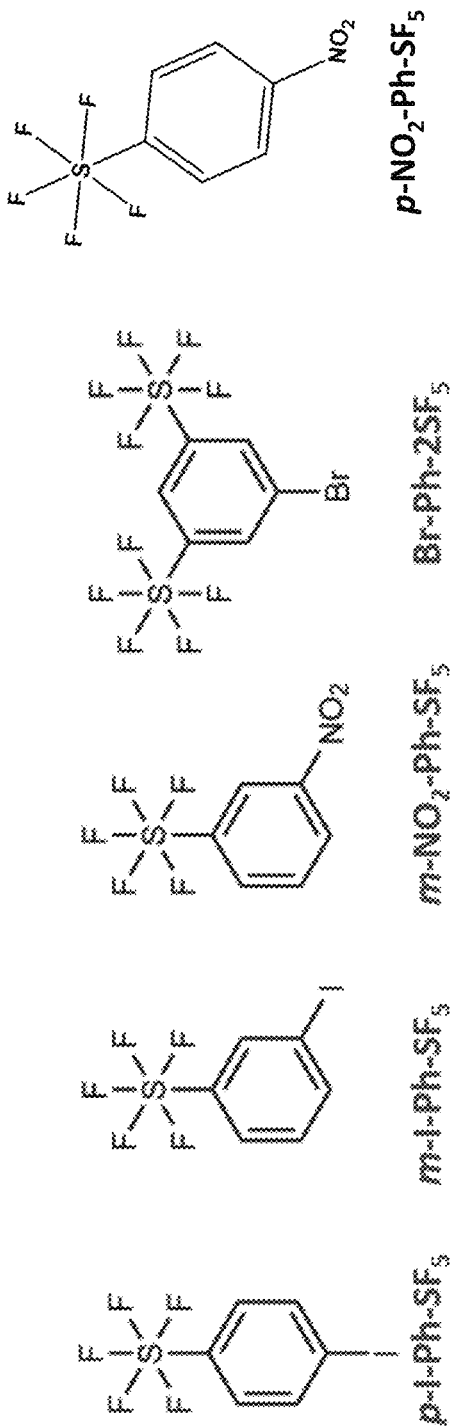
FIG. 18 shows, according to some embodiments, a series of non-limiting structures of halogenated compounds comprising a sulfur-pentafluoride group.
Figure 19A:
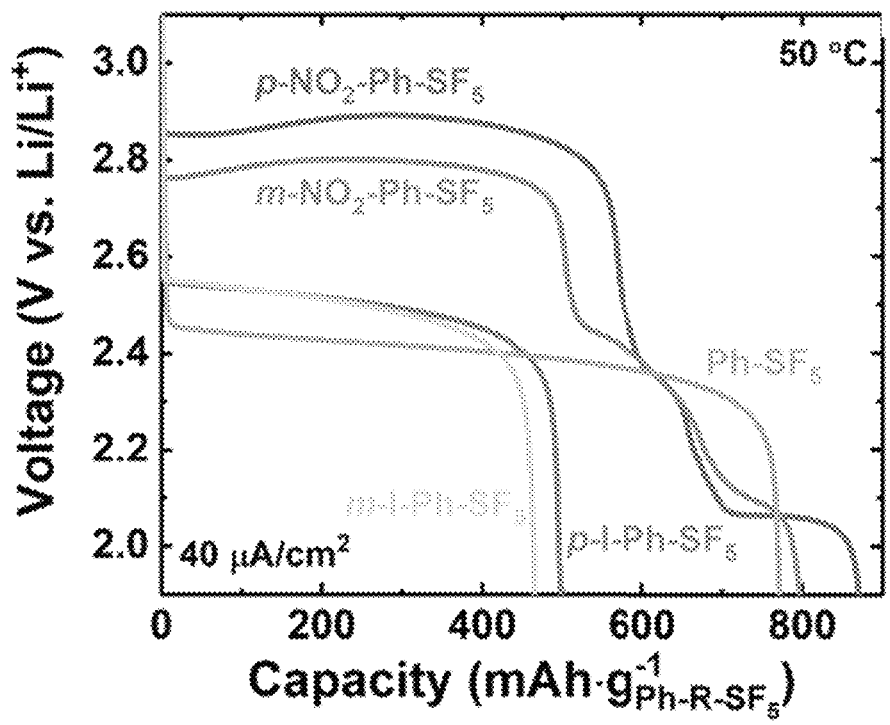
FIG. 19A shows, according to some embodiments, galvanostatic discharge profiles of R-Ph-SF$_5$ reactants with capacities normalized to weight of the reactants.
Figure 19B:
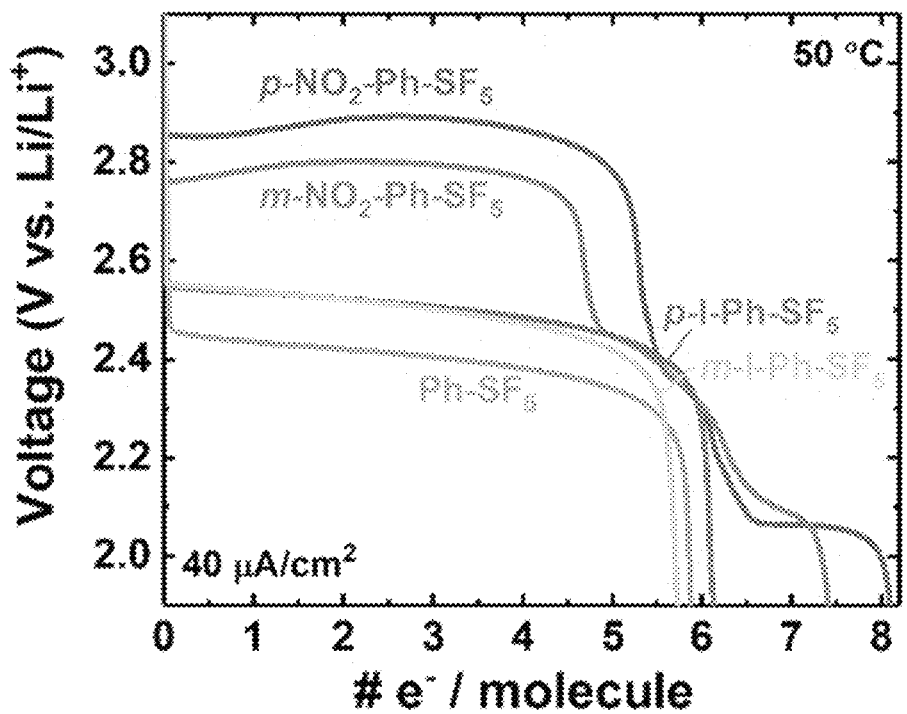
FIG. 19B shows, according to some embodiments, galvanostatic discharge profiles of R-Ph-SF$_5$ reactants with capacities normalized to number of electron transfer per molecule.

Intrinsic electroactivity of R-Ph-$SF_5$ molecules: It is demonstrated that the design strategy of $SF_5$-containing compounds is applicable to various R-group functionalities and positions, and the number of perfluorinated $SF_5$ groups is not restricted to one. Suitable reactant structures comprising a sulfur-pentafluoride group, for example, are shown in FIG. 18. To examine the intrinsic redox behavior, FIGS. 19A and 19B show discharge of cells containing 0.1 M R-Ph-$SF_5$ at 40 μA/cm$^2$, with capacities normalized to reactant weight (FIG. 19A) and electrons reacted per molecule (FIG. 19B). The cells were discharged with 0.1 M R-Ph-$SF_5$/0.1 M $LiClO_4$/DMSO as catholyte and Ketjen Black as cathode substrate at 40 μA·cm$^{-2}$. The cells were tested at 50° C. to maximize capacity. Unsubstituted Ph-SF$_5$ and Ph-I—SF$_5$ exhibited modest voltages of ~2.5 V vs. Li/Li+ over a single plateau. Increasing the Hammett coefficient of the electron-withdrawing functionality to —NO$_2$ in the meta (m) or para (p) position (0.71 or 0.78, vs. 0.18 for —I at para) led to higher discharge voltages. The highest cell voltage was obtained with —NO$_2$ in the para (p) position and yielded a three-stage discharge profile with plateaus at 2.9, 2.3 and 2.1 V vs. Li/Li+ with a total capacity of 8 e$^-$/molecule (861 mAh·g$_{R-Ph-SF5}^{-1}$).

Figure 20A:
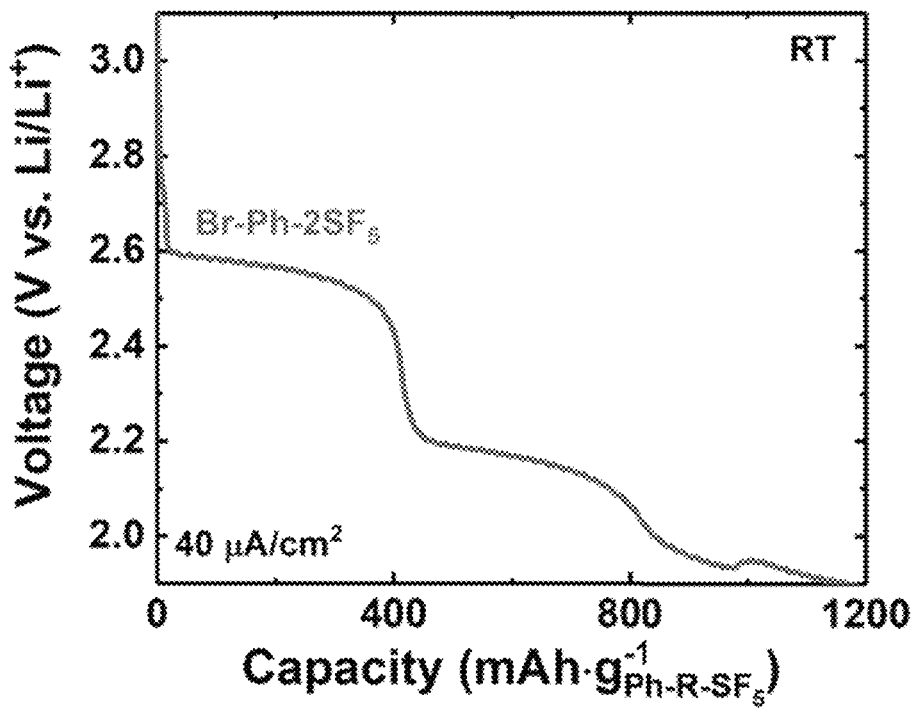
FIG. 20A shows, according to some embodiments, a galvanostatic discharge profile of Br-Ph-2SF$_5$ with capacities normalized to weight of the reactant.
Figure 20B:
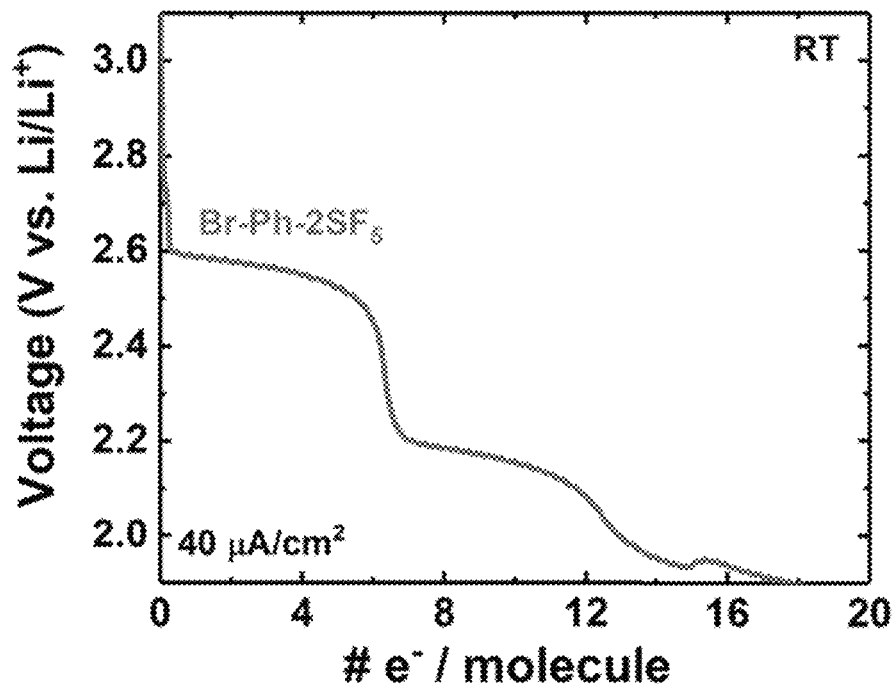
FIG. 20B shows, according to some embodiments, a galvanostatic discharge profile of Br-Ph-2SF$_5$ with capacities normalized to number of electron transfer per molecule.

The discharge of a reactant containing two —SF$_5$ groups, i.e., Br-Ph-2SF$_5$, was next examined at RT, and the results are shown in FIGS. 20A-20B. The cell was discharged with 0.1 M Br-Ph-2SF$_5$/0.1 M LiClO$_4$/DMSO as catholyte and carbon foam as cathode substrate at 40 μA·cm$^{-2}$ and RT. The Li—Br-Ph-2SF$_5$ cell exhibits two discharge plateaus at 2.6 and 2.2 V vs. Li/Li+, each corresponds to a capacity ~6 e$^-$/molecule, which might be attributed to the reduction of the two —SF$_5$ groups. A low voltage (<2.0 V vs. Li/Li$^+$) tail was observed at the end of discharge, suggesting the continue reduction of the aromatic components. Overall, a total capacity of 1138 mAh/g$_{Br-Ph-2SF5}$ was obtained.

Figure 21A:
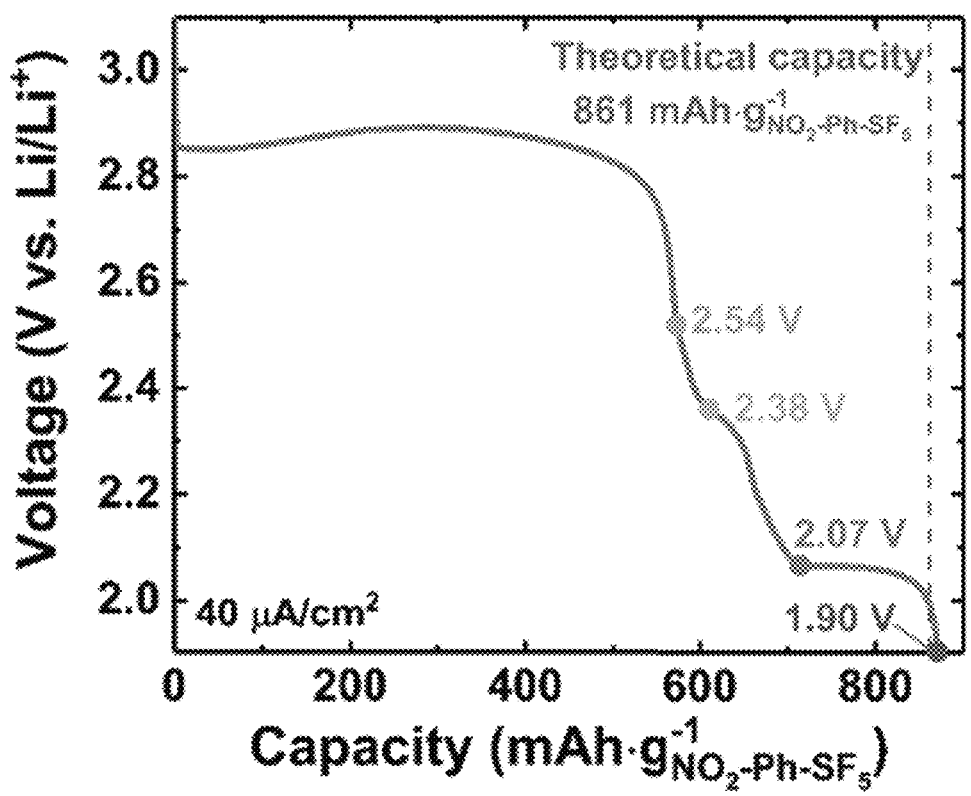
FIG. 21A shows, according to some embodiments, a discharge profile of NO$_2$-Ph-SF$_5$ under reactant-limited conditions with different cell termination voltages.
Figure 21B:
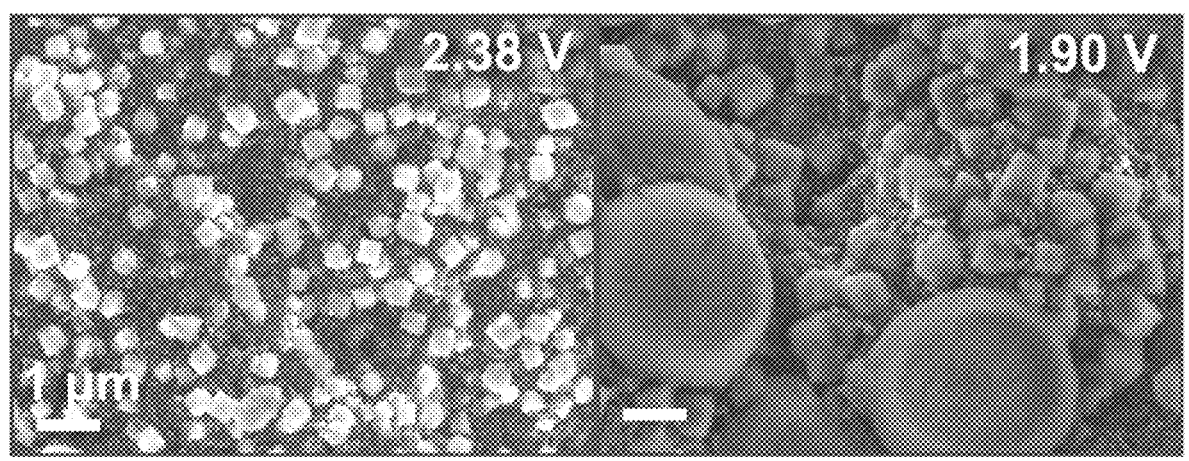
FIG. 21B shows, according to some embodiments, SEM images of carbon cathodes from cells discharged to 2.38 or 1.90 V vs. Li/Li$^+$.
Figure 21C:
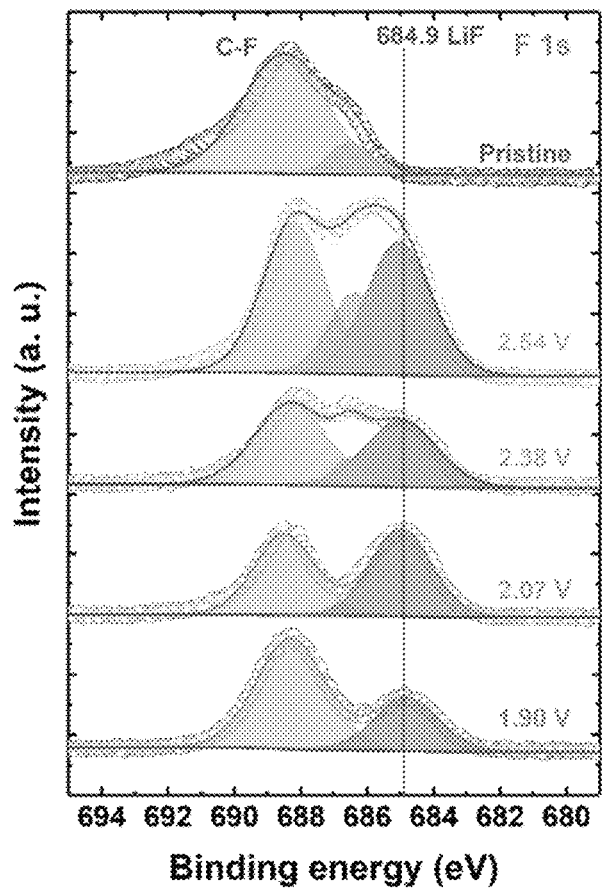
FIG. 21C shows, according to some embodiments, high resolution F is X-ray photoelectron spectroscopy (XPS) spectra of discharged electrodes.

Products of p-NO$_2$-Ph-SF$_5$ discharge: Next, the discharge products and performances of Li—R-Ph-SF$_5$ cells were investigated in detail, using p-NO$_2$-Ph-SF$_5$ as an exemplar system, with the 'p' henceforth omitted. To examine the conversion process in detail, 0.1 M NO$_2$-Ph-SF$_5$ was discharged to varying terminal voltages (FIG. 21A) after which cathodes and/or electrolyte were extracted for analysis. At 2.54-2.38 V vs. Li/Li$^+$, the cathodes consisted of cubic crystallites of ~270±50 nm (FIG. 21B), confirmed to be LiF (rocksalt, Fm$\bar{3}$m) in the XPS F 1s spectrum (684.9 eV, FIG. 21C). The two C—F peaks at 688.4 and 686.4 eV are from the polyvinylidene difluoride (PVDF) binder. Given the electronically insulating nature of LiF, the energy-minimized structure and large particle size suggests that LiF particles grow via a solution-mediated process. The amount of solid sulfur products in the cathode S 2p spectra was negligible (<0.1 at. %, FIG. 21D) after the high-voltage plateau, however, UV-vis spectroscopy and visual analysis confirmed that most of the sulfur was present in solution as polysulfides, with S$_8^{2-}$ predominant (FIGS. 21E-21F). The data collectively indicate that the high-voltage plateau corresponds to near-stoichiometric defluorination of all 5 F ligands in Ph-NO$_2$—SF$_5$, a process that liberates S intermediates from the parent molecule which then undergo polymerization reactions in solution. Polysulfide generation continued upon further discharge to 2.07 V vs. Li/Li$^+$ (~1 e$^-$, with a slight increase in cathode S content (to ~0.8 at. %, FIG. 21D).

Figure 21D:
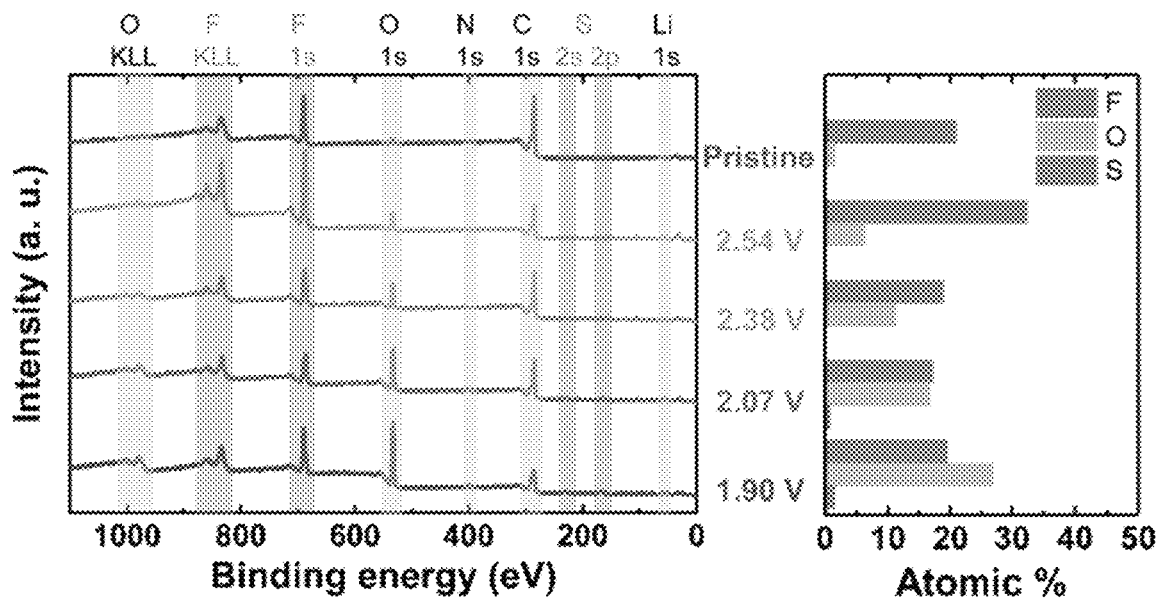
FIG. 21D shows, according to some embodiments, XPS survey spectra (left) with corresponding F, O and S atomic percentage (right)
Figure 21E:
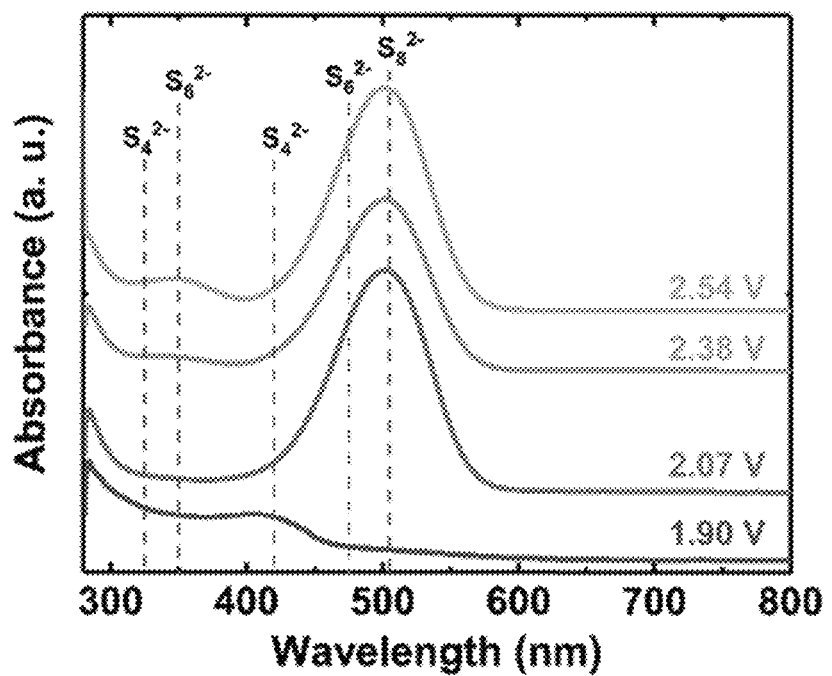
FIG. 21E shows, according to some embodiments, ultraviolet-visible (UV-vis) spectra of extracted electrolyte from discharged cells as a function of termination voltage.
Figure 21F:
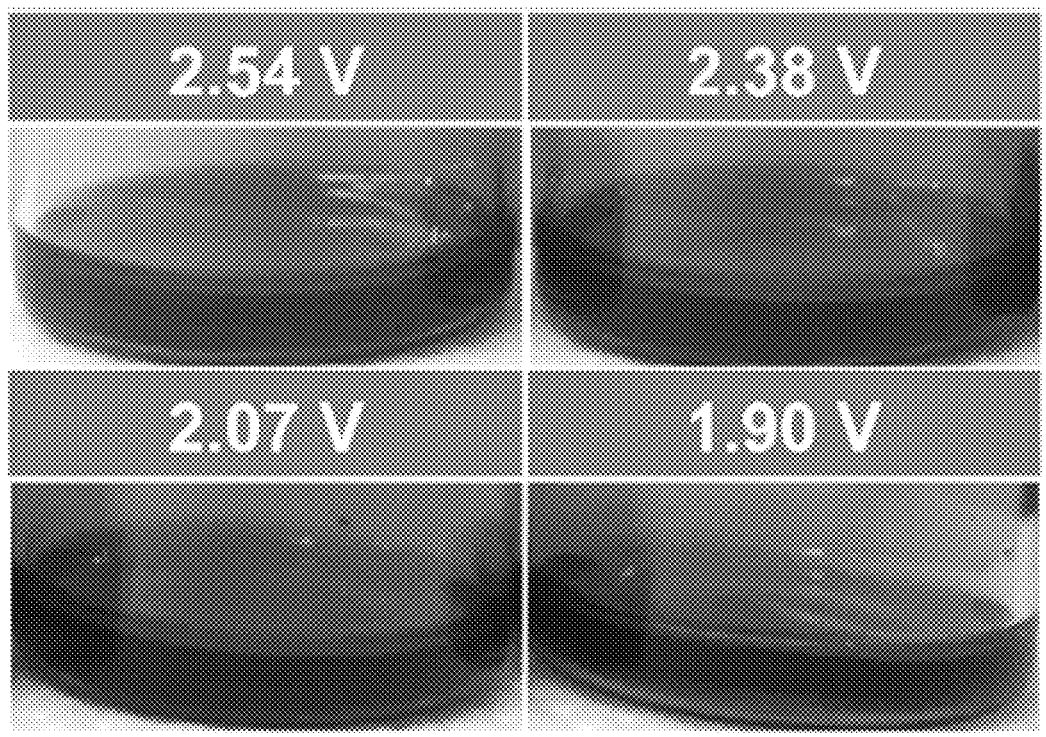
FIG. 21F shows, according to some embodiments, corresponding photographs of samples in FIG. 21E.
Figure 22A:
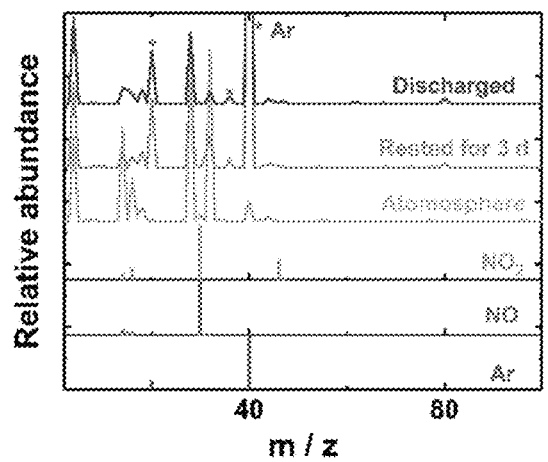
FIG. 22A shows, according to some embodiments, mass spectroscopy of the headspace gas from a fully-discharged Li—NO$_2$-Ph-SF$_5$ cell.
Figure 22B:
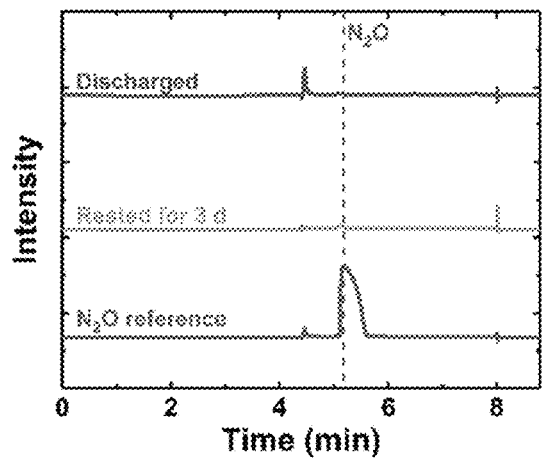
FIG. 22B shows, according to some embodiments, gas chromatography of the headspace gas from a fully-discharged Li—NO$_2$-Ph-SF$_5$ cell.
Figure 22C:
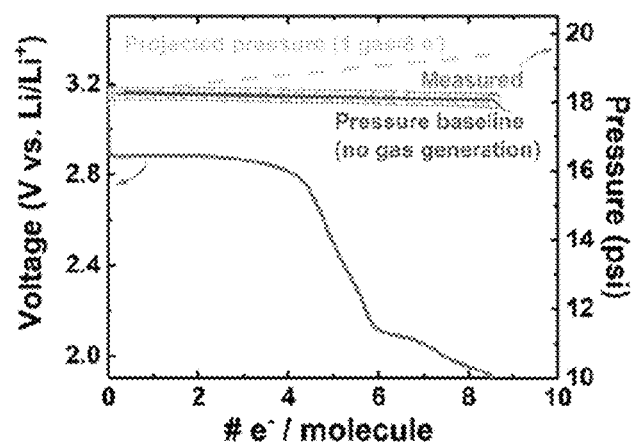
FIG. 22C shows, according to some embodiments, a galvanostatic discharge profile of a Li—NO$_2$-Ph-SF$_5$ cell with the corresponding cell pressure.

Full discharge to 1.90 V vs. Li/Li$^+$ led to near-complete disappearance of any species detected by UV-vis (FIG. 21E), and XPS indicated a modest increase in the cathode's S and N content (to ~1.5 and 1.3 at. %, respectively, FIG. 21D). Nitro-functionalized aromatics have a tendency to react with short-chain (S$_2^{2-}$) polysulfides in DMSO and undergo ring thiol substitution with NO$_2^-$ as a leaving group, which is a possible mechanism that could account for S-poor solid phases in discharged cathodes and retention of reduced S in the liquid phase, along with minor increases in N. O content in the cathode also increased from 16.8 to 27.0 at. % between 2.07 and 1.90 V vs. Li/Li$^+$ (FIG. 21D), while corresponding SEM images indicated nucleation of a new phase with spherical morphology (FIG. 21B), confirmed to be O-rich and N, F, S-poor by energy-dispersive X-ray (EDX) analysis. Significantly, cell headspace analysis by mass spectrometry and gas chromatography (FIGS. 22A-22B, respectively) ruled out formation of NO, NO$_2$, or N$_2$O. Background comparisons were also conducted on the headspace gases from cells with the same electrolyte and cathode (without Li) after resting at 50° C. for 3 days. In FIG. 22B, the peaks at 4.4-4.5 minutes and 8 minutes are due to valve switches. Furthermore, cells discharged with a pressure transducer showed negligible gas evolution (FIG. 22C) of any kind. While the precise mechanism of multi-electron NO$_2$-Ph-SF$_5$ reduction is complex, the overall mechanism indicates extensive S—F, S—S, C—S, and N—O bond activation and reduction, yielding solid and liquid products that accumulate throughout the cell. The solid line in FIG. 22C is the projected pressure baseline, which is extrapolated from the linear fit of cell pressure profile during post-discharge resting (for 10 hours). The cell in FIG. 22C was discharged with 150 μL 0.1 M NO$_2$-Ph-SF$_5$/0.1 M LiClO$_4$/DMSO electrolyte and KB electrode at 40 μA·cm$^{-2}$ and 50° C.

Figure 23A:
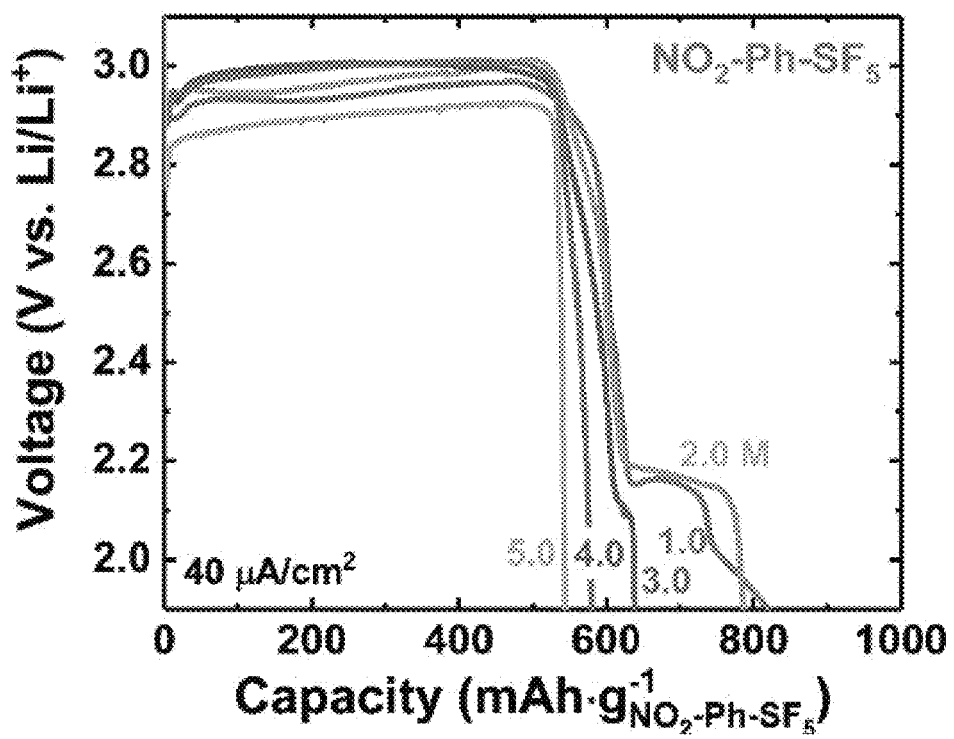
FIG. 23A shows, according to some embodiments, a galvanostatic discharge profile of Li—NO$_2$-Ph-SF$_5$ cells as a function of NO$_2$-Ph-SF$_5$ concentration at 40 µA·cm$^{-2}$.
Figure 23B:
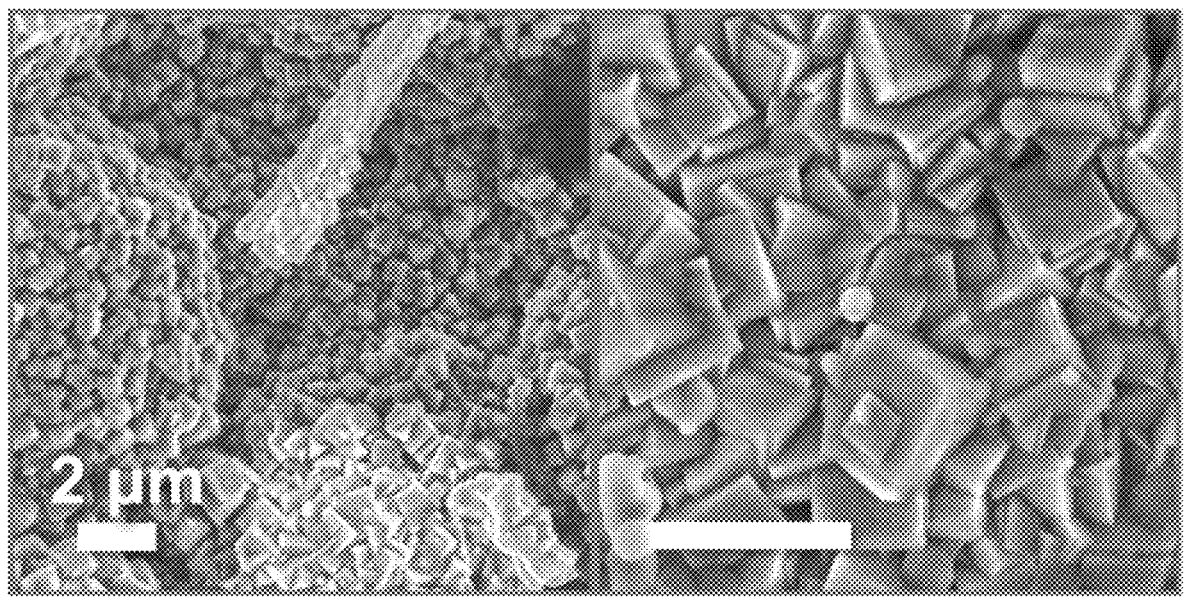
FIG. 23B shows, according to some embodiments, SEM images of carbon cathodes fully discharged with 3 M NO$_2$-Ph-SF$_5$/0.2 M LiClO$_4$/DMSO cathode/electrolyte at 0.3 mA·cm$^{-2}$.

Discharge performance of Li—NO$_2$-Ph-SF$_5$ cells: The electrochemical performance was examined as a function of reactant concentration to evaluate feasibility as a high-concentration catholyte. FIG. 23A shows galvanostatic discharge at concentrations of 1-5 M at 40 μA/cm$^2$ and 50° C., where capacities are normalized to the weight of NO$_2$-Ph-SF$_5$ as an intrinsic measure of reactant utilization. Discharge at concentrations of 1.0-2.0 M led to attainable capacities of 818 and 786 mAh·g$_{NO2-Ph-SF5}^{-1}$ respectively, with retention of a similar discharge profile. Further increasing concentration (≥3 M) saw disappearance of the lower-voltage plateau at ~2.1 V vs. Li/Li$^+$, with capacities of 544 mAh·g$_{NO2-Ph-SF5}^{-1}$ attained at 5.0 M. The loss of the lower-voltage plateau indicates that the carbon cathode surface became passivated by LiF at high potentials before NO$_2$-Ph-SF$_5$ could be fully reduced, i.e., cells switched from being reactant-limited to surface passivation-limited. This was confirmed by SEM of discharged cathodes showing extensive crystallization of cubic LiF particles and no visible carbon substrate remaining (FIG. 23B vs. FIG. 21B).

Figure 23C:
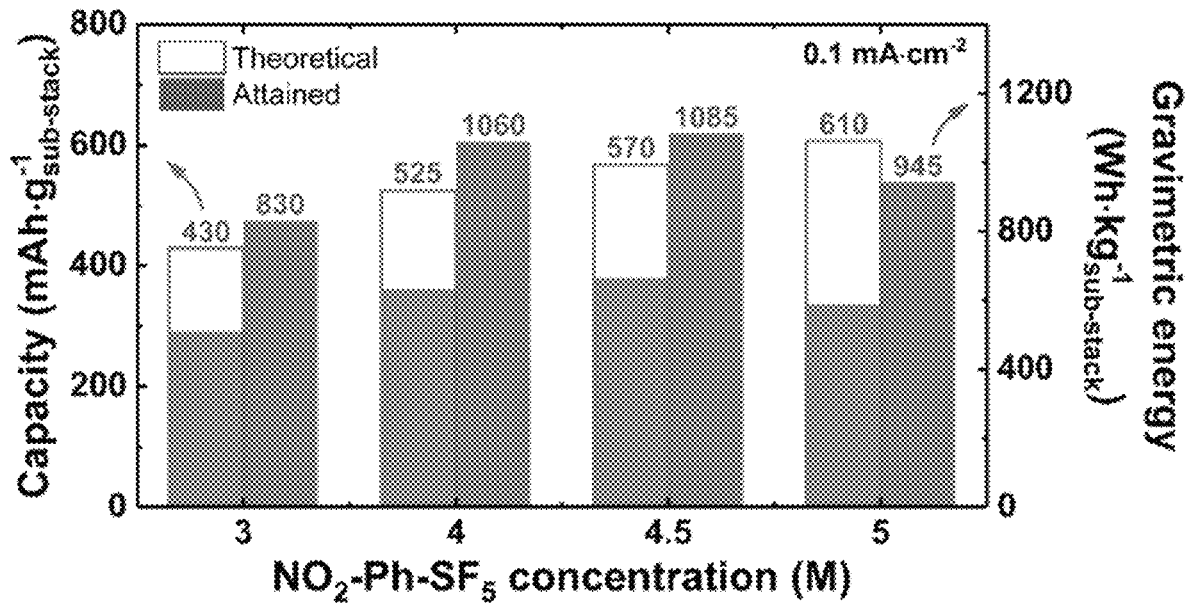
FIG. 23C shows, according to some embodiments, theoretical and attained capacities and attained gravimetric energies of Li—NO$_2$-Ph-SF$_5$ cells as a function of catholyte concentration.
Figure 23D:
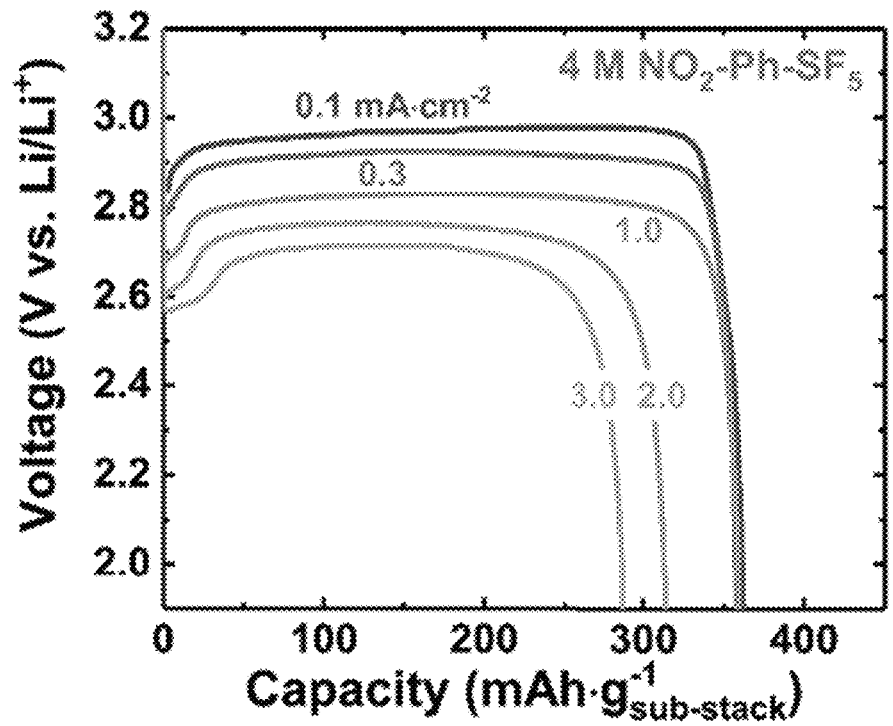
FIG. 23D shows, according to some embodiments, the rate capability of cells with 4 M NO$_2$-Ph-SF$_5$/0.2 M LiClO$_4$/DMSO.
Figure 24:
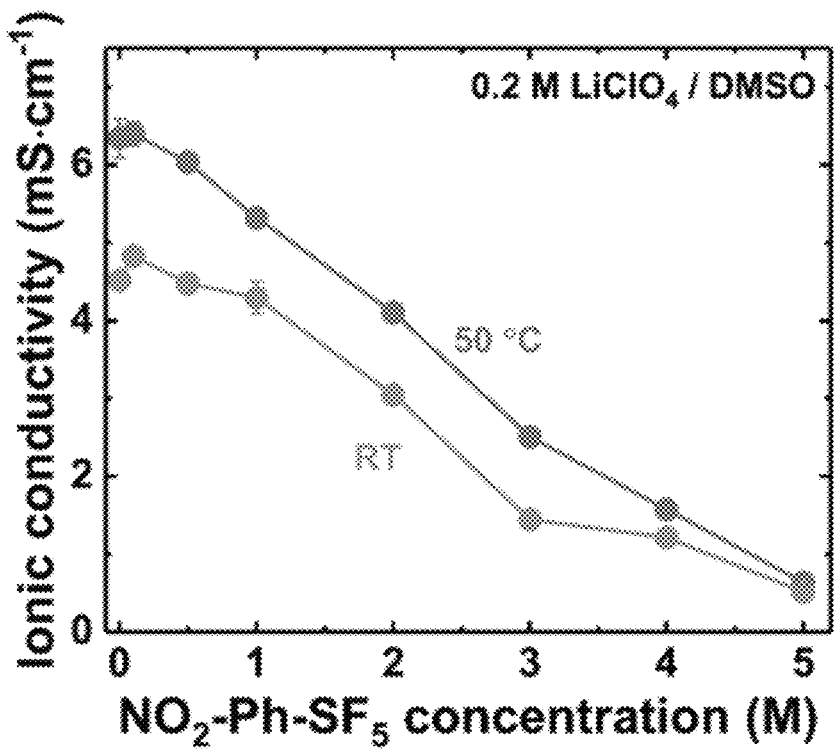
FIG. 24 shows, according to some embodiments, the ionic conductivity of NO$_2$-Ph-SF$_5$-containing electrolytes as a function of NO$_2$-Ph-SF$_5$ concentration at 50° C. and at RT.
Figure 25:
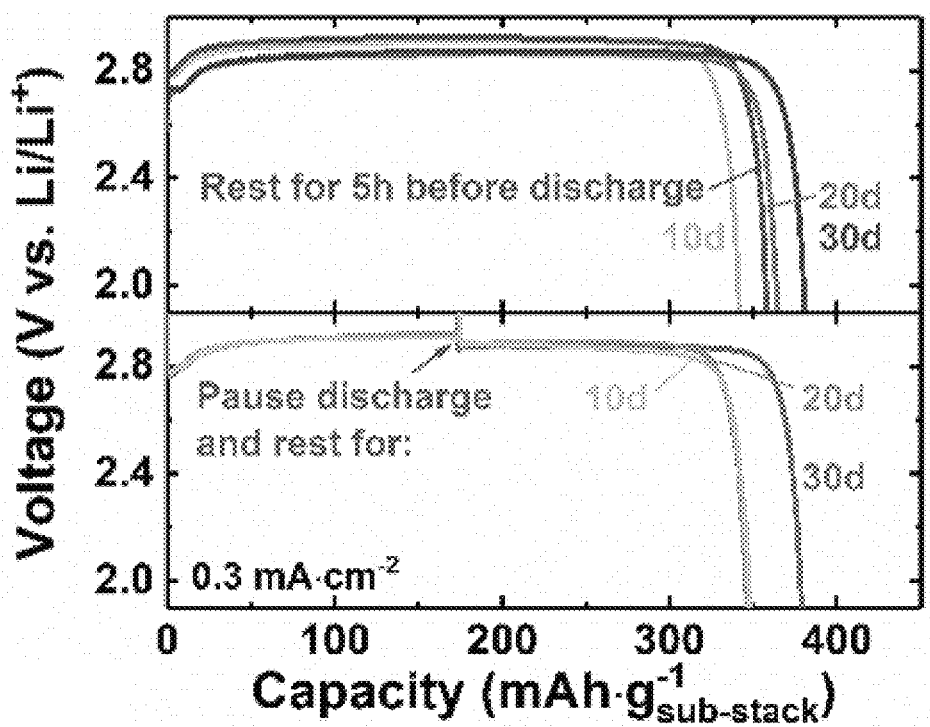
FIG. 25 shows, according to some embodiments, shelf-life tests for Li—NO$_2$-Ph-SF$_5$ cells with 4 M NO$_2$-Ph-SF$_5$/0.2 M LiClO$_4$/DMSO.

In spite of lower per-molecule utilization, increasing the concentration enables improved cell-level metrics: the areal capacities of cells in FIG. 23A monotonically increased from 5.8-19.1 mAh·cm$^{-2}$ between 1.0 and 5.0 M. To accurately represent the cell performance on a gravimetric basis, normalization was additionally conducted based on the weight of all cell materials (i.e., NO$_2$-Ph-SF$_5$+ electrolyte+ carbon cathode+ consumed Li) excluding only the current collectors, separator, binder, and cell housing, henceforth denoted as "sub-stack". FIG. 23C shows these sub-stack capacities and gravimetric energies at a slightly higher current of 0.1 mA·cm$^{-2}$. Theoretical capacities correspond to 8 e$^-$ per molecule. Capacities increased from 292 to 362 mAh·g$_{sub-stack}^1$ as concentration increased from 3 M to 4 M, beyond which further gains were negligible. The maximum gravimetric energy of 1085 Wh·kg$_{sub-stack}^1$ was obtained at 4.5 M. Capacity and energy decreased with concentrations exceeding 4.5 M due to diminishing supporting solvent (DMSO, ~16 wt. % of the catholyte at 5 M), which led to significant decline in ionic conductivity from 6.4 to 0.6 mS·cm$^{-1}$ from 0.1 M to 5 M (FIG. 24). Additionally, low DMSO content decreases the ability to solubilize LiF, making electrode passivation effects more severe. The rate capability of cells at 4.0 M concentration and 50° C. is shown in FIG. 23D. Capacities remained constant at ~362 mAh·g$_{sub-stack}^1$ from 0.3-1.0 mA·cm$^{-2}$ (0.01 C-0.04 C) and decreased moderately thereafter up to 3 mA·cm$^{-2}$ (0.12 C), indicating excellent rate capability. Critically for primary battery applications, FIG. 25 shows that as-assembled Li—$NO_2$-Ph-$SF_5$ cells rested for 30 days at 50° C. exhibited no capacity loss upon subsequent discharge, and cells also exhibited negligible voltage fade upon interruption at partial depth-of-discharge and resting for 10-30 days, indicating good shelf life characteristics.

Figure 26A:
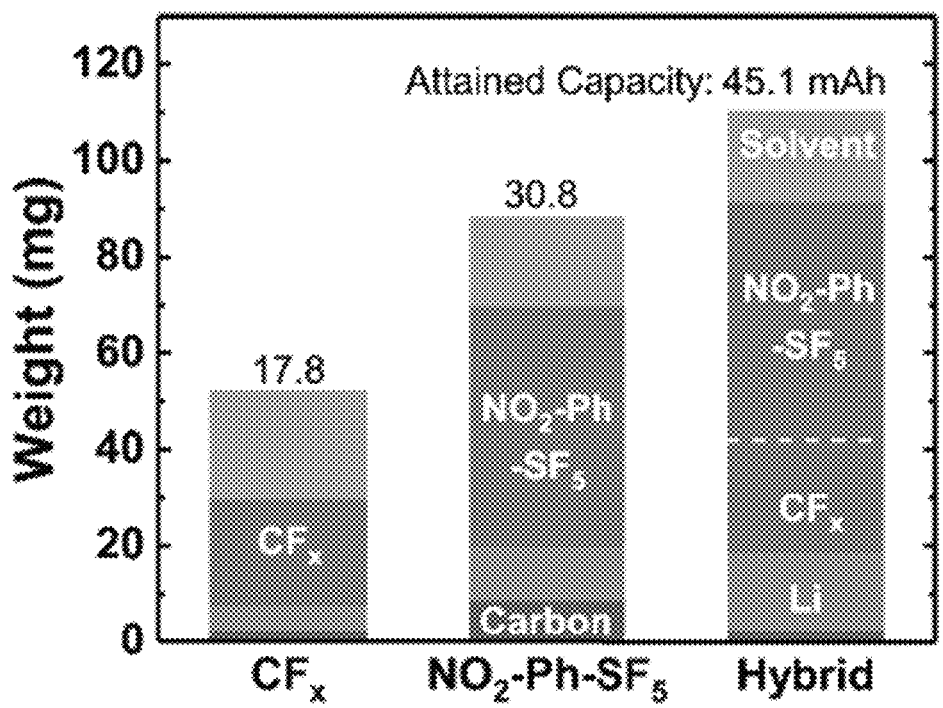
FIG. 26A shows, according to some embodiments, the weight breakdown of cell components in Li—CF$_x$, Li—NO$_2$-Ph-SF$_5$, and hybrid cells.

To compare performance with state-of-the-art primary batteries, Li—$CF_x$ cells were assembled and tested. The breakdown of the cell masses is shown in FIG. 26A. Typical electrolyte-to-active solid mass fractions in commercial cells range from 0.7-1.3, a lean electrolyte loading that is challenging to achieve in-house. Consequently, Li—$CF_x$ cells (20.4±2.3 mg of $CF_x$, 11.5±1.3 mg·cm$^{-2}$ loading) were tested in a flooded electrolyte configuration but normalized assuming a 1:1 electrolyte:cathode mass ratio dictated by commercial standards. In Li—$NO_2$-Ph-$SF_5$ cells, the active material is in the liquid phase, hence design considerations favor a substantially larger electrolyte-to-solid ratio (carbon being electrochemically inactive) of ~8:1 w/w, with 5 mg·cm$^{-2}$ of carbon and ~28 mg·cm$^{-2}$ of $NO_2$-Ph-$SF_5$ for 4 M concentration. A Ragone plot (FIG. 26B) shows that Li—$NO_2$-Ph-$SF_5$ cells attain comparable sub-stack level performance to Li—$CF_x$ cells at low power (~1000 Wh·kg$_{sub-stack}^{-1}$ at ~15 W·kg$_{sub-stack}^{-1}$). The average value and error bars (representing standard deviation) are based on three cells each. These values compare to active-mass theoretical values of 1845 Wh·kg$_{active}^{-1}$ (Li—$NO_2$-Ph-$SF_5$) and 2050 Wh·kg$_{active}^{-1}$ (Li—$CF_x$), which, in contrast to sub-stack metrics, omit inactive electrolyte/carbon. The numbers indicate the following: First, both cell formulations exhibit significant decreases in gravimetric energy when inactive masses (electrolyte+carbon) are accounted for on the more-realistic sub-stack basis; and second, Li—$NO_2$-Ph-$SF_5$ cells with liquid reactants exhibit proportionally higher active mass utilization, which in turn enables comparable or higher cell energies in practice. This gain arises from the ability to minimize dead weight of electrolyte compared to Li—$CF_x$ (both cells utilize comparable inactive C). Moreover, Li—$NO_2$-Ph-$SF_5$ cells show advantages over Li—$CF_x$ at moderate powers (50-100 W·kg$_{sub-stack}^{-1}$), which is attributed to facile kinetics in the liquid phase. These gains diminish at higher powers (>150 W·kg$_{sub-stack}^{-1}$) for this particular formulation due to limitations of ionic conductivity of $NO_2$-Ph-$SF_5$-based electrolytes.

Figure 26B:
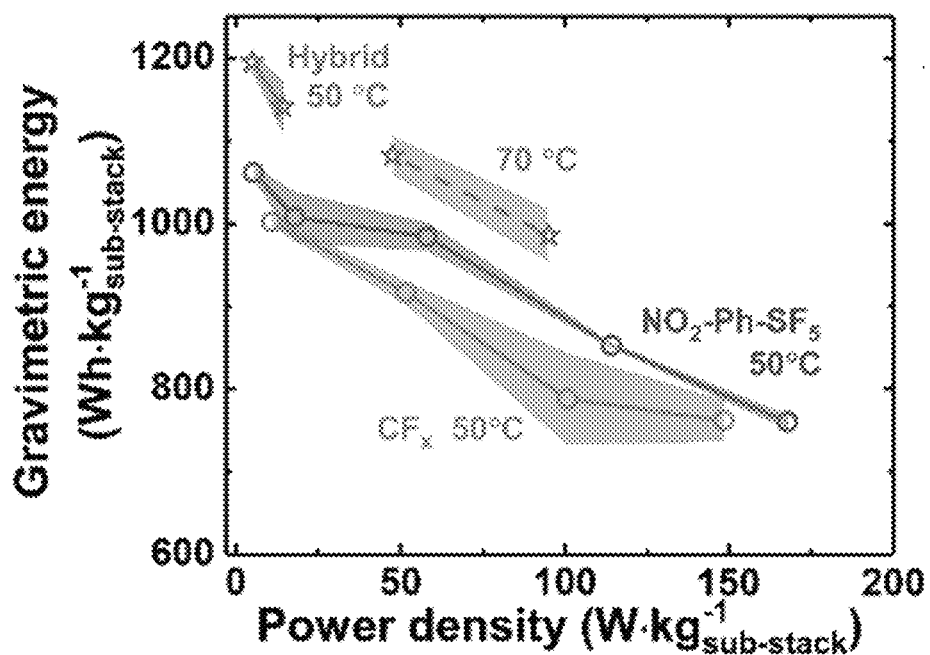
FIG. 26B shows, according to some embodiments, a Ragone plot comparing rate performance of Li—CF$_x$, Li—NO$_2$-Ph-SF$_5$, and hybrid cells.
Figure 26C:
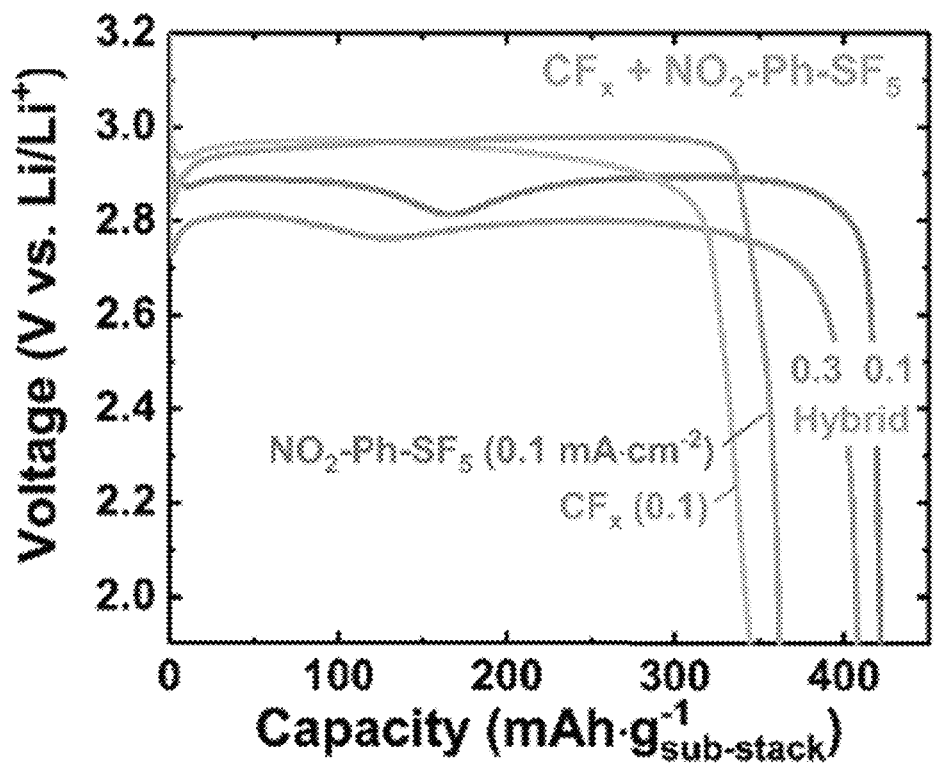
FIG. 26C shows, according to some embodiments, the rate performance of hybrid cells using CF$_x$ as solid cathode and 4 M NO$_2$-Ph-SF$_5$/0.2 M LiClO$_4$/DMSO as catholyte.
Figure 26D:
FIG. 26D shows, according to some embodiments, SEM images of discharged cathodes from Li—NO$_2$-Ph-SF$_5$ cells, hybrid cells, and Li—CF$_x$ cells.
Figure 27:
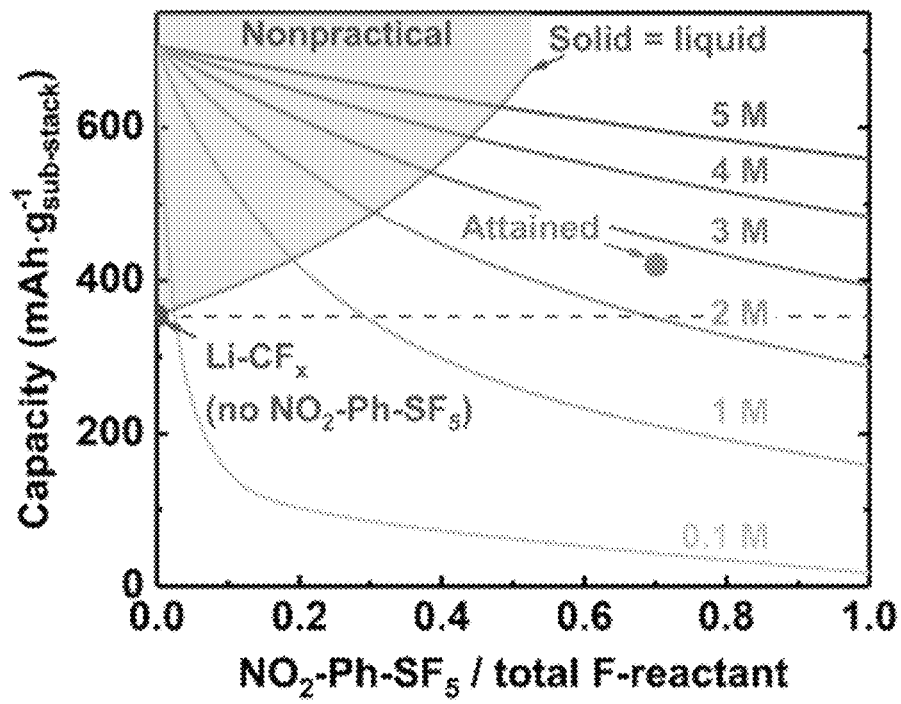
FIG. 27 shows, according to some embodiments, a projection of the theoretical capacity of hybrid cells with different weight ratios.

Hybrid solid-liquid cell design: The chemical compatibility and voltage matching of Li—$NO_2$-Ph-$SF_5$ and Li—$CF_x$ creates new possibilities to design hybrid cell concepts that surpass the gravimetric energy of any known formulation. To demonstrate this, cells containing a $NO_2$-Ph-$SF_5$:$CF_x$ mass ratio of ~2:1 were designed (FIG. 26A). The total sub-stack percentage of active materials was ~80%, compared to the Li—$CF_x$ (~50%) or Li—$NO_2$-Ph-$SF_5$ cells (~70%). A gravimetric capacity of 421 mAh·g$_{sub-stack}^{-1}$ was obtained at 0.1 mA·cm$^{-2}$ and 50° C. with the hybrid cell, significantly higher than the respective individual cells (≤362 mAh·g$_{sub-stack}^{-1}$, FIG. 26C). 'Sub-stack' for Li—$CF_x$ denotes $CF_x$+ electrolyte+carbon+consumed Li; for hybrid cells, the weight of $NO_2$-Ph-$SF_5$ is also included. The gravimetric energy, reaching 1195 Wh·kg$_{sub-stack}^{-1}$ at 5 W·kg$_{sub-stack}^{-1}$, represents a ~20% improvement over Li—$CF_x$ at the sub-stack level (FIG. 26B). SEM images (FIG. 26D) of discharged cells showed formation of LiF crystallites on $CF_x$ graphite flakes that were not present in $CF_x$-only cells, further confirming utilization of both solid and liquid capacities. It is noted that the hybrid cell utilized a commercial $CF_x$ powder blend optimized for conventional cell performance and does not necessarily provide optimal surface area to accommodate $NO_2$-Ph-$SF_5$ discharge. The theoretical expected energy of a hybrid cell is computed in FIG. 27 and indicates that maximum performance for 5 M reactant occurs around a $NO_2$-Ph-$SF_5$:$CF_x$ mass ratio of 1:1.1 and 627 mAh·g$_{sub-stack}^{-1}$, a ~50% increase compared to the above numbers attained in practice so far. The shaded region in FIG. 27, where the weight of solid components ($CF_x$+C) is higher than that of liquids, is deemed as non-practical because it is difficult for electrolyte to sufficiently wet the electrode under these conditions. The maximum attained capacity in FIG. 26C (with 4 M $NO_2$-Ph-$SF_5$) is labeled in FIG. 27 as "attained".

Figure 28:
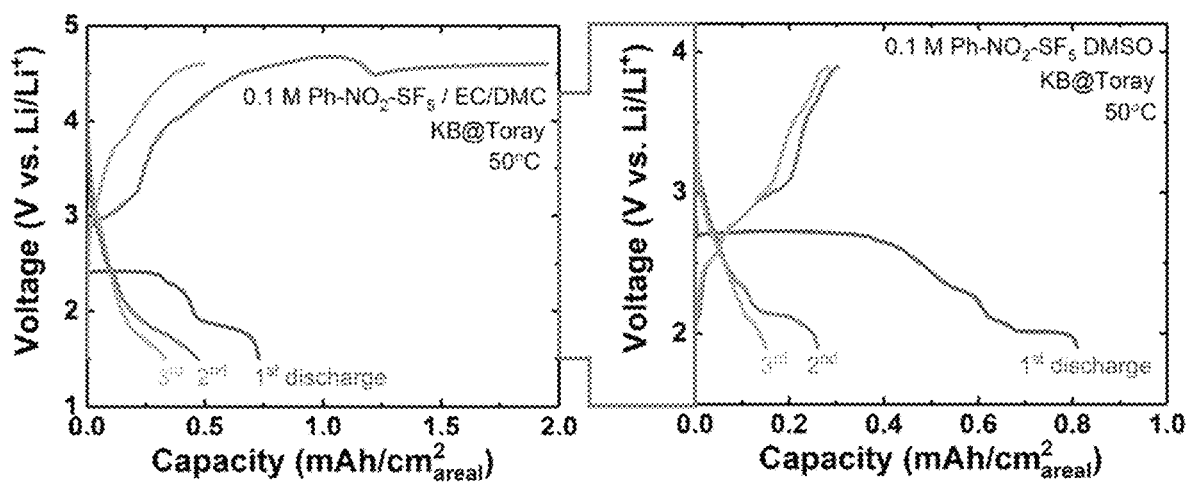
FIG. 28 shows, according to some embodiments, galvanostatic cycle profiles of Li—NO$_2$-Ph-SF$_5$ cell with EC/DMC (left) and DMSO (right) catholyte solvents at 0.04 mA/cm$^2$ (for cycle) between 1.5-4.6 and 1.9-3.9 V vs. Li/Li+, respectively.

Rechargeability of Li—$NO_2$-Ph-$SF_5$ cells: The potential of Li—$NO_2$-Ph-$SF_5$ cells was next examined as a secondary (i.e., rechargeable) battery. Cells with 0.1 M $NO_2$-Ph-$SF_5$ were first discharged at a high rate of 0.3 mA/cm$^2$, to promote the formation of small particle sized LiF, and subsequently charged at 0.04 mA/cm$^2$. Considering that the stability of DMSO is relatively limited (<4.5 V vs. Li/Li$^+$), another solvent, ethylene carbonate/dimethyl carbonate (EC/DMC, 1:1 v/v), with wider stability window (1.5-4.8 V vs. Li/Li$^+$), was also tested. The profiles of the initial discharge and the following two cycles at 50° C. are shown in FIG. 28. To minimize the effect of solvent decomposition, cells with EC/DMC were cycled between 1.5-4.6 V vs. Li/Li$^+$, while that with DMSO was cycled between 1.9-3.9 V vs. Li/Li$^+$. In the second discharge, cells with DMSO exhibited multiple voltage plateaus similar to that observed during first discharge (after the high voltage plateau), corresponding to a capacity of 0.26 mAh/cm$^2$ or 2.2 e$^-$/molecule. A similar discharge profile was retained during the third discharge, with capacity faded to ~1.3 e$^-$/molecule. Cells with EC/DMC showed a higher reversible capacity (up to 0.47 mAh/cm$^2$ or 3.9 e$^-$/molecule), but with a sloping voltage, instead of the multi-plateau profile, which is attributable to the instability of polysulfides with carbonate-based electrolyte. The initial discharge was conducted at 0.3 mA/cm$^2$. All cells were discharged with 0.1 M $NO_2$-Ph-$SF_5$/ 0.1 M LiClO$_4$/DMSO as catholyte and Ketjen Black as cathode substrate at 50° C. Overall, the electrochemical activities observed during second and third discharge suggests that the reduction of $NO_2$-Ph-$SF_5$ is partially reversible, and mainly at the lower voltage region (after defluorination reaction), with capacities of ~2-3 e$^-$/molecule.

Figure 29A:
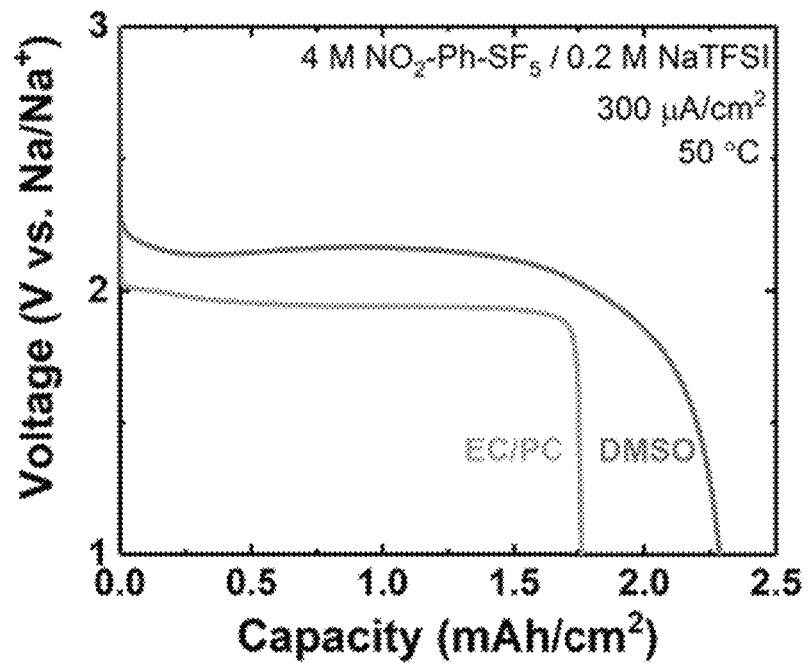
FIG. 29A shows, according to some embodiments, galvanostatic discharge profiles of Na—NO$_2$-Ph-SF$_5$ cells with 4 M NO$_2$-Ph-SF$_5$/0.2 M NaTFSI catholyte in DMSO and EC/PC.
Figure 29B:
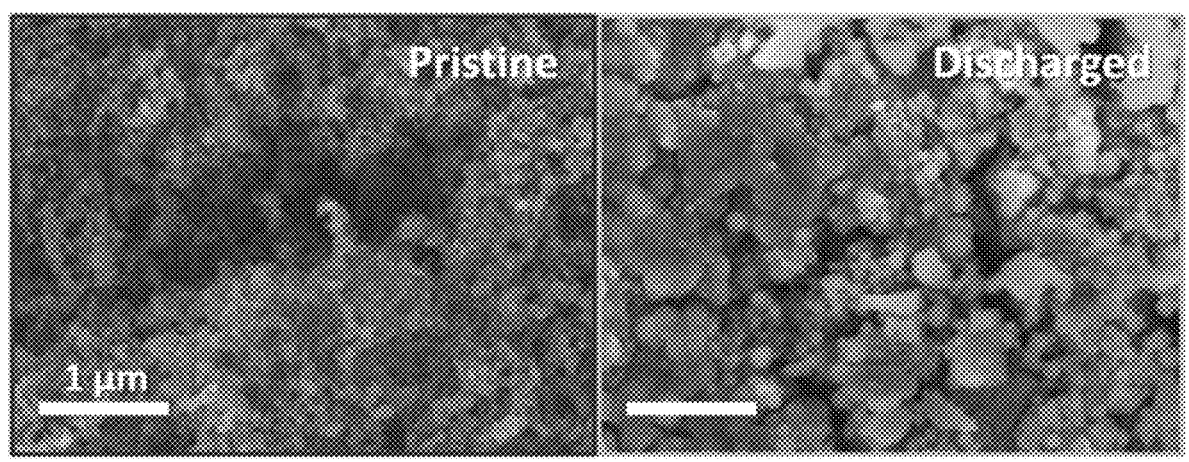
FIG. 29B shows, according to some embodiments, SEM images of the discharged cathode substrate from the EC/PC-containing cell from FIG. 29A.

Alternative anode metal: To demonstrate the compatibility of $NO_2$-Ph-$SF_5$ catholyte with non-Li anodes, Na and Ca were investigated as examples for single-valent and divalent anode metal species, respectively. The discharge profiles of Na—$NO_2$-Ph-$SF_5$ cell with 4 M $NO_2$-Ph-$SF_5$/0.2 M NaTFSI in DMSO or EC/propylene carbonate (PC) as catholyte at 50° C. are shown in FIG. 29A. Cells with DMSO exhibited a discharge capacity of 2.3 mAh/cm$^2$ at ~2.2 V vs. Na/Na$^+$, while that with EC/PC was discharged at ~2.0 V vs. Na/Na$^+$. All cells were discharged with carbon foam as cathode substrate at 0.3 mA/cm$^2$ and 50° C. The discharge products of the EC/PC-containing cell were characterized using SEM in FIG. 29B. Small particles were observed on the discharged carbon substrate, the composition of which were found to be mainly Na and F from EDX analysis. The decreased discharge capacities of Na—$NO_2$-Ph-$SF_5$ cells compared with the Li counterpart might be attributed to the decreased stability of Na metal against solvents.

Figure 30:
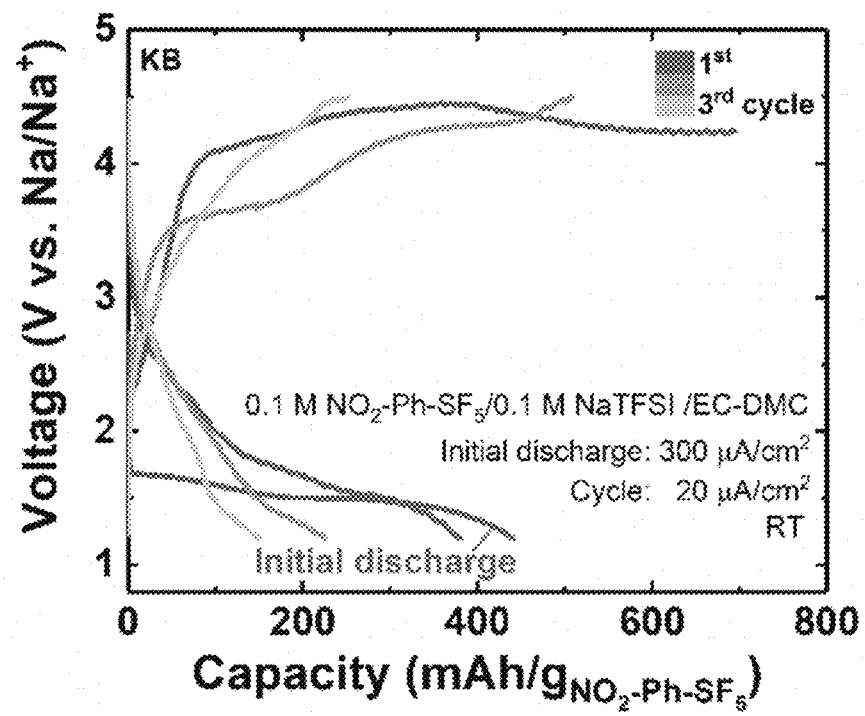
FIG. 30 shows, according to some embodiments, galvanostatic cycle profiles of Na—NO$_2$-Ph-SF$_5$ cell with 0.1 M NO$_2$-Ph-SF$_5$/0.2 M NaTFSI in EC/DMC as catholyte and KB as cathode substrate at 0.02 mA/cm$^2$ between 1.2-4.5 V vs. Na/Na±.

Given the instability of Na metal with DMSO, the reversibility of a Na—$NO_2$-Ph-$SF_5$ cell was examined with EC/DMC solvent at RT. Similar to the Li cell, a low reactant concentration of 0.1 M was used, and the cell was first discharged at a high rate of 0.3 mA/cm$^2$, then cycled at 0.02 mA/cm$^2$ between 1.2-4.5 V vs. Na/Na$^+$ at RT (FIG. 30). The initial discharge exhibited only one voltage plateau before reaching the low cutoff voltage, resulting in a capacity of 441 mAh/g$_{NO2-Ph-SF5}$. During the second discharge, the voltage profile became sloping with a capacity of 380 mAh/g$_{NO2-Ph-SF5}$. Considering that some reactants might remained unreacted after the initial discharge, which could have a capacity contribution during the second discharge, the total capacity of the two discharges (821 mAh/g$_{Ph-NO2-SF5}$) was compared to the theoretical capacity of the high voltage plateau (538-646 mAh/g$_{NO2-Ph-SF5}$, assuming 5-6 electron transfer). The total discharge capacity of the first two discharges exceeds the theoretical value, suggesting that ~200 mAh/g$_{Ph-NO2-SF5}$ capacity is reversible, which is further confirmed by the >200 mAh/g/g$_{Ph-NO2-SF5}$ capacity observed during the third discharge, where the effect of unreacted NO$_2$-Ph-SF$_5$ can be eliminated. This demonstrates that the high voltage discharge of NO$_2$-Ph-SF$_5$ catholyte is potentially rechargeable when a weaker binding metal, such as Na, was used as anode.

Figure 31:
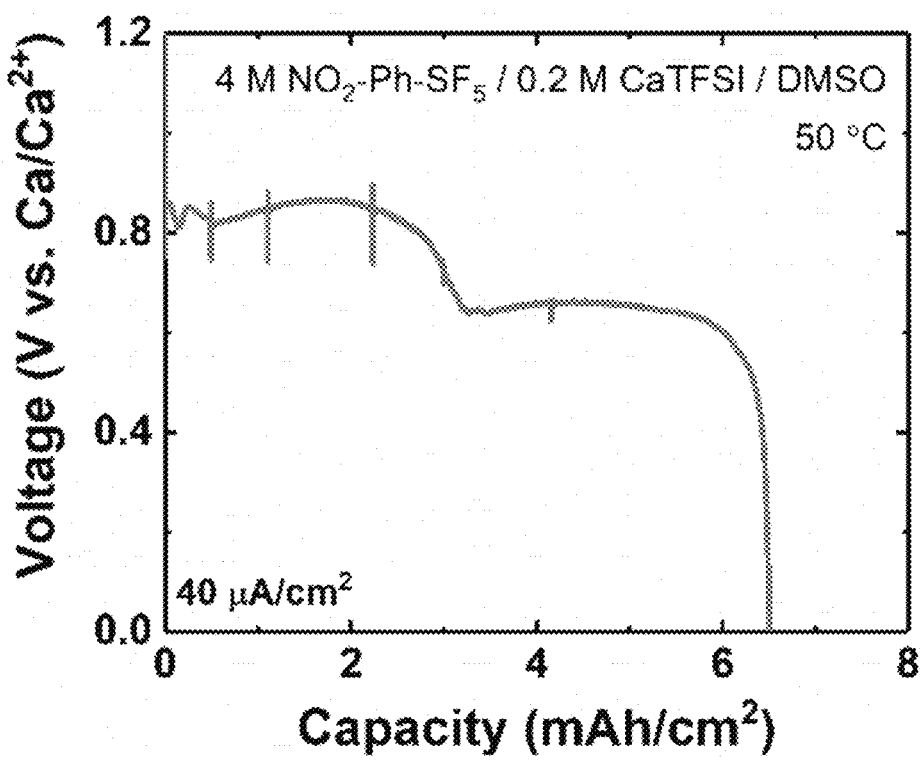
FIG. 31 shows, according to some embodiments, a galvanostatic discharge profile of a Ca—NO$_2$-Ph-SF$_5$ cell with 4 M NO$_2$-Ph-SF$_5$/0.2 M CaTFSI in DMSO as catholyte and carbon foam as cathode substrate at 0.04 mA/cm$^2$ and 50° C.

The discharge of NO$_2$-Ph-SF$_5$ catholyte with divalent metal anode, Ca, is shown in FIG. 31. Cells utilized 4 M NO$_2$-Ph-SF$_5$/0.2 M CaTFSI/DMSO as catholyte, and were discharged at 0.04 mA/cm$^2$ at 50° C. A total capacity of 6.5 mAh/cm$^2$ was obtained, initiating at a voltage of 0.8 V vs. Ca/Ca$^{2+}$. The large overpotential (~2 V lower cell voltage than that observed in Li system) might partially be attributed to the passivating solid electrolyte interphase (SEI) generated at the surface of Ca anode.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell, comprising:
a first electrode comprising an alkali metal;
a second electrode;
an electrolyte solution; and
a halogenated compound comprising at least one sulfur pentafluoride group associated with a conjugated system, wherein the electrolyte solution comprises the halogenated compound.

2. The electrochemical cell of claim 1, wherein the first electrode comprises lithium and/or sodium.

3. The electrochemical cell of claim 1, wherein the second electrode comprises carbon and/or a metal.

4. The electrochemical cell of claim 1, wherein the second electrode comprises carbon monofluoride.

5. The electrochemical cell of claim 1, wherein the second electrode comprises graphene, graphene oxide, graphite, a carbonized material, a carbon nanomaterial, carbon powder, a carbon gas diffusion layer, Pt, Ni, Pd, Fe, Co, Au, and/or Cu.

6. The electrochemical cell of claim 1, wherein the conjugated system comprises at least one optionally substituted aromatic group.

7. The electrochemical cell of claim 6, wherein the at least one optionally substituted aromatic group comprises benzene.

8. The electrochemical cell of claim 1, wherein the electrolyte solution further comprises dimethyl sulfoxide, a glyme, a carbonate, tetrahydrofuran, dimethylacetamide, dimethylformamide, and/or an ionic liquid.

9. The electrochemical cell of claim 1, wherein the electrolyte solution further comprises $LiClO_4$, $LiPF_6$, $LiBF_4$, $LiCF_3SO_3$, $LiNO_3$, LiI, LiBr, lithium bis (oxalato) borate, lithium bis (fluorosulfonyl) imide, and/or lithium bis (trifluoromethanesulfonyl) imide.

10. The electrochemical cell of claim 1, wherein the electrochemical cell is a primary battery.

11. The electrochemical cell of claim 1, wherein the second electrode comprises a halogenation layer.

12. The electrochemical cell of claim 1, wherein the halogenated compound comprises one sulfur pentafluoride group associated with the conjugated system.

13. An electrochemical cell, comprising:
a first electrode comprising an alkali metal;
a second electrode;
an electrolyte solution; and
a halogenated compound comprising at least one sulfur pentafluoride group associated with a conjugated system, wherein the halogenated compound is dissolved in the electrolyte solution, and wherein the solubility of the halogenated compound in the electrolyte solution is between greater than or equal to 100 mM to less than or equal to 5 M.

14. An electrochemical cell, comprising:
a first electrode comprising an alkali metal;
a second electrode; and
a halogenated compound comprising at least one sulfur pentafluoride group associated with a conjugated system, wherein the electrochemical cell is a secondary battery.

15. An electrochemical cell, comprising:
a first electrode comprising an alkali metal;
a second electrode; and
a halogenated compound comprising two sulfur pentafluoride groups associated with a conjugated system.

16. An electrochemical cell, comprising:
a first electrode comprising an alkali metal and/or an alkaline earth metal;
a second electrode; and
a halogenated compound comprising at least one sulfur pentafluoride group associated with a conjugated system, wherein the halogenated compound is selected from the group consisting of:

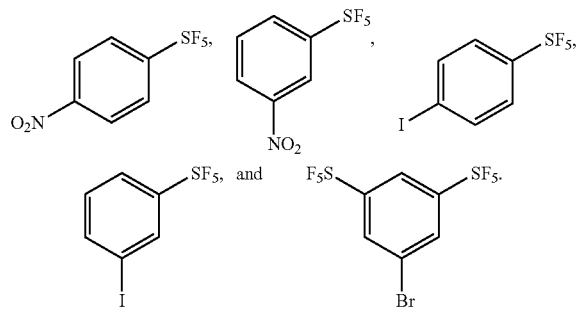

17. An electrochemical cell, comprising:
a first solid electrode comprising an alkali metal;
a second solid electrode comprising carbon monofluoride; and
a liquid electrolyte,
wherein the liquid electrolyte comprises a halogenated compound, wherein the halogenated compound comprises a sulfur pentafluoride group associated with a conjugated system, and wherein the electrochemical cell is a secondary battery.

* * * * *